United States Patent
Segal

(10) Patent No.: US 6,615,181 B1
(45) Date of Patent: Sep. 2, 2003

(54) DIGITAL ELECTRICAL COMPUTER SYSTEM FOR DETERMINING A PREMIUM STRUCTURE FOR INSURANCE COVERAGE INCLUDING FOR COUNTERCLAIM COVERAGE

(75) Inventor: Jeffrey Segal, Terre Haute, IN (US)

(73) Assignee: Medical Justice Corp., Greensboro, NC (US)

( * ) Notice: Subject to any disclaimer, the term of this patent is extended or adjusted under 35 U.S.C. 154(b) by 0 days.

(21) Appl. No.: 09/420,768

(22) Filed: Oct. 18, 1999

(51) Int. Cl.[7] .............................................. G06F 17/60

(52) U.S. Cl. ......................................................... 705/4

(58) Field of Search ................................ 705/4; 283/54

(56) References Cited

U.S. PATENT DOCUMENTS

| | | | | |
|---|---|---|---|---|
| 4,766,539 A | * | 8/1988 | Fox ................................ | 705/4 |
| 5,325,291 A | | 6/1994 | Garrett et al. .................. | 705/4 |
| 5,752,237 A | | 5/1998 | Cherny ........................... | 705/4 |
| 5,839,118 A | * | 11/1998 | Ryan et al. .................... | 705/36 |
| 5,852,808 A | | 12/1998 | Cherny ........................... | 705/4 |
| 5,875,431 A | | 2/1999 | Heckman et al. .............. | 705/7 |
| 5,895,450 A | | 4/1999 | Sloo ............................... | 705/1 |

FOREIGN PATENT DOCUMENTS

| | | | |
|---|---|---|---|
| EP | 0 935 208 A2 | * | 8/1999 |
| WO | WO9740460 | | 10/1997 |

OTHER PUBLICATIONS

Gates, M., "For Doctors, Best Defense May Be Good Offense," St. Louis Post Dispatch, Feb. 11, 1991, Five Star edition, Everyday section, p. 1D.*
Heeb, C.S., "How I Won the Countersuit Everybody Thought I'd Lose," Medical Economics, vol. 68, No. 2, p. 32, Jan. 21, 1991.*
Berger, C.J., "Law: Arbitrating Fee Collection," Progressive Architecture, vol. 72, No. 10, p. 49, Oct., 1991.*
Crane, M., "This Doctor Won a Countersuit. But His War Goes on," Medical Economics, vol. 69, No. 16, p. 32, Aug. 17, 1992.*

(List continued on next page.)

Primary Examiner—Wynn W. Coggins
Assistant Examiner—Nicholas David Rosen
(74) Attorney, Agent, or Firm—Fish & Neave; Jeffrey H. Ingerman

(57) ABSTRACT

A computer system for supporting a plan of counterclaim insurance provided to professionals, optionally along with professional liability insurance, deters frivolous professional malpractice claims. The insurance plan pays expenses, for example, of counterclaims for malicious prosecution when a frivolous claim has been made and tried to a judgment for the accused professional, and an independent review concludes that the claim was frivolous. The names of covered professionals are posted on a publicly accessible database. If potential plaintiffs or their attorneys find a potential defendant's name on the database, they may be deterred from filing weaker claims that might be viewed as frivolous. Upon approval of an applicant for counterclaim insurance, the applicant's name is posted to a public database, which may be accessible through the Internet, including the World Wide Web, or alternatively through a dial-up facility.

82 Claims, 79 Drawing Sheets

OTHER PUBLICATIONS

Martin, S.L., "Syndicated Lawsuits: Illegal Champerty or New Business Opportunity?" American Business Law Journal, vol. 30 No. 3, pp. 485–511, Nov., 1992.*

Bennett, P., "Insuring against Patent Infringement," International corporate Law, No. 39, pp. 12–14, Oct. 1994.*

Gerstel, L. et al., "Financial Institutions: Think Insurance Coverage for Claims Alleging Lending Discrimination," Secured Lender vol. 53, No. 6, pp. 22, 165, Nov./Dec. 1997.*

Anon., "A Dip in Malpractice Cases," (Abstract only) Business Week, pp. 109–110, Oct. 3, 1977.*

Lancianese, F.W., "Florida's WAge–Loss Program: Trend Setter or One of a Kind?/Will Open Rating Laws Result in Lower Workers' Comp Premiums?" (Abstract only), Occupational Haxards, vol. 44, No. 7, pp. 65–68, Jul. 1982.*

Anon., "Novamatrix Medical: Announces OEM License Agreement with Squibb Corp.'s SpaceLabs Subsidiary," Business Wire, Jul. 22, 1986.*

Math, S.E. et al., "A Look inside the Actuarial Black Box," Healthcare Financial Management, vol. 46, No. 12, pp. 36–39, Dec. 1992.*

Anon., "Louisiana Panel Urges No–Fault Consideration," Journal of Commerce, Five Star Edition, Section INS, p. 8A, Jan. 16, 1997.*

Anon., "Cal. Insurers to Fight New Low–Cost Proposal," Insurance Regualtor, vol. 10, No. 3, p. 1, Jan. 18, 1999.*

Friedman, D.D., "My Academic Page", , www.best.com/–ddfr/Academic/Academic.html, Sep., 2000.

Friedman, D.D., "Making Sense of English Law Enforcement in the $18^{th}$ Century," www.best.com/–ddfr/Academic/England_18thc.html, Sep., 2000.

Coglianese, C., "Insuring Rule 11 Sanctions," (Abstract Only), Michigan Law Review, vol. 88, No. 2, pp. 344–385, Nov. 1989.

Gross, C.E., "Fee Disputes—What This MAP Subcommittee Can Do for You," Michigan CPA, Col. 42, No. 2, p. 23, 1990.

Robinson, W.J., "Insurance Coverage of Intellectual Property Lawsuits in the Computer Industry," (Abstract Only) International Computer Law Adviser, vol. 6, No. 3–4, pp. 21–42, Dec. 1991–Jan. 1992.

* cited by examiner

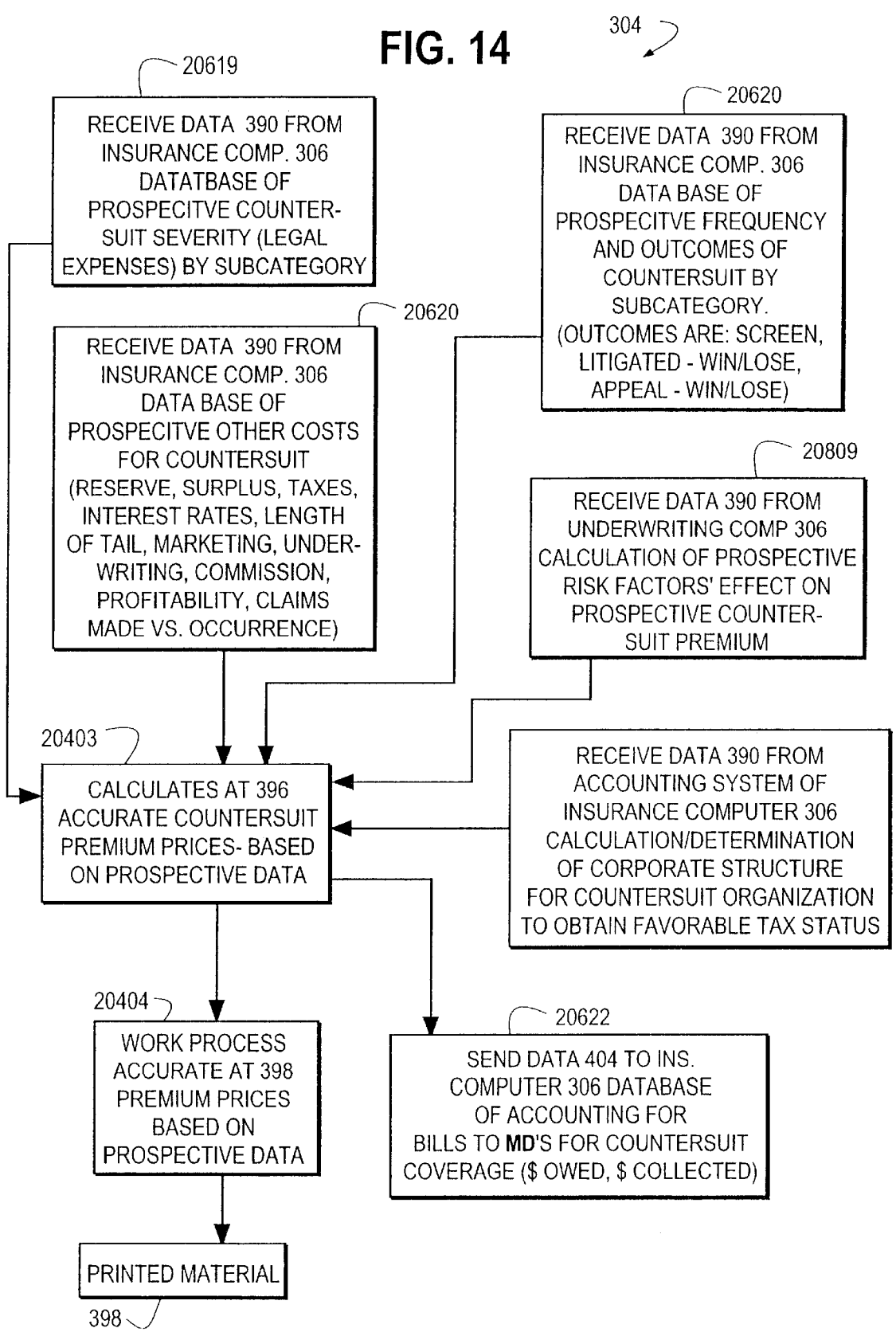

FIG. 15

206202: RECEIVE DATA 390 FROM INSURANCE COMP. 306 DATATBASE OF PROSPECITVE OTHER COSTS FOR COUNTERSUIT (RESERVE, SURPLUS, TAXES, INTEREST RATES, LENGTH OF TAIL, MARKETING, UNDERWRITING, COMMISSION, PROFITABILITY, CLAIMS MADE VS. OCCURRENCE)

20619: RECEIVE DATA 390 FROM INSURANCE COMP. 306 DATABASE OF PROSPECTIVE COUNTERSUIT SEVERITY (LEGAL EXPENSES) BY SUBCATEGORY

20620: RECEIVE DATA 390 FROM INSURANCE COMP. 306 DATABASE OF PROSPECITVE FREQUENCY AND OUTCOMES OF COUNTERSUIT BY SUBCATEGORY. OUTCOMES ARE: SCREEN, LITIGATED - WIN/LOSE, APPEAL - WIN/LOSE)

204052: CALCULATE UNDERWRITING AT 396 INCOME FROM COUNTERSUIT INSURANCE OPERATION BASED ON PROSPECTIVE DATA (INTEREST RATES & LENGTH OF TAIL)

204053: CALCULATE UNDERWRITING AT 396 INCOME FROM COUNTERSUIT INSURANCE OPERATION BASED ON PROSEPECTIVE DATA

204054: INPUT DATA 390 OF OTHER DOLLARS COLLECTED FROM COUNTERSUIT

20621: RECEIVE DATA 390 FROM INSURANCE COMP. 306 DATABASEOF MONEYS COLLECTED FROM DEFENDANT IN COUNTERSUIT AND DISTRIBUTION

204051: CALCULATE AT 396 COUNTERSUIT PROFIT MODELS BASED ON PROSPECTIVE INFORMATION

SEND DATA 402 AND 404 TO INTERMEDIARY COMPUTER SYSTEM 302 AND INSURANCE COMPUTER 306

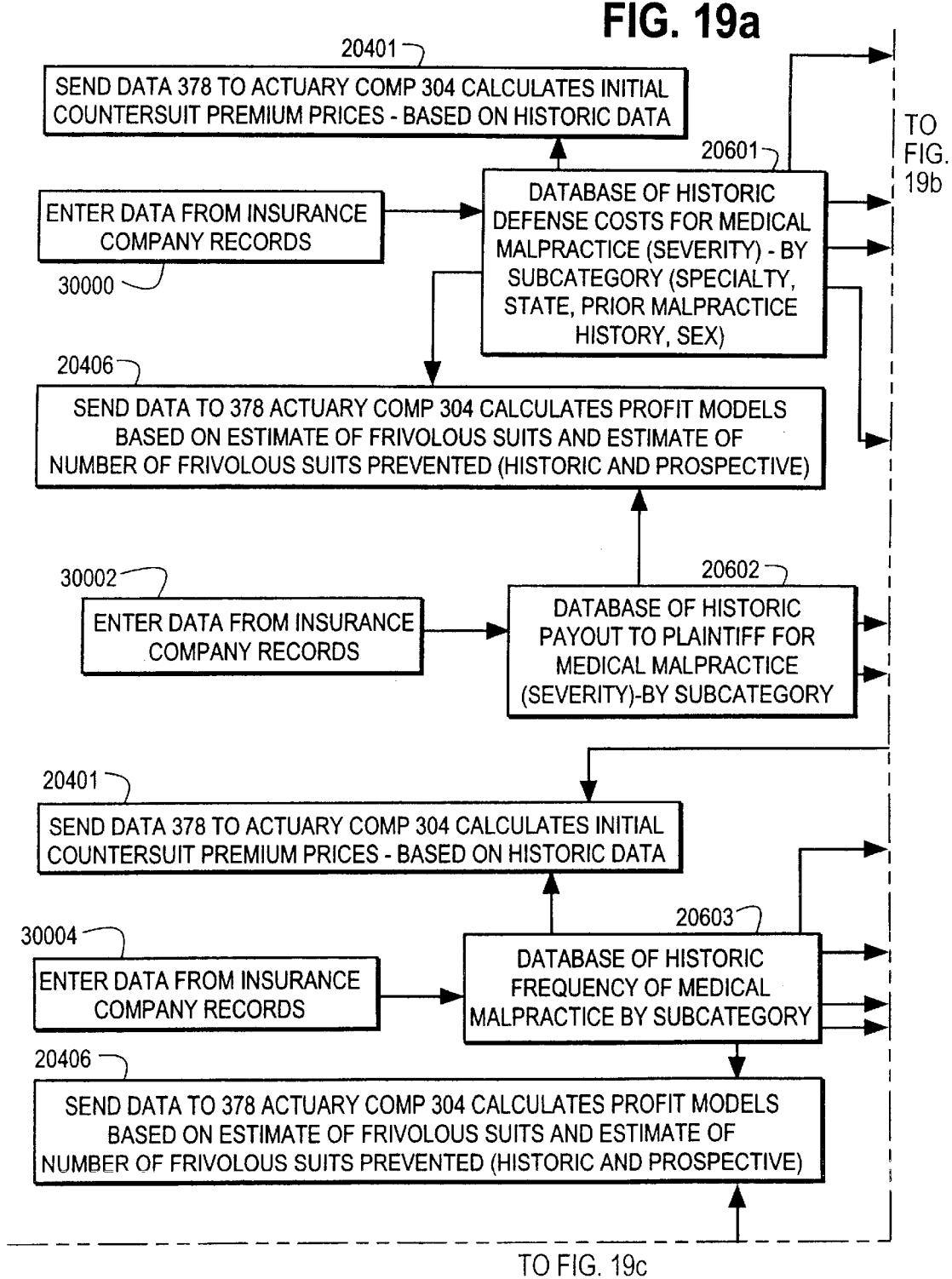

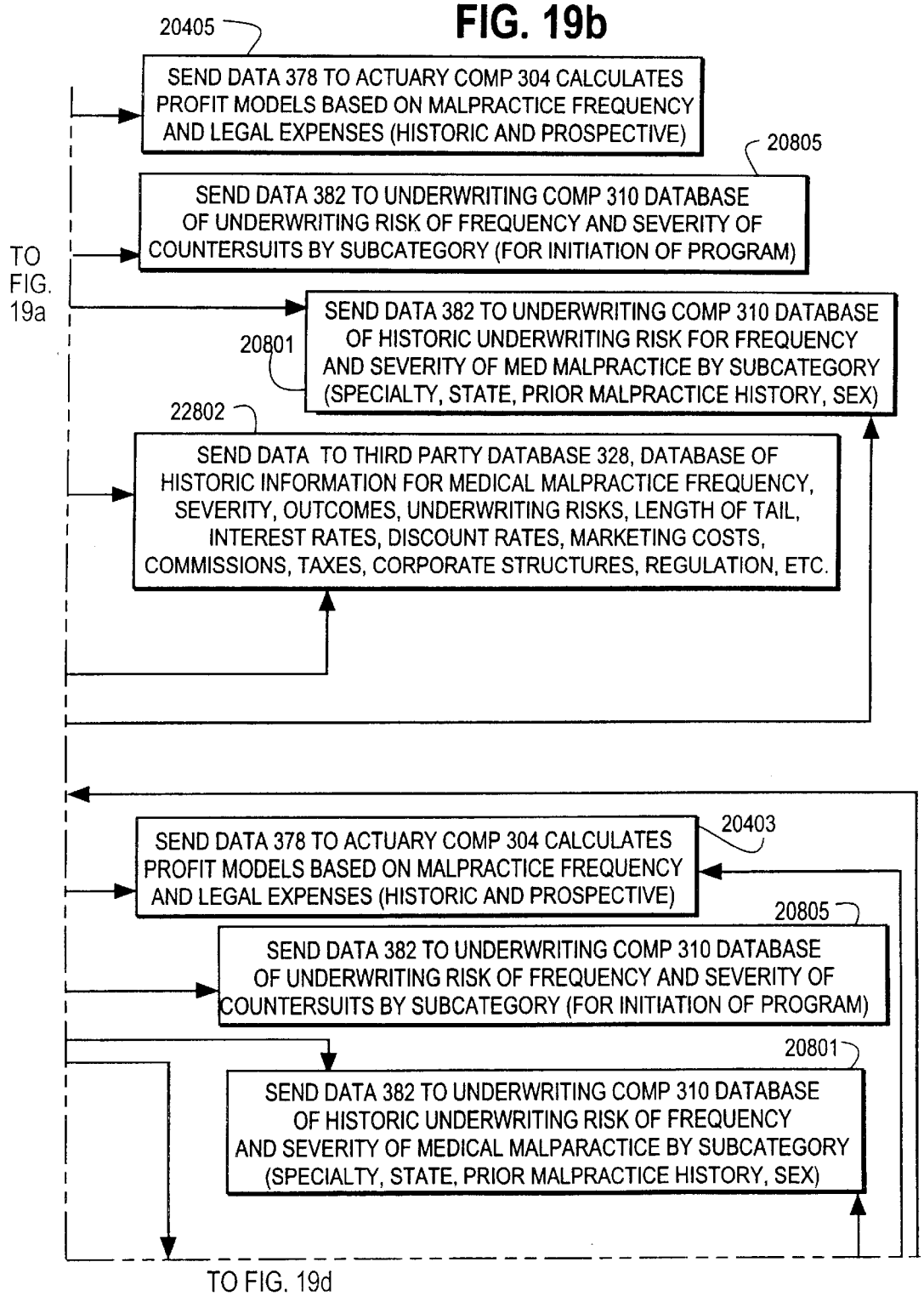

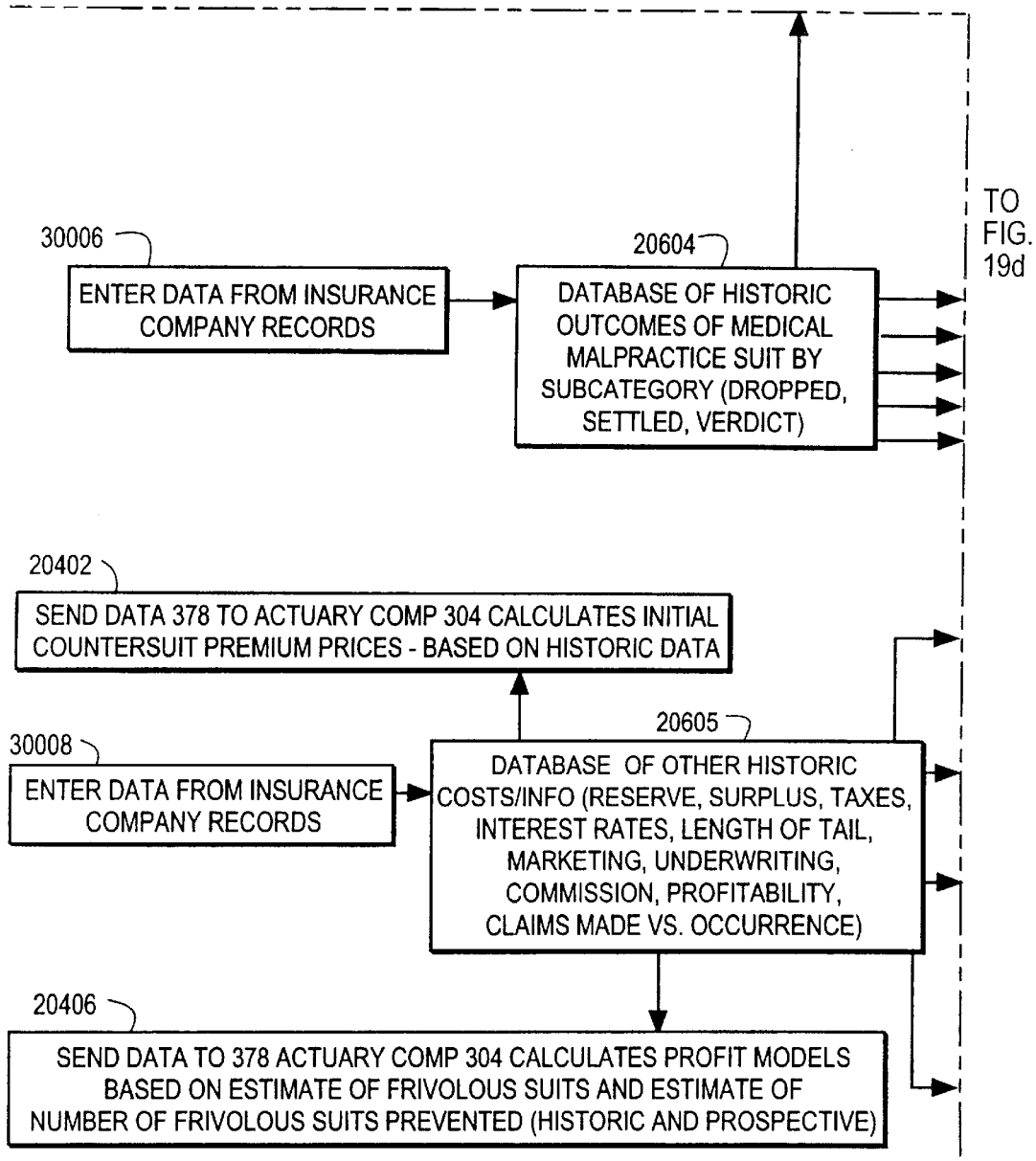

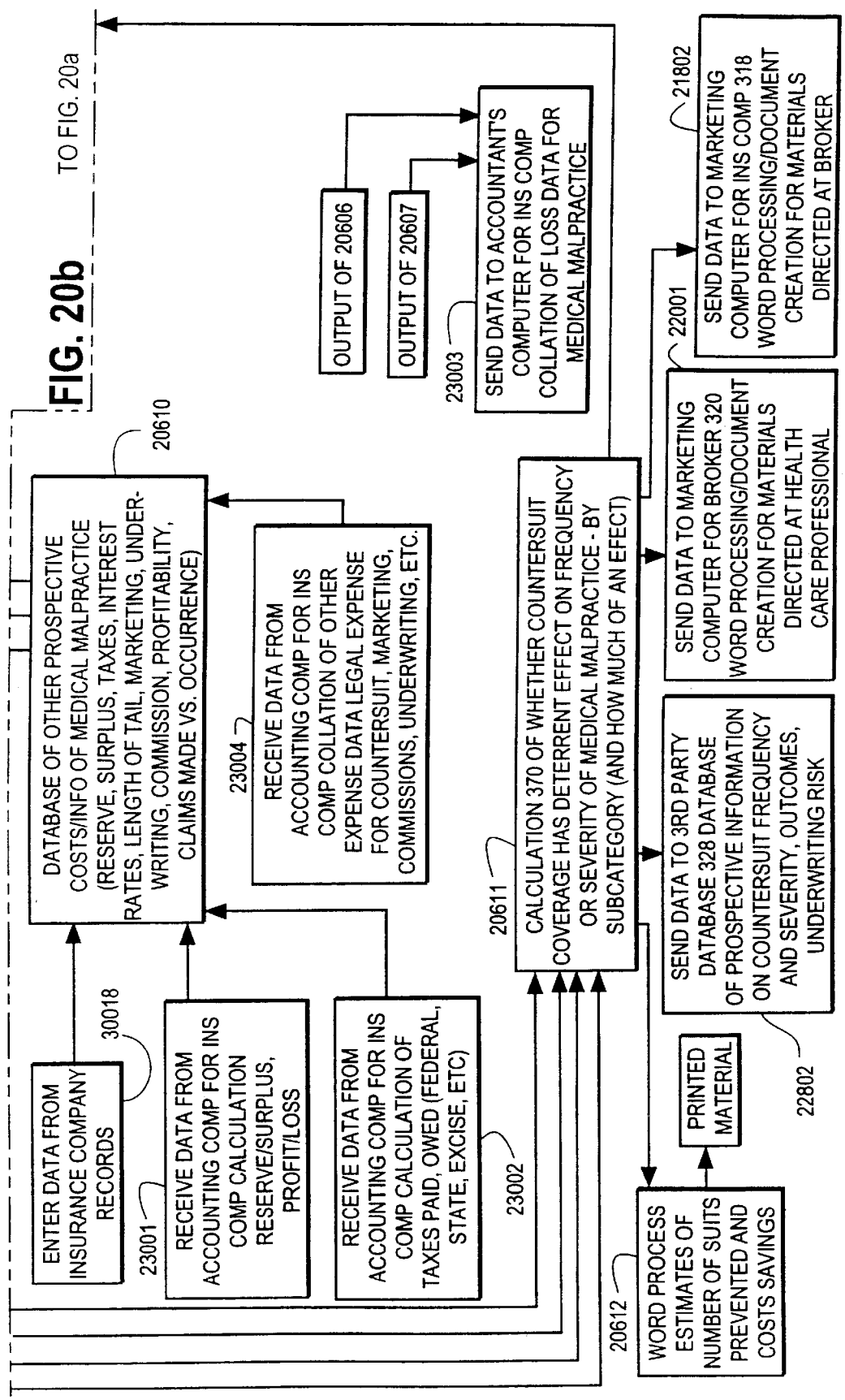

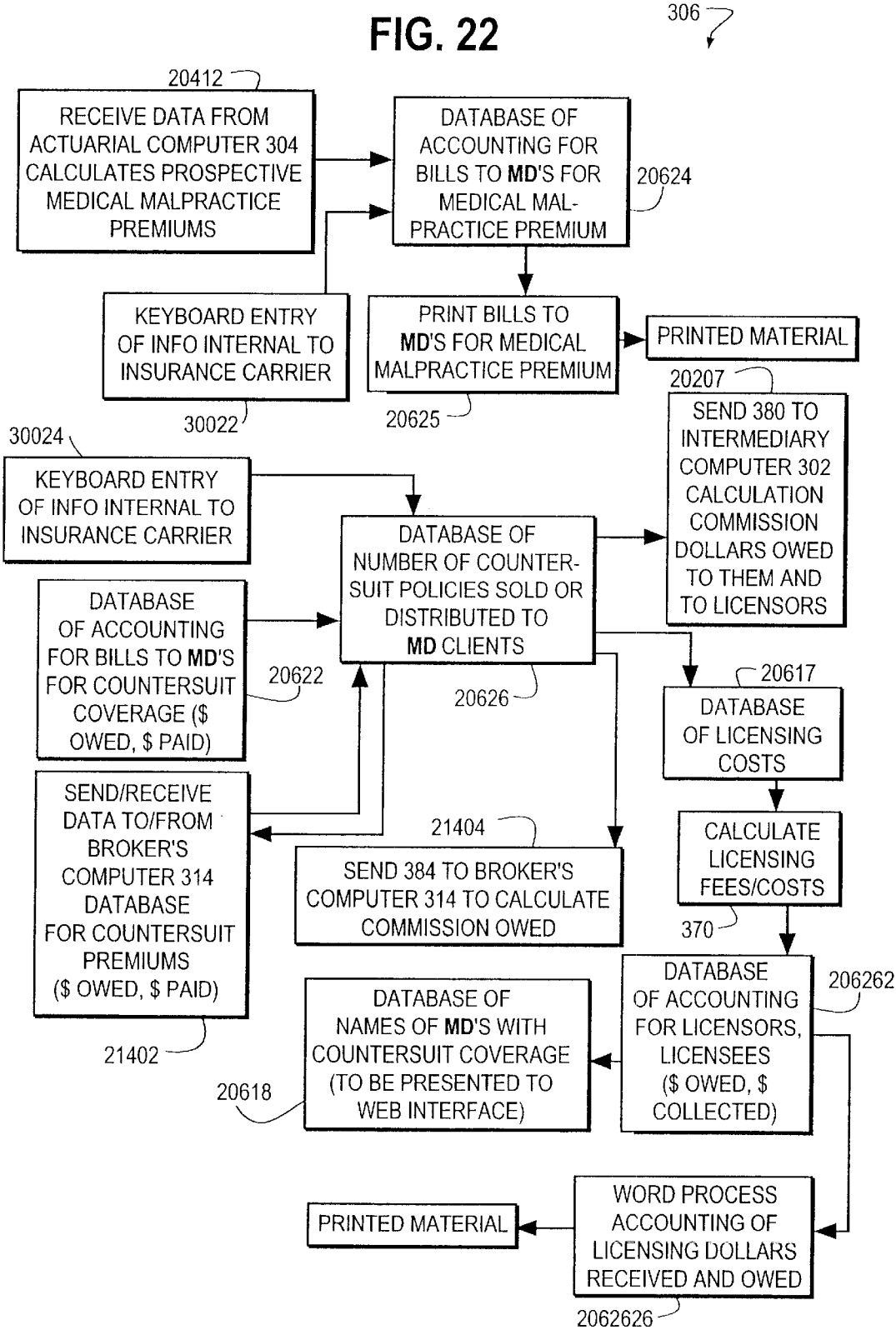

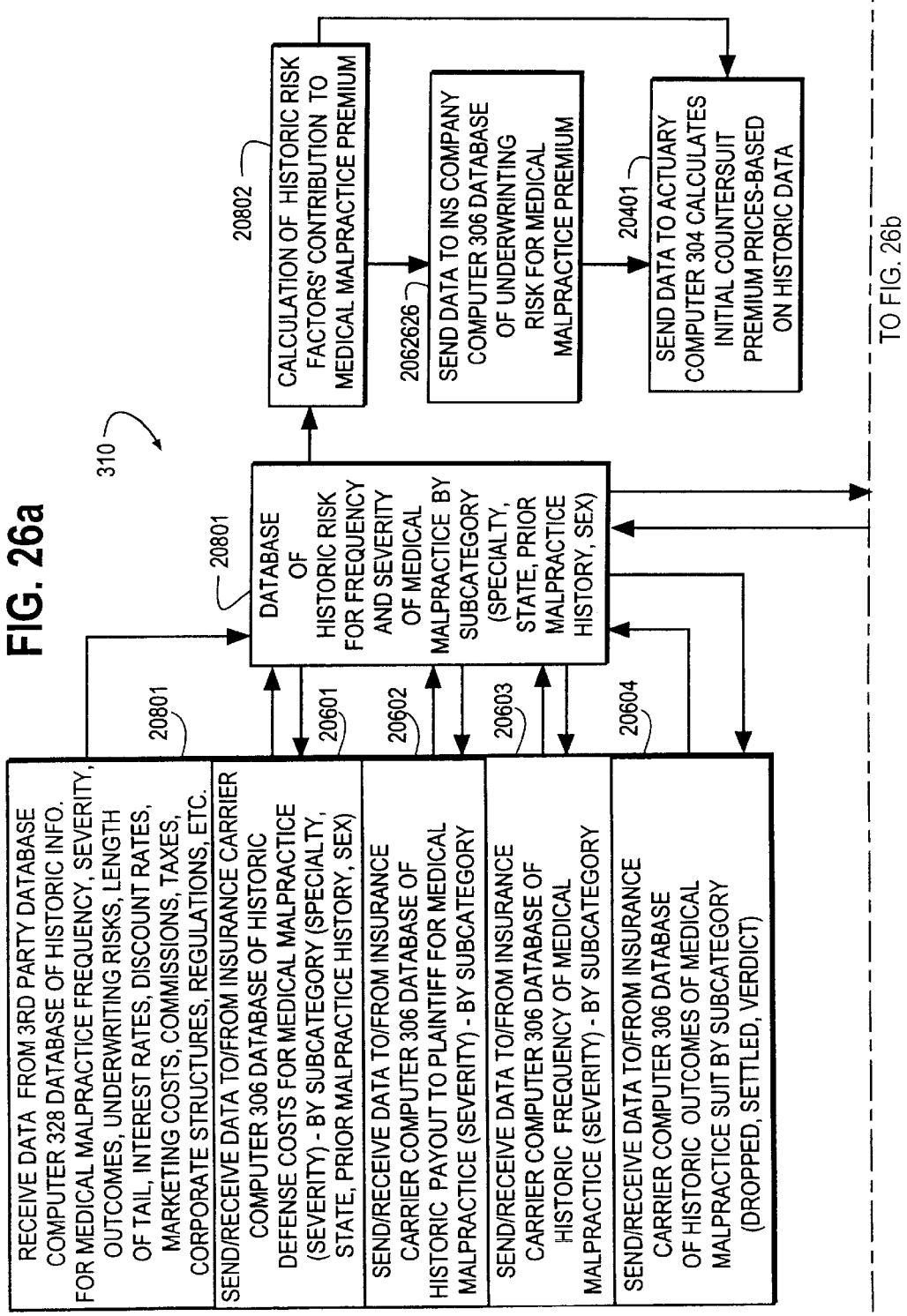

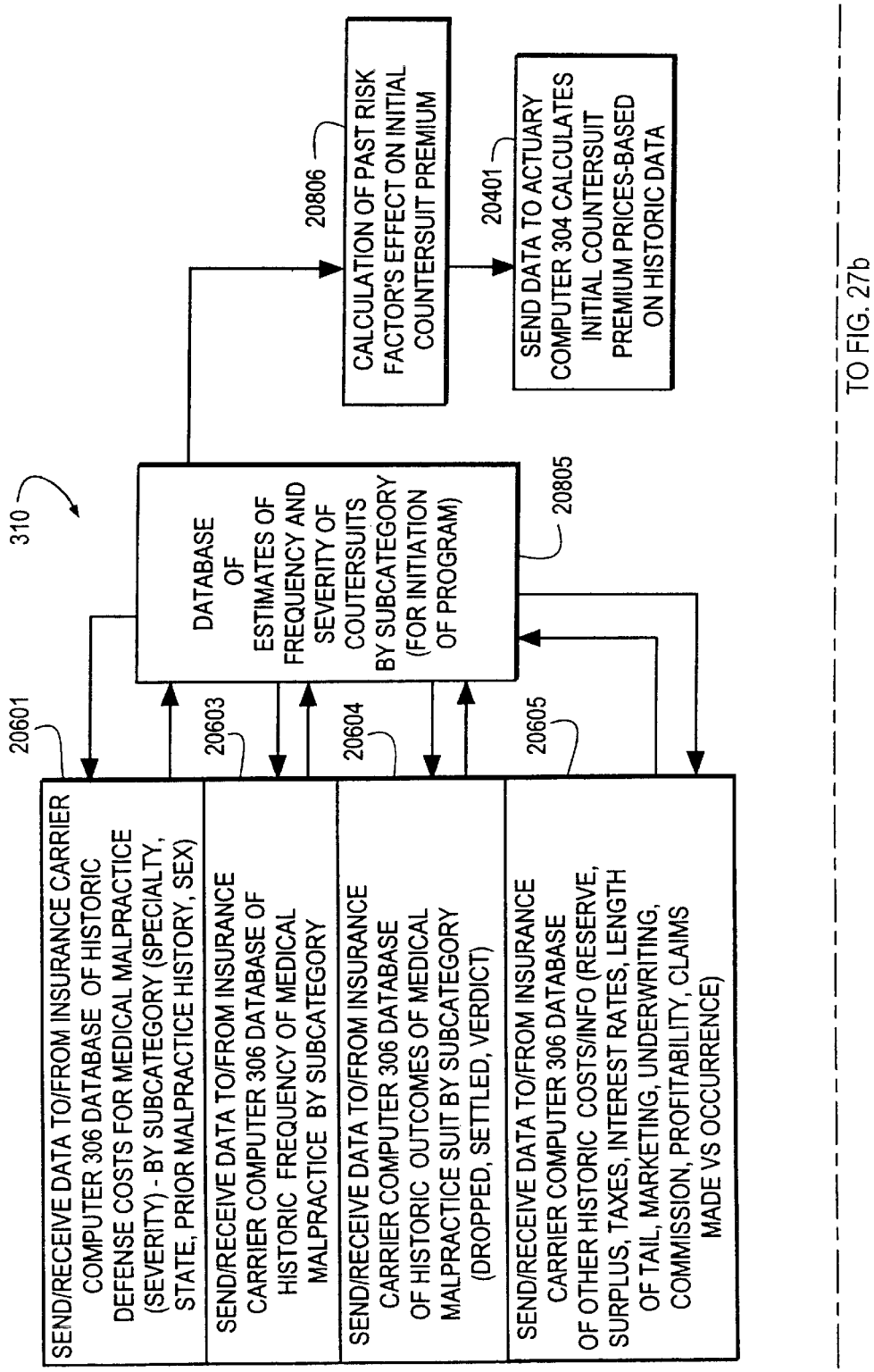

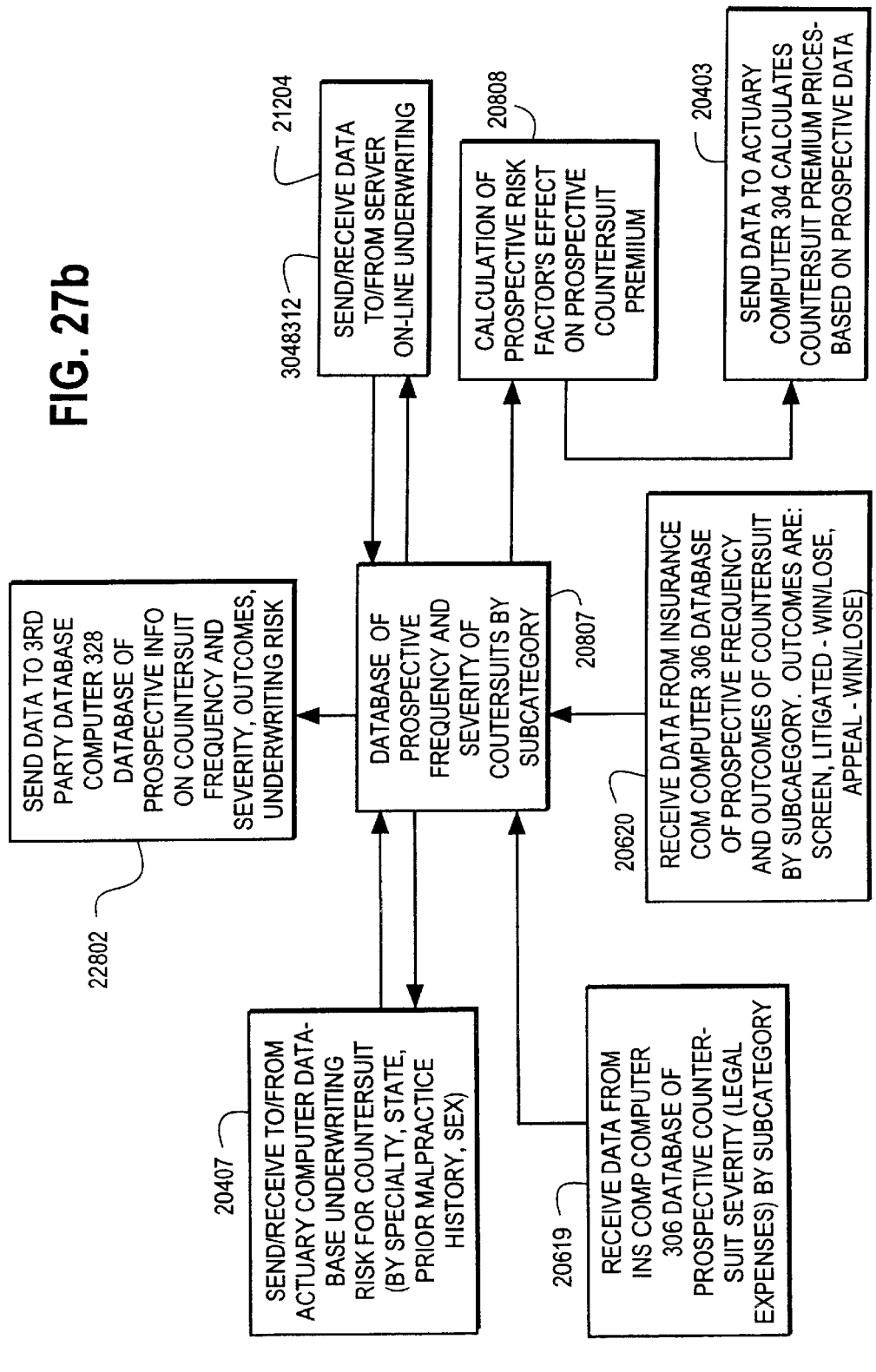

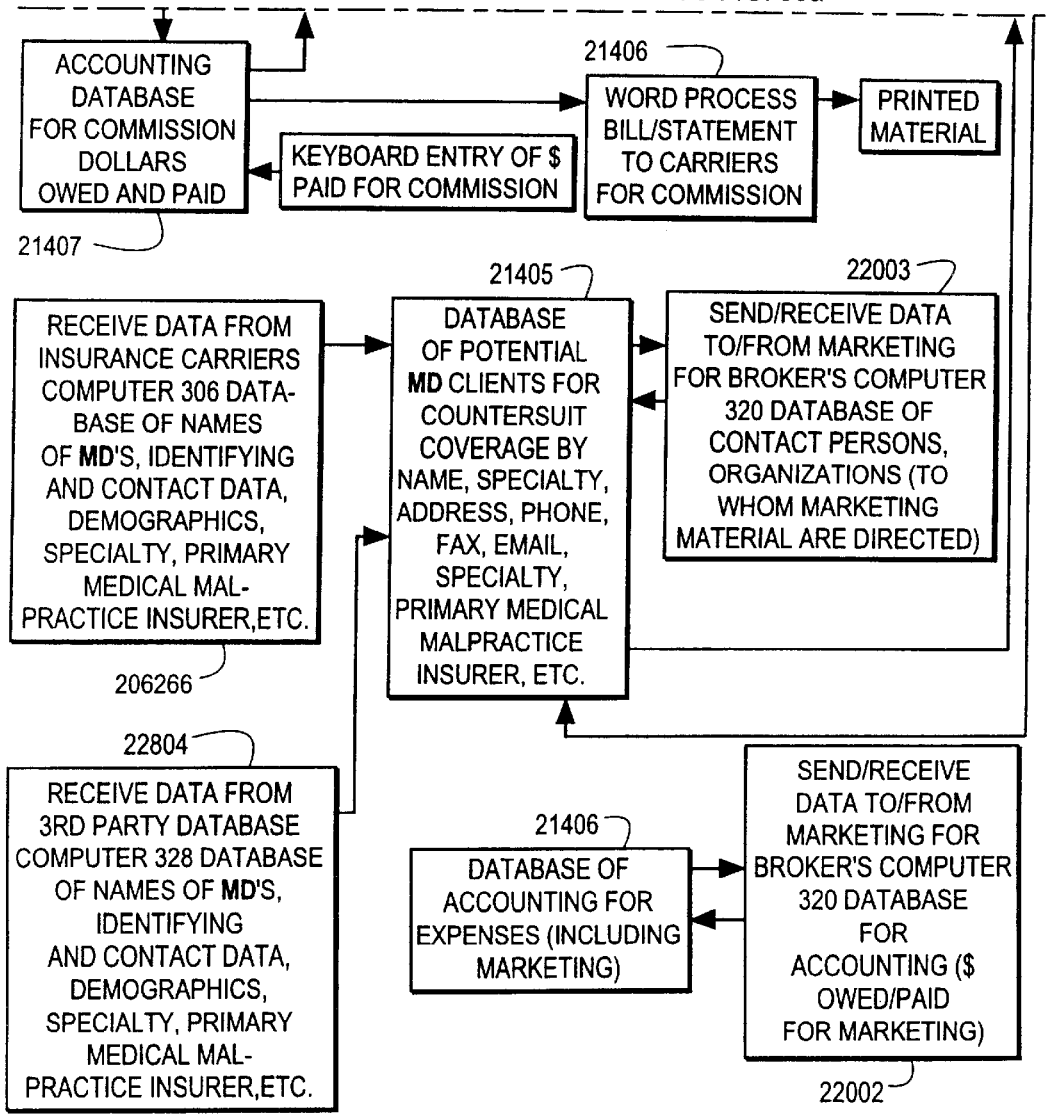

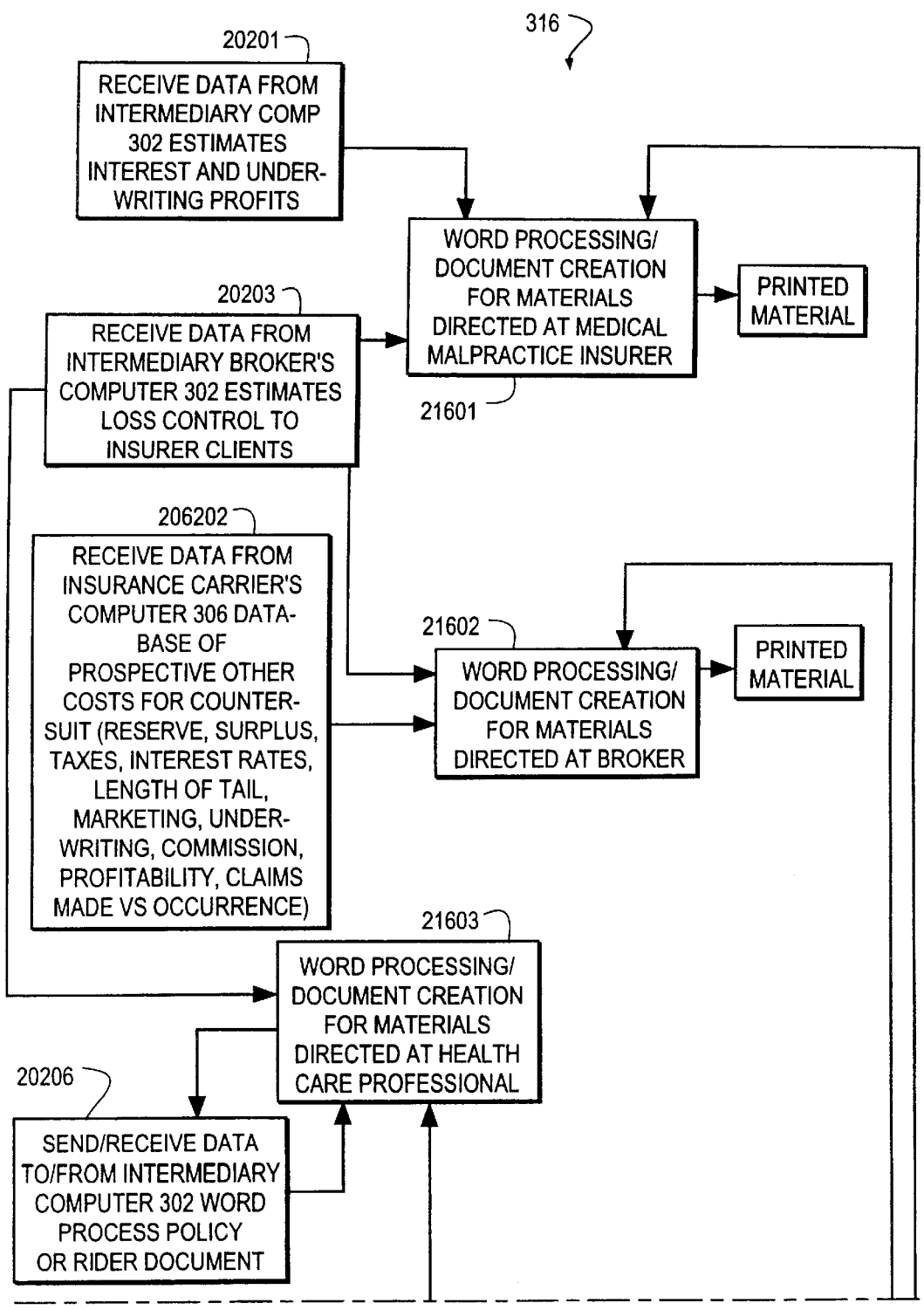

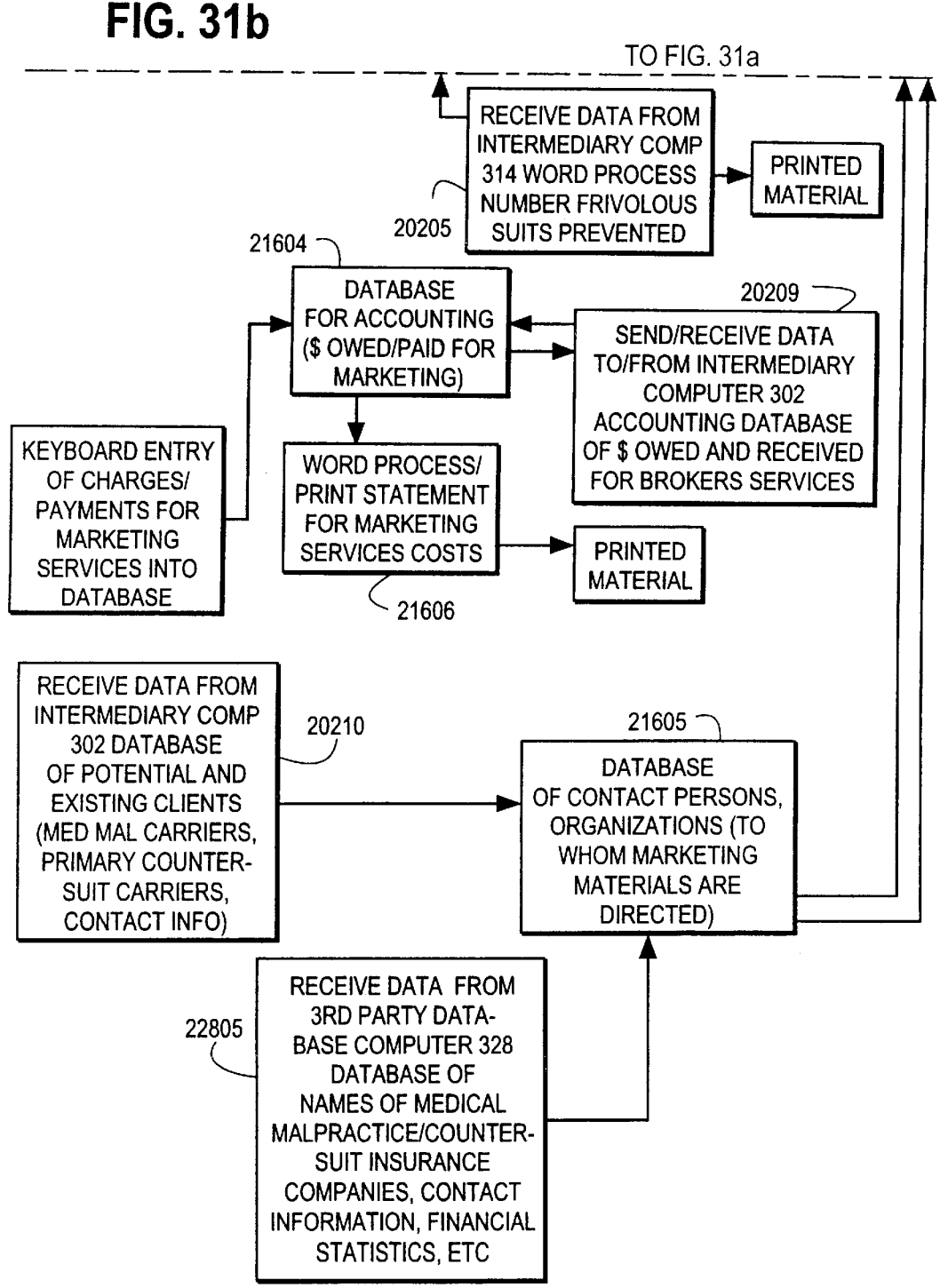

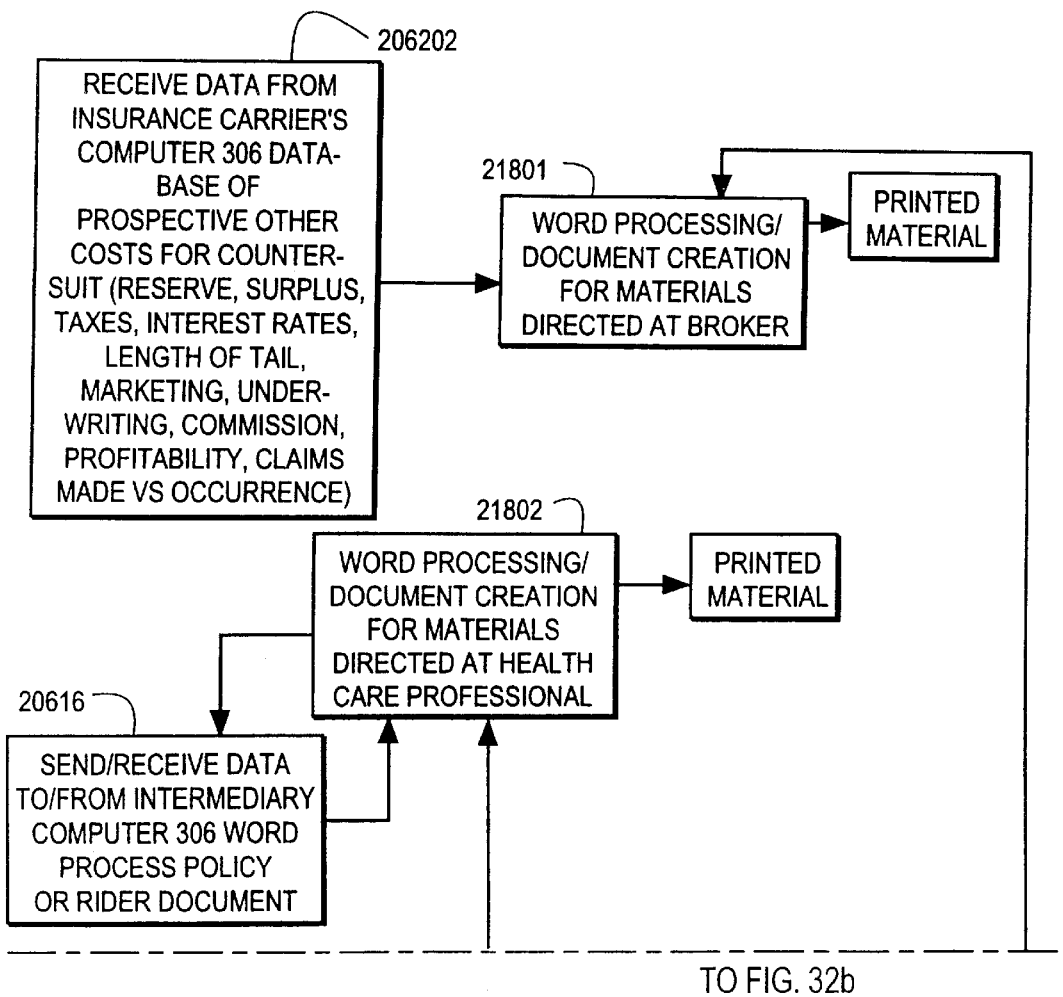

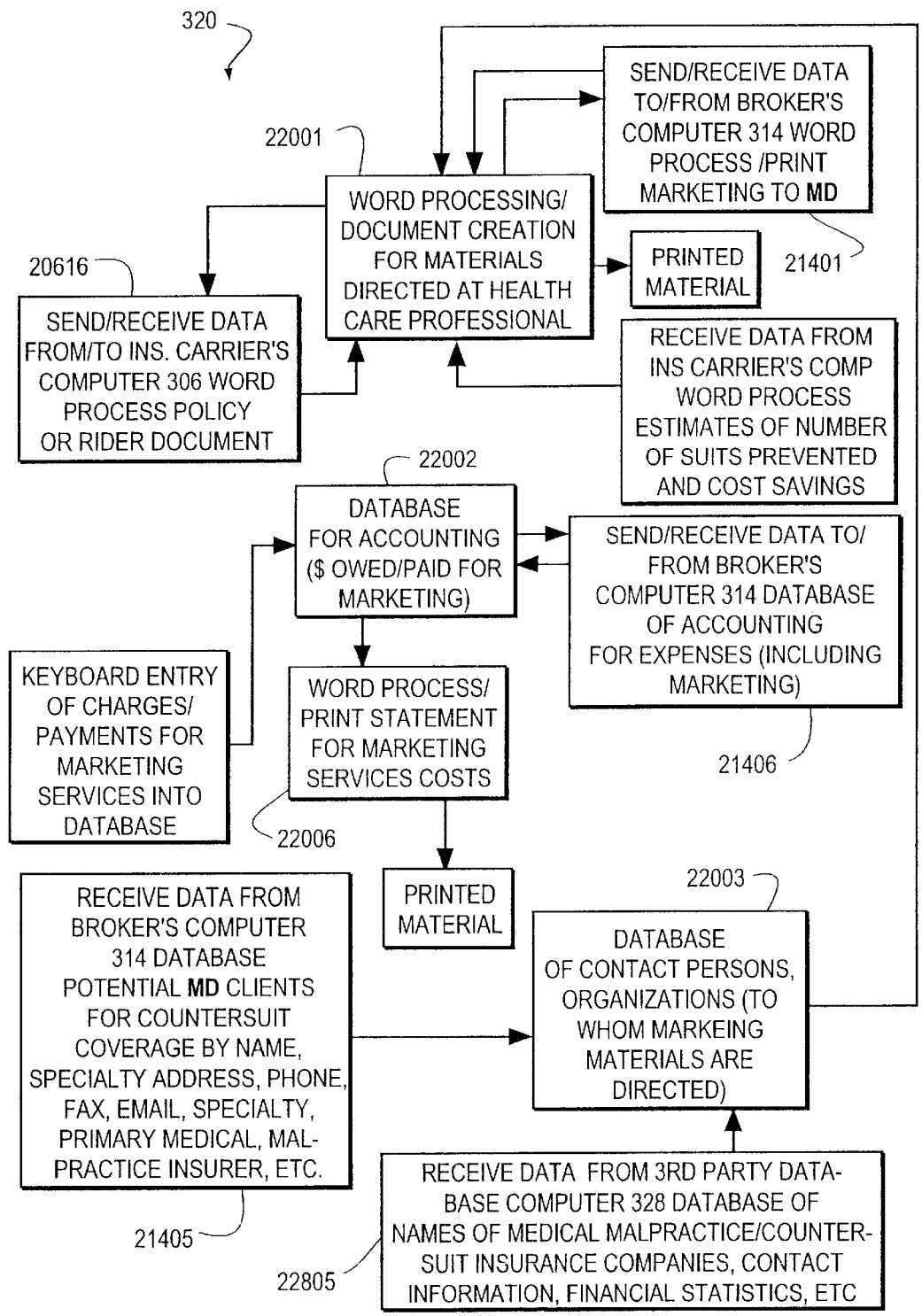

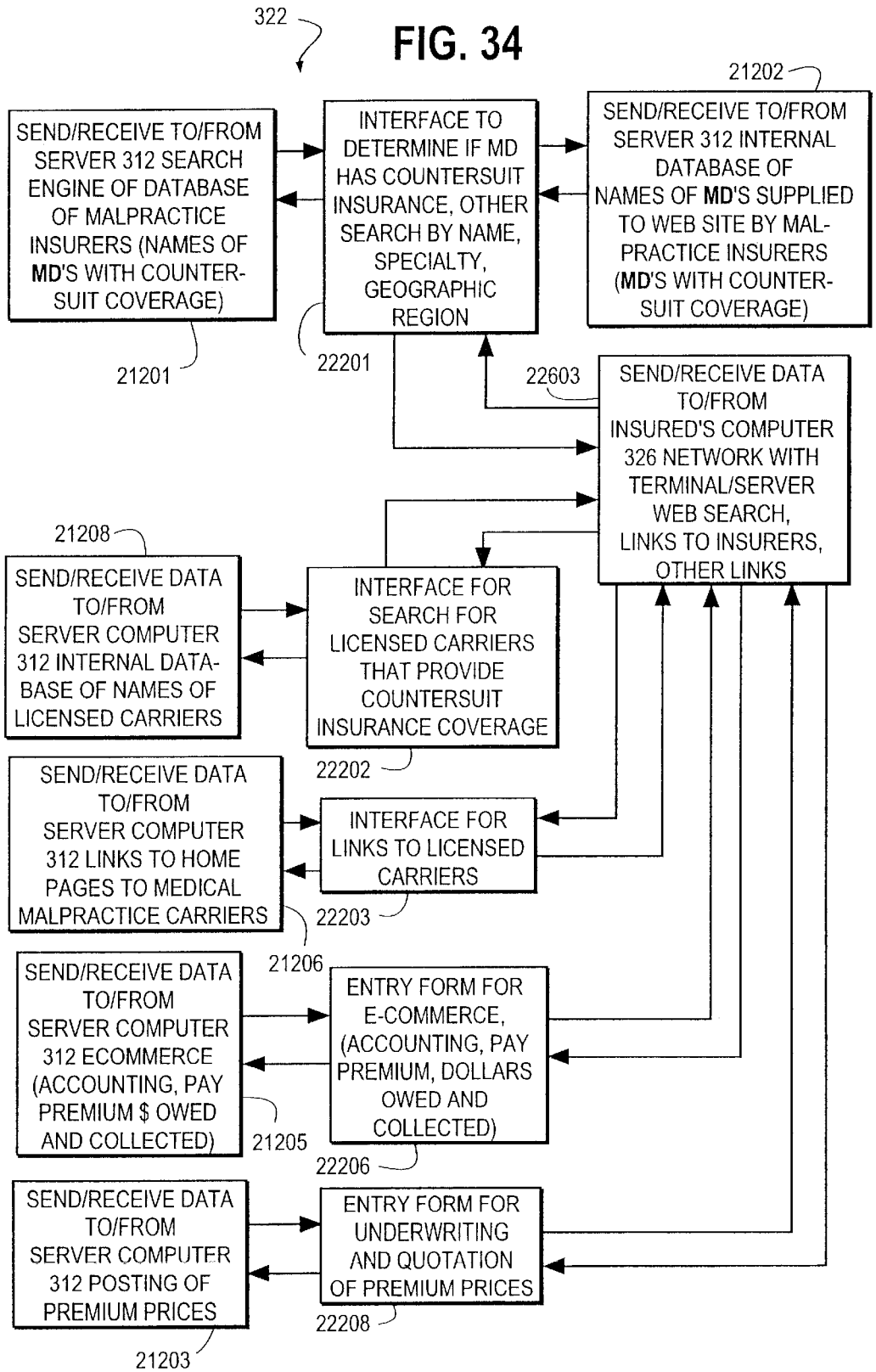

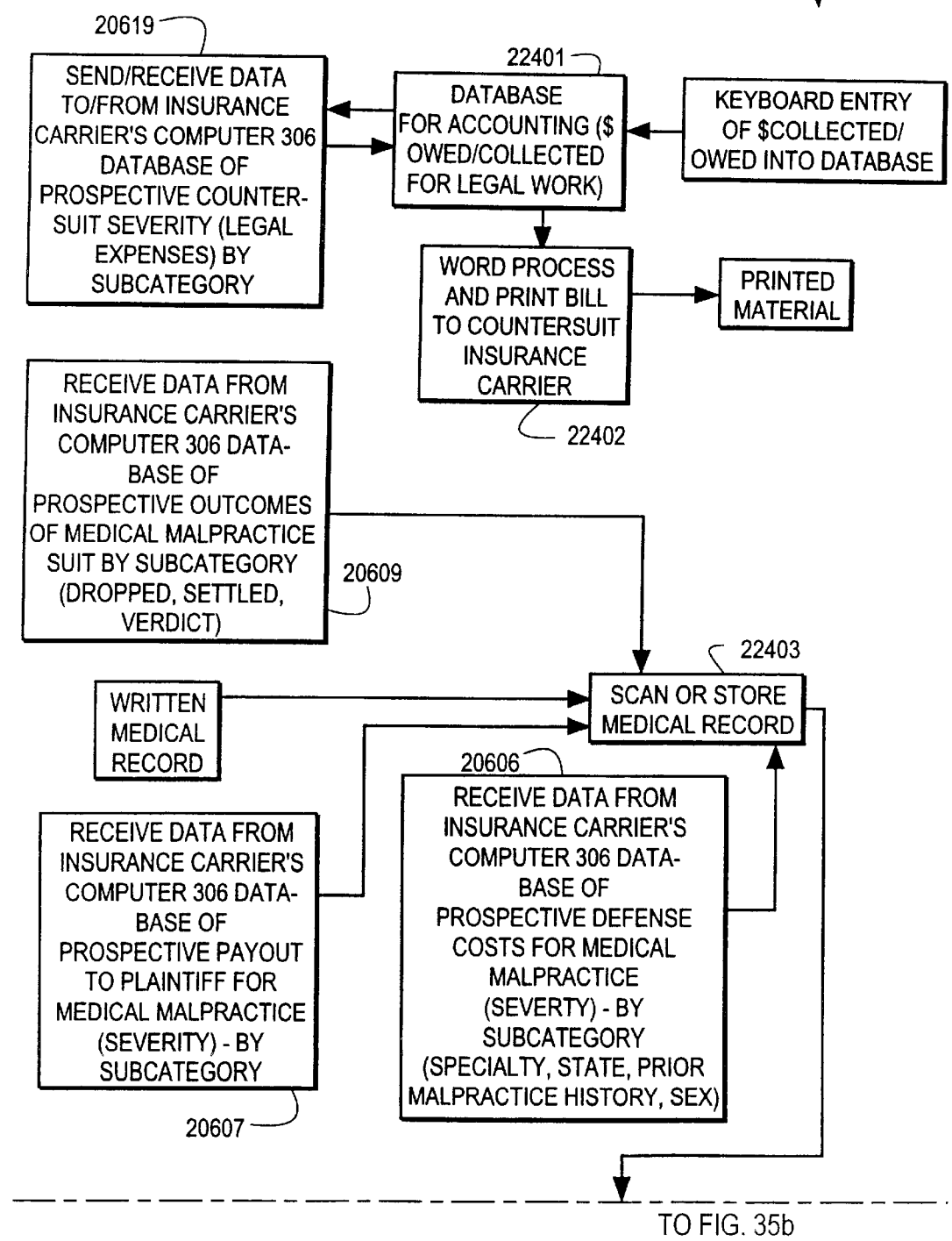

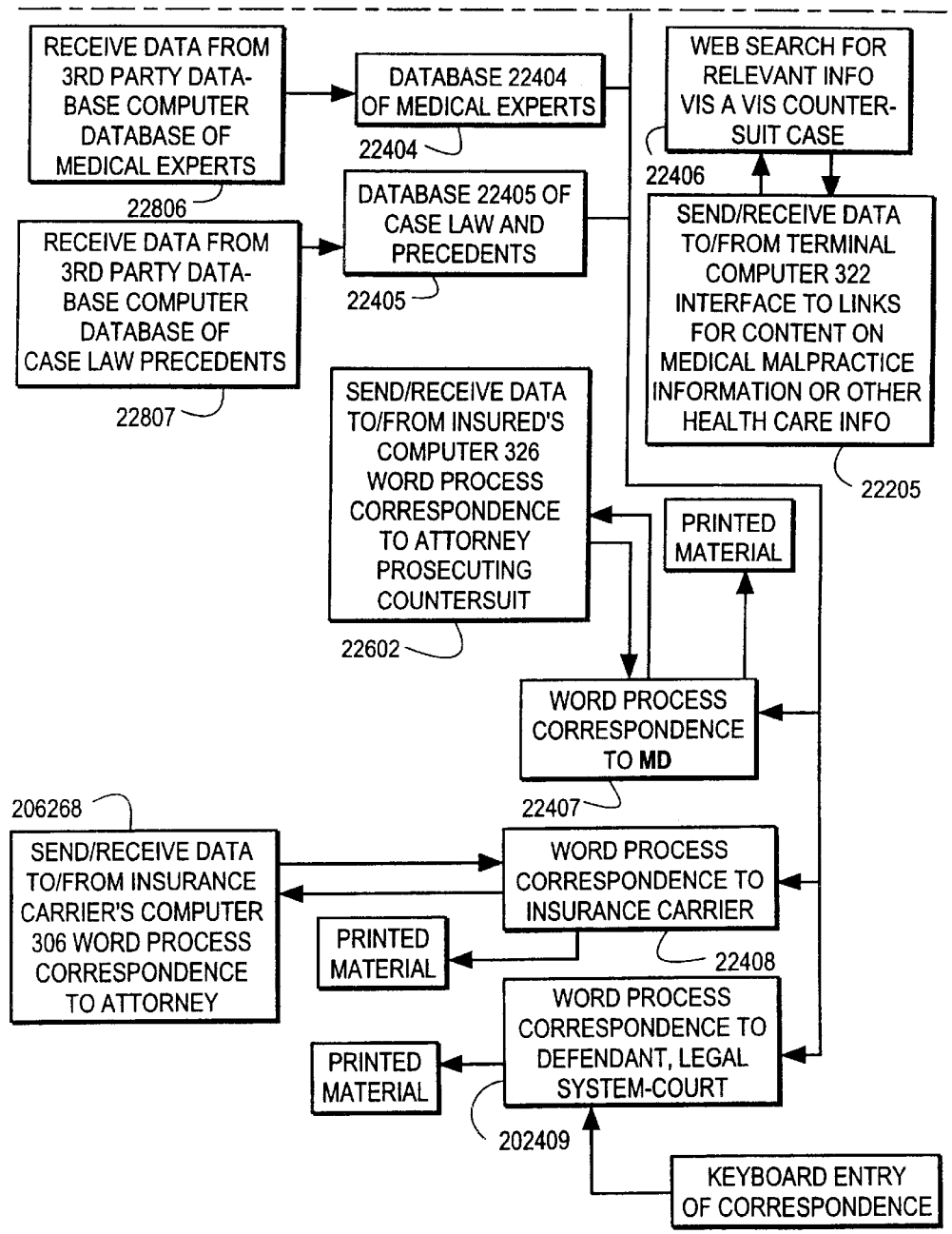

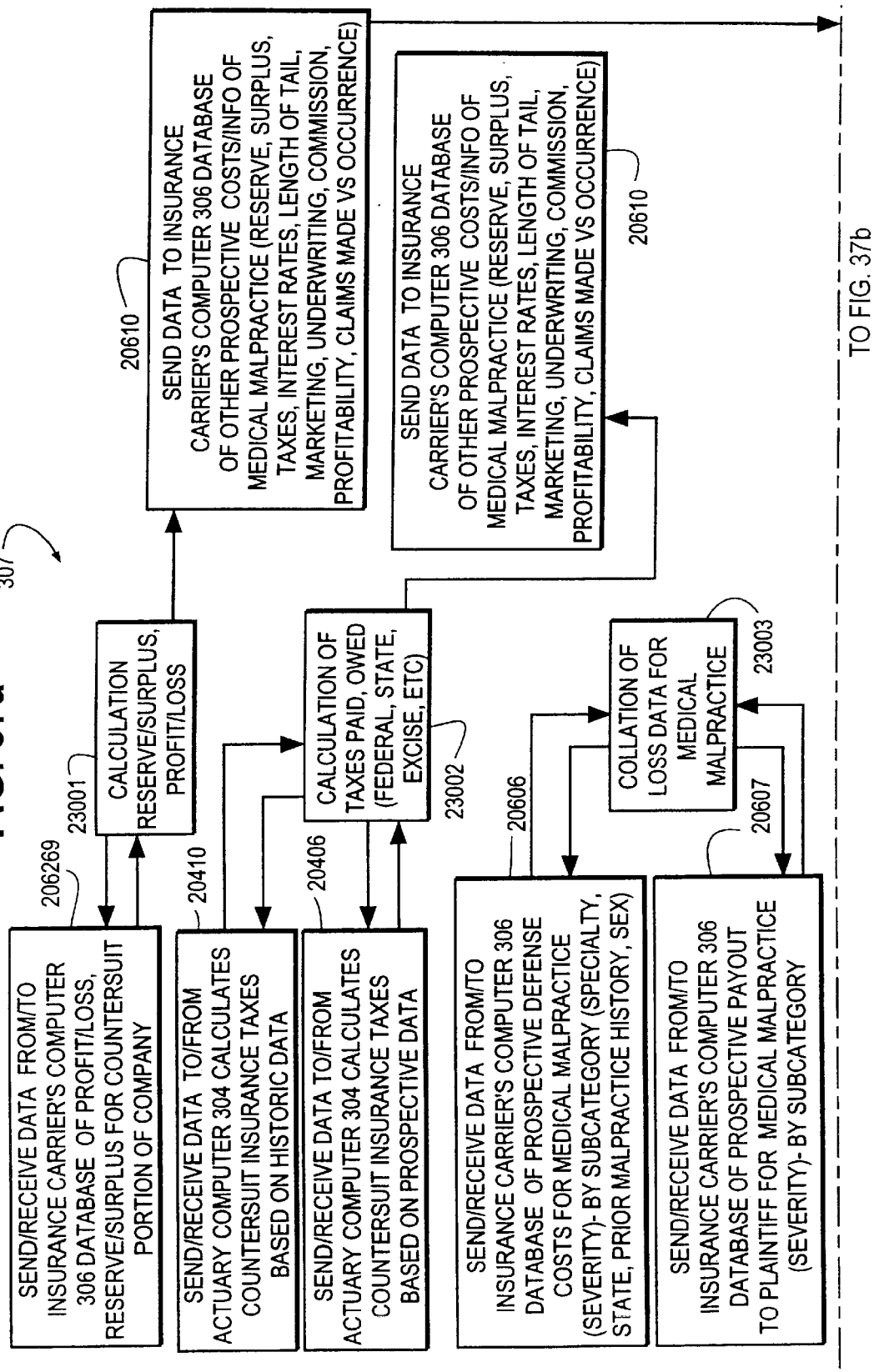

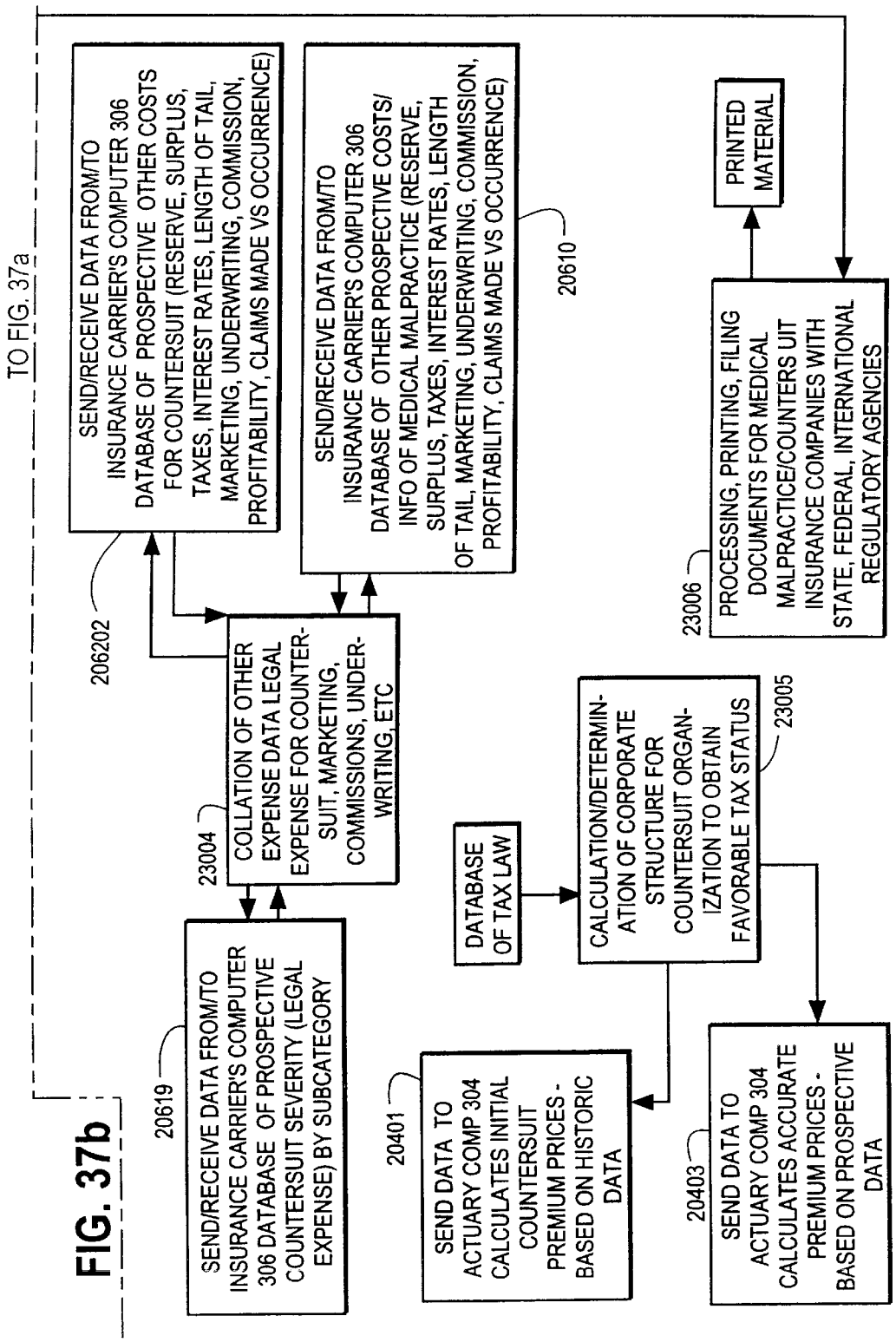

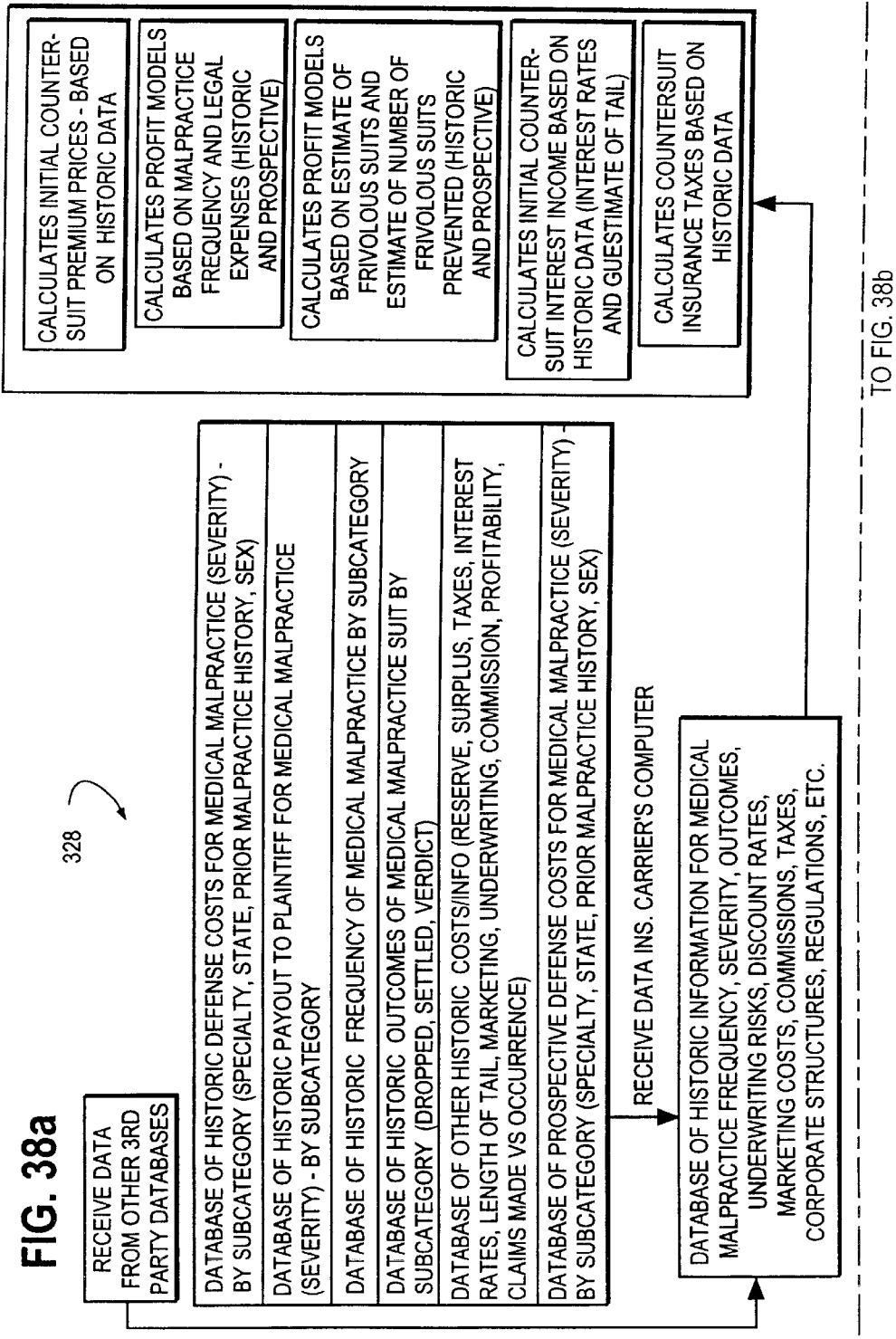

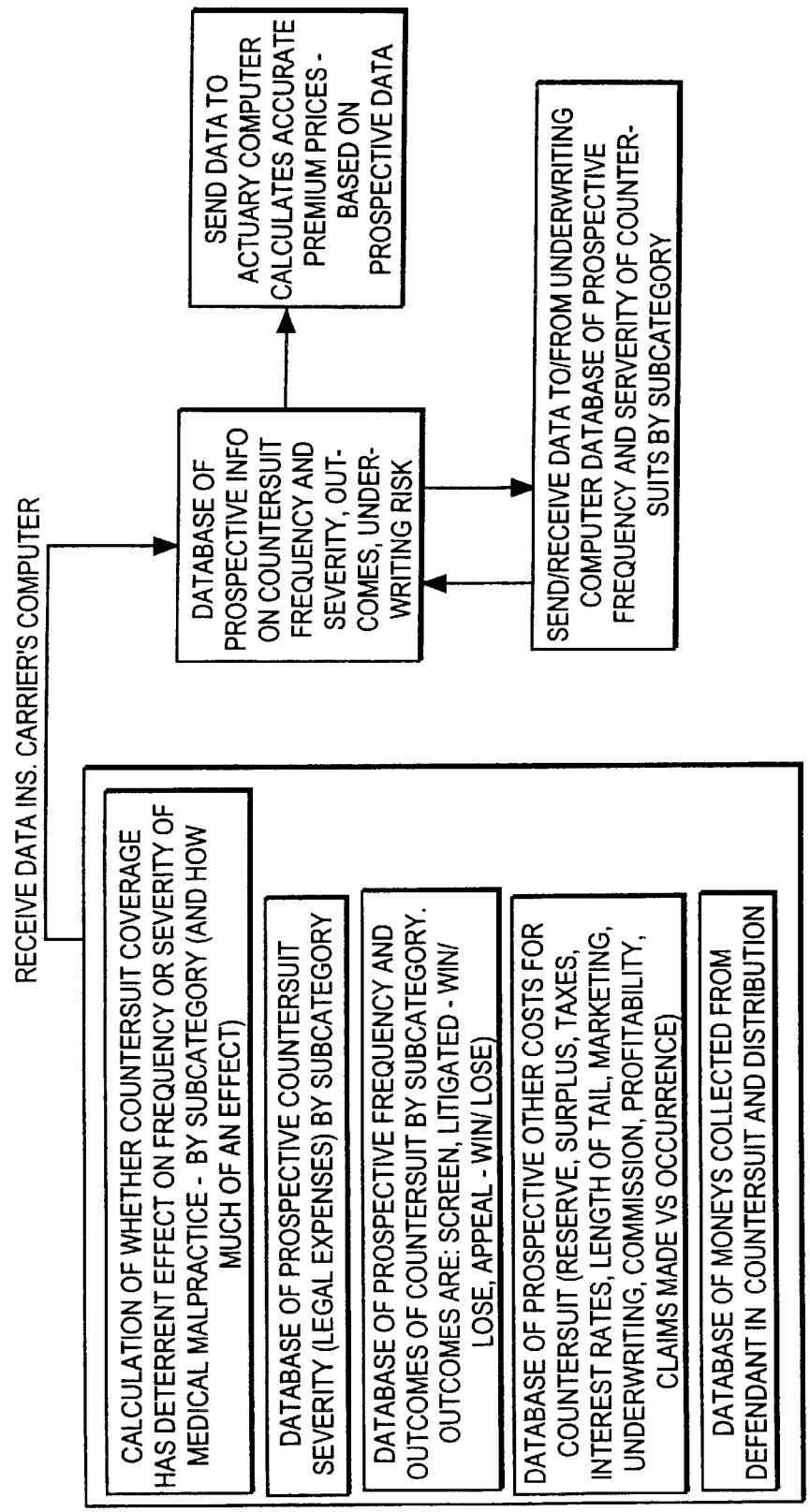

FIG. 40

| MEDICAL JUSTICE | Patent Pending |

Medical Justice is a search engine for determining whether an MD has countersuit coverage as part of his/her medical malpractice liability insurance package. Countersuit insurance is offered by specific medical malpractice carriers as a rider to their basic coverage. This rider will pay specific legal expenses for determination and prosecution of malicious prosecution. MD's are often the target of frivolous suits. Previously, many of these suits resulting in nuisance payoffs to the plaintiff. It was reasoned that it would be less expensive to make a nominal payment than litigate the case.Countersuit insurance was developed to make it easier to determine whether a particular case is frivolous. Countersuit insurance also allows the legal expenses of countersuit to be spread among many.

Malpractice Companies That Offer Countersuit Rider:

Click on the specific carrier to be taken to their web site

Insurance Co "A"
Insurance Co "B"
Insurance Co "C"

Caveats:

1) Search is done by looking at all of the databases for companies with countersuit coverage. These companies are responsible for the accuracy of the informaion.
2) Insurance Company "B" has a strict privacy policy that forbids publishing of names of its insureds. If you are certain that a particular MD is covered by this company, there is a high probability that this MD will have countersuit coverage.
3) Who is insured by any given carrier changes from day to day. We depend upon the malpractice carriers to provide us with these changes in a timely fashion. We cannot guarantee that these changes will be reported immediately.
4) We encourage MD's to check the system frequently to verify that their name is included in our search engine. (This assumes that your carrier has a countersuit rider). Please e-mail us or call us if your name is not listed and you believe it should be. If we obtain enough "calls" that certain carriers are less than accurate, we will post the names of those carriers on this site.

Click Here to Determine if MD Has Countersuit Coverage          Contact Us

Click Here to Find Out More About Malpractice Issues

| Paid Advertisement #1 | Paid Advertisement #2 | Paid Advertisement #3 |

Inquirer sees screen that lets him know that Ben Dover is indeed covered by Countersuit Policy. This screen is generated by server in basement in Indiana and viewed on any browser.

FIG. 43a

Web Server in Facility of Major Web Hosting Vendor:

1) Logo
2) Description of What We Do
3) Caveats: Our data is only as good as the insurance companies that supply the information to us. Some companies have privacy policy and will NOT release names of their insureds. These companies are "x,y,z..."
4) Search Form: Fill in Name, City, and Specialty of MD (Goal is to find out if MD is covered by countersuit policy)(Results will be on another page)
5) Our records are updated monthly
6) Alternative search by name of carriers : returns results of which carriers have and do not have countersuit coverage Site is Hosted by Major Vendor

| Last Name | |
|---|---|
| First Name | |
| City | |
| State | |

Please fill in the identifying information of the MD you are searching for

Request for Search

| Last Name | Dover |
|---|---|
| First Name | Jonah |
| City | Houston |
| State | Texas |

Please fill in the identifying information of the MD you are searching for

User Fills in the Blanks As Best They Can

Search of Internal Database

See Next Page → TO FIG. 43b

Insurance Carriers Send Records of Insureds to Web Site Monthly. Web Site Maintains its Own Internal Database Database of Insurance Company "A"

| Last | First | Address | City | State | Specialty |
|---|---|---|---|---|---|
| Apple | John | 1622... | Seattle | WA | General Pr |
| Bates | Bill | 2233... | LA | CA | ENT |
| Crum | Norman | 5466... | Phoenix | AZ | Ophthal. |
| Dover | Ben | 2121... | Houston | TX | Proctology |
| Franklin | George | 76767... | Dallas | TX | Radiology |
| Smith | Jack | 233... | St. Paul | MN | Hand Surg |

Database for Insurance Company "A" is in New York and Updates Web Site Monthly

Database of Insurance Company "B"

| Last | First | Address | City | State | Specialty |
|---|---|---|---|---|---|
| Angel | John | 3247... | SF | CA | Chest Surg |
| Brown | David | 2945... | Denver | CO | Gen Pract |
| Damon | Daniel | 754... | Boston | MA | Plastic |
| Elder | Tom | 2567... | Waco | TX | Pediatrics |
| Harm | Ken | 3457... | Juneau | AK | Ob/Gyn |
| Miner | Robert | 9566... | Raleigh | NC | Gen Pract |

Database for Insurance Company "B" is in LA and Updates Web Site Monthly

Database of Insurance Company "C"

| Last | First | Address | City | State | Specialty |
|---|---|---|---|---|---|
| Akron | Jim | 4433... | Tuscon | AZ | Gen Surg |
| Calder | Alex | 2345... | Detroit | MI | Allergy |
| Drummy | Sam | 986... | El Paso | TX | Neurology |
| Fisher | Eric | 4345... | St. Loius | MO | NS |
| George | Neil | 12354... | KC | MO | Cardiology |
| Jones | Robert | 345... | Miami | FL | Gastroent |

Database for Insurance Company "C" is in Houston and Updates Web Site Monthly

Database of Insurance Company "D"

| Last | First | Address | City | State | Specialty |
|---|---|---|---|---|---|
| Alter | Susan | 3444... | Portland | OR | General Pr |
| Bore | Dana | 3866... | Chicago | IL | Urology |
| Calor | Pedro | 4545... | Omaha | NE | Ob/Gyn |
| Dover | John | 3455... | Atlanta | GA | Spine Surg |
| Farber | Frances | 2005... | Tampa | FL | Endocrinol |
| Garcia | Ellen | 3444... | Mobile | AL | Rheumatol |

Database for Insurance Company "D" is in Miami and Updates Web Site Monthly

FIG. 44

CONTINUED FROM PREVIOUS PAGE

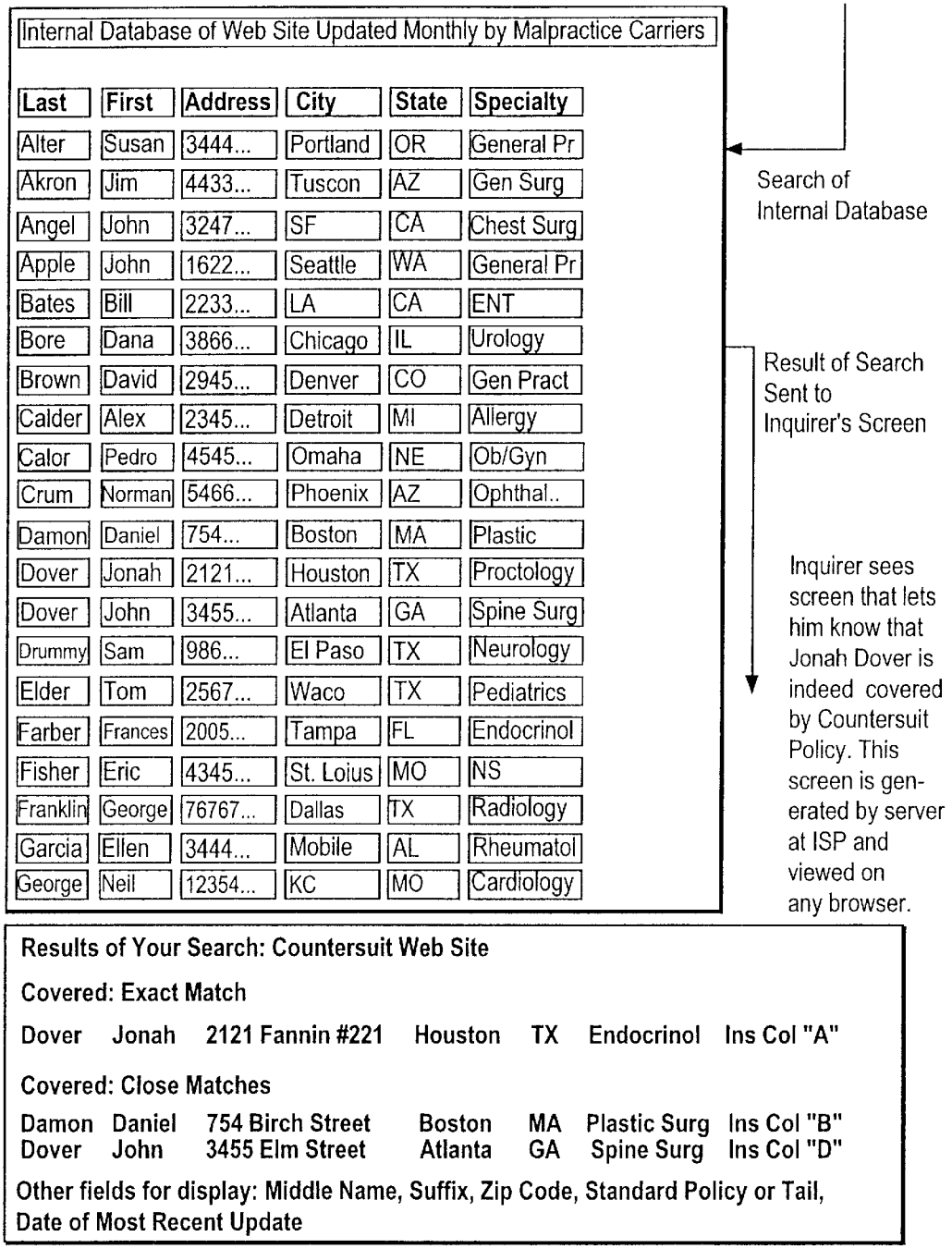

Alternative search mechanism(s):
If we don't match the name of a city, we can use first 3 digits of zip code for geographic identifying information. If searcher knows the name of the target's carrier, he can search by carrier and avoid inputting name, city, etc. The results would describe whether that malpractice carrier offered countersuit insurance to its policy-holders.

In summary, web site contains an internal database updated monthly by the licensed malpractice carriers that use countersuit protection as a rider. The database also contains information about the carriers.

FIG. 45

Estimate of Potential Defense Costs and Indemnity Savings to an Insurer due to Countersuit Insurance

Effect on Med Mal Premium from No Indemnity Claims (1) Med. Mal. ALAE / Earned Premium — 28%
(2) Ratio of Expense for No Indemnity claims to All Claims — 53%
(3) Ratio Frivolous claims to total no indemnity claims — 50%
(4) % of frivolous eliminated by existence of countersuit coverage — 50%
(5) Effect on Med. Mal. Premium — 3.7%
    = (1) x (2) x (3) x (4)

Effect on Med. Mal. Premium with varying assumptions for (3) and (4) above (4) % of frivolous eliminated

|  |  | 25% | 35% | 45% | 50% | 55% | 65% | 75% |
|---|---|---|---|---|---|---|---|---|
| (3) % frivolous | 25% | 0.9% | 1.3% | 1.7% | 1.8% | 2.0% | 2.4% | 2.8% |
|  | 35% | 1.3% | 1.8% | 2.3% | 2.6% | 2.8% | 3.4% | 3.9% |
|  | 45% | 1.7% | 2.3% | 3.0% | 3.3% | 3.7% | 4.3% | 5.0% |
|  | 50% | 1.8% | 2.6% | 3.3% | 3.7% | 4.1% | 4.8% | 5.5% |
|  | 55% | 2.0% | 2.8% | 3.7% | 4.1% | 4.5% | 5.3% | 6.1% |
|  | 65% | 2.4% | 3.4% | 4.3% | 4.8% | 5.3% | 6.2% | 7.2% |
|  | 75% | 2.8% | 3.9% | 5.0% | 5.5% | 6.1% | 7.2% | 8.3% |

Notes: (1) based on Schedule P for Medical Malpractice - Occurrence and Claims - Made (Exhibit 6)
(2) based on medical malpractice close claim statistics in "PIAA Claim Trend Analysis" (Exhibit 5, page 1)
(3), (4) based on judgment

FIG. 46

Estimate of Potential Defense Costs and Indemnity Savings to an Insurer due to Countersuit Insurance

Effect on Med Mal Premium from Plaintiff Settlement Claims

| | |
|---|---|
| (1) Med. Mal. ALAE / Earned Premium | 28.0% |
| (2) Ratio of Expense for No Indemnity claims to all claims | 42.5% |
| (3) Indemnity / Earned Premium | 35.0% |
| (4) Ratio of Indemnity for Plaintiff Settlement claims to all claims | 93.0% |
| (5) Portion for claims | 2.6% |
| (6) Ratio Frivolous claims to total plaintiff settlement claims | 50.0% |
| (7) % of frivolous eliminated by existence of countersuit coverage | 50.0% |
| (8) Effect on Med. Mal. Premium = {[(1) x (2)} + {(3) x (4)}] x (6) x(7) | 0.3% |

Effect on Med. Mal. Premium with varying assumptions for (6) and (7) above

| (6) % frivolous | (7) % of frivolous eliminated | | | | | | |
|---|---|---|---|---|---|---|---|
| | 25% | 35% | 45% | 50% | 55% | 65% | 75% |
| 25% | 0.1% | 0.1% | 0.1% | 0.1% | 0.2% | 0.2% | 0.2% |
| 35% | 0.1% | 0.1% | 0.2% | 0.2% | 0.2% | 0.3% | 0.3% |
| 45% | 0.1% | 0.2% | 0.2% | 0.3% | 0.3% | 0.3% | 0.4% |
| 50% | 0.1% | 0.2% | 0.3% | 0.3% | 0.3% | 0.4% | 0.4% |
| 55% | 0.2% | 0.2% | 0.3% | 0.3% | 0.4% | 0.4% | 0.5% |
| 65% | 0.2% | 0.3% | 0.3% | 0.4% | 0.4% | 0.5% | 0.6% |
| 75% | 0.2% | 0.3% | 0.4% | 0.4% | 0.5% | 0.6% | 0.7% |

Notes: (1) based on Schedule P for Medical Malpractice - Occurrence and Claims - Made (Exhibit 6)
(2) based on medical malpractice close claim statistics in "PIAA Claim Trend Analysis" (Exhibit 5, page 2)
(3) based on Schedule P for Medical Malpractice - Occurrence and Claims - Made (Exhibit 6)
(4) based on medical malpractice close claim statistics in "PIAA Claim Trend Analysis" (Exhibit 5, page 3)
(5) see Exhibit 2
(6), (7) based on judgment

FIG. 47

PIAA - Claims Closed 1985-1998
Estimate of Indemnity for Claims < $30,000 based on Indemnity by Patient's Severity

| | (1) Indemnity | (2) % of Total | (3) Average Indemnity | (4) Estimated % of claims < $30,000 | (5) % of total indemnity for claims < $30,000 |
|---|---|---|---|---|---|
| Emotional injury only | 46,008,924 | 0.6% | 43,735 | 50% | 0.3% |
| Insignificant injury | 51,763,904 | 0.7% | 28,583 | 80% | 0.6% |
| Minor temporary injury | 319,410,309 | 4.3% | 45,532 | 30% | 1.3% |
| Major temporary injury | 672,567,701 | 9.1% | 94,475 | 5% | 0.5% |
| Minor permanent injury | 957,085,336 | 13.0% | 134,422 | 0% | 0.0% |
| Significant permanent injury | 1,079,241,050 | 14.6% | 202,941 | 0% | 0.0% |
| Major permanent injury | 1,010,644,640 | 13.7% | 336,882 | 0% | 0.0% |
| Quadriplegic, brain damage | 1,248,211,613 | 16.9% | 421,693 | 0% | 0.0% |
| Death | 1,986,810,010 | 27.0% | 181,709 | 0% | 0.0% |
| | 7,371,743,487 | 100.0% | 159,117 | | 2.6% |

Notes: (1), (3) closed claim data from "PIAA Claim Trend Analysis"
(2) = (1) / total of (1)
(4) based on judgment
(5) = (3) x (4)

FIG. 49

Countersuit Insurance
Range of Expected Return

Underwriting Profit

(8) Chance of Being Sued

(15) Cost of Countersuit

|        | 6%    | 8%    | 10%   | 12%   | 14%   | 16%   |
|--------|-------|-------|-------|-------|-------|-------|
| 20,000 | 63.7% | 60.1% | 56.5% | 52.9% | 49.3% | 45.7% |
| 25,000 | 62.5% | 28.5% | 54.5% | 50.5% | 46.5% | 42.5% |
| 30,000 | 61.3% | 56.9% | 52.5% | 48.1% | 43.7% | 39.3% |
| 35,000 | 60.1% | 55.3% | 50.5% | 45.7% | 40.9% | 36.1% |
| 40,000 | 58.9% | 53.7% | 48.5% | 43.3% | 38.1% | 32.9% |
| 45,000 | 57.7% | 52.0% | 46.5% | 40.9% | 35.3% | 29.7% |

Loss Ratio

|        | 6%    | 8%    | 10%   | 12%   | 14%   | 16%   |
|--------|-------|-------|-------|-------|-------|-------|
| 20,000 | 10.8% | 14.4% | 18.0% | 21.6% | 25.2% | 28.8% |
| 25,000 | 12.0% | 16.0% | 20.0% | 24.0% | 28.0% | 32.0% |
| 30,000 | 13.2% | 17.6% | 22.0% | 26.4% | 30.8% | 35.2% |
| 35,000 | 14.4% | 19.2% | 24.0% | 28.8% | 33.6% | 38.4% |
| 40,000 | 15.6% | 20.8% | 26.0% | 31.2% | 36.4% | 41.6% |
| 45,000 | 16.8% | 22.4% | 28.0% | 33.6% | 39.2% | 44.8% |

Present Value of Investment Income

|        | 6%   | 8%   | 10%  | 12%  | 14%  | 16%  |
|--------|------|------|------|------|------|------|
| 20,000 | 2.3% | 3.1% | 3.8% | 4.6% | 5.4% | 6.1% |
| 25,000 | 2.6% | 3.4% | 4.3% | 5.1% | 6.0% | 6.8% |
| 30,000 | 2.8% | 3.7% | 4.7% | 5.6% | 6.6% | 7.5% |
| 35,000 | 3.1% | 4.1% | 5.1% | 6.1% | 7.1% | 8.2% |
| 40,000 | 3.3% | 4.4% | 5.5% | 6.6% | 7.7% | 8.8% |
| 45,000 | 3.6% | 4.8% | 6.0% | 7.1% | 8.3% | 9.5% |

FIG. 50

Present Value of Federal Income Taxes

|        | 6%    | 8%    | 10%   | 12%   | 14%   | 16%   |
|--------|-------|-------|-------|-------|-------|-------|
| 20,000 | 22.6% | 21.6% | 20.6% | 19.7% | 18.7% | 17.8% |
| 25,000 | 22.2% | 21.2% | 20.1% | 19.0% | 18.0% | 16.9% |
| 30,000 | 21.9% | 20.7% | 19.6% | 18.4% | 17.2% | 16.0% |
| 35,000 | 21.6% | 20.3% | 19.0% | 17.8% | 16.5% | 15.2% |
| 40,000 | 21.3% | 19.9% | 18.5% | 17.1% | 15.7% | 14.3% |
| 45,000 | 21.0% | 19.5% | 18.0% | 16.5% | 15.0% | 13.5% |

Total Return

|        | 6%    | 8%    | 10%   | 12%   | 14%   | 16%   |
|--------|-------|-------|-------|-------|-------|-------|
| 20,000 | 43.4% | 41.6% | 39.7% | 37.8% | 36.0% | 34.0% |
| 25,000 | 42.9% | 40.7% | 38.7% | 36.6% | 34.5% | 32.4% |
| 30,000 | 42.2% | 39.9% | 37.6% | 35.3% | 33.1% | 30.8% |
| 35,000 | 41.6% | 39.1% | 36.6% | 34.0% | 31.5% | 29.1% |
| 40,000 | 40.9% | 38.2% | 35.5% | 32.8% | 30.1% | 27.4% |
| 45,000 | 40.3% | 37.4% | 34.5% | 31.5% | 28.6% | 25.7% |

FIG. 51a

Countersuit Insurance
Cash Flow for a Single Policy

| Commission | 10.0% | | Inv. Income | 5% |
|---|---|---|---|---|
| Marketing | 12.5% | | PV Interest Rate | 5% |
| Premium Tax | 3.0% | | | |
| Risk | 5.0% | | | |
| Total | 30.5% | | | |
| Expected LR | 20.0% | | | |

CASH BASIS

| | Premium | Expense | Incurred Loss | Payout Pattern | Paid | UW Profit | Loss Reserve | Inv. Income | PV Inv. Income | BFIT Cash | 30% FIT | PV FIT | AFIT Cash | PV AFIT Cash |
|---|---|---|---|---|---|---|---|---|---|---|---|---|---|---|
| 1 | 1,000 | 255 | 200 | 0% | | 745 | 200 | 10 | 9.76 | 755 | 167 | 162.49 | 589 | 574 |
| 2 | | | | 0% | | | 200 | 10 | 9.29 | 10 | 3 | 2.79 | 7 | 7 |
| 3 | | | | 5% | 9 | (9) | 191 | 10 | 8.45 | 0 | 3 | 2.53 | (2) | (2) |
| 4 | | | | 22% | 43 | (43) | 147 | 7 | 6.21 | (36) | 2 | 1.86 | (38) | (32) |
| 5 | | | | 26% | 52 | (52) | 95 | 5 | 3.83 | (47) | 1 | 1.15 | (49) | (39) |
| 6 | | | | 19% | 38 | (38) | 58 | 3 | 2.20 | (35) | 1 | 0.66 | (36) | (27) |
| 7 | | | | 14% | 28 | (28) | 30 | 1 | 1.09 | (26) | 0 | 0.33 | (27) | (19) |
| 8 | | | | 9% | 18 | (18) | 12 | 1 | 0.41 | (18) | 0 | 0.12 | (18) | (12) |
| 9 | | | | 6% | 12 | (12) | 0 | 0 | | (12) | 0 | | (12) | (8) |
| 10 | | | | | | | | | | | | | | |
| Total | 1,000 | 255 | 200 | | 200 | 545 | | 47 | 41 | 592 | 177 | 172 | 414 | 440 |
| As a % of premium | | | | | | | | | 4.1% | 59.2% | 17.7% | 17.2% | 41.4% | 44.0% |

INCOME STATEMENT BASIS

| | Premium | Expense | Incurred Loss | UW Profit | Inv. Income | BFIT Cash | 30% FIT | AFIT Cash |
|---|---|---|---|---|---|---|---|---|
| 1 | 1,000 | 255 | 200 | 545 | 10 | 555 | 167 | 389 |
| 2 | | | | | 10 | 10 | 3 | 7 |
| 3 | | | | | 10 | 10 | 3 | 7 |
| 4 | | | | | 7 | 7 | 2 | 5 |
| 5 | | | | | 5 | 5 | 1 | 3 |
| 6 | | | | | 3 | 3 | 1 | 2 |
| 7 | | | | | 1 | 1 | 0 | 1 |
| 8 | | | | | 1 | 1 | 0 | 0 |
| 9 | | | | | 0 | 0 | 0.00 | 0 |
| 10 | | | | | | | | |
| Total | 1,000 | 255 | 200 | 545 | 47 | 592 | 177 | 414 |
| As a % of premium | | | | 54.5% | | 59.2% | 17.7% | 41.4% |

FIG. 52

Countersuit Insurance
Expected Cash Flow and Income Flow

AFIT Cash

| Calendar Year | Policy Year 1 | 2 | 3 | 4 | 5 | 6 | 7 | 8 | 9 | 10 | 11 | Total | Earned Premium | Return as a % of Premium |
|---|---|---|---|---|---|---|---|---|---|---|---|---|---|---|
| 1 | 589 | | | | | | | | | | | 589 | 1000 | 58.9% |
| 2 | 7 | 589 | | | | | | | | | | 596 | 1000 | 59.6% |
| 3 | (2) | 7 | 589 | | | | | | | | | 593 | 1000 | 59.3% |
| 4 | (38) | (2) | 7 | 589 | | | | | | | | 555 | 1000 | 55.5% |
| 5 | (49) | (38) | (2) | 7 | 589 | | | | | | | 506 | 1000 | 50.6% |
| 6 | (36) | (49) | (38) | (2) | 7 | 589 | | | | | | 470 | 1000 | 47.0% |
| 7 | (27) | (36) | (49) | (38) | (2) | 7 | 589 | | | | | 444 | 1000 | 44.4% |
| 8 | (18) | (27) | (36) | (49) | (38) | (2) | 7 | 589 | | | | 426 | 1000 | 42.6% |
| 9 | (12) | (18) | (27) | (36) | (49) | (38) | (2) | 7 | 589 | | | 414 | 1000 | 41.4% |
| 10 | | (12) | (18) | (27) | (36) | (49) | (38) | (2) | 7 | 589 | | 414 | 1000 | 41.4% |
| 11 | | | (12) | (18) | (27) | (36) | (49) | (38) | (2) | 7 | 589 | 414 | 1000 | 41.4% |

AFIT Income

| Calendar Year | Policy Year 1 | 2 | 3 | 4 | 5 | 6 | 7 | 8 | 9 | 10 | 11 | Total | Earned Premium | Return as a % of Premium |
|---|---|---|---|---|---|---|---|---|---|---|---|---|---|---|
| 1 | 389 | | | | | | | | | | | 389 | 1000 | 38.9% |
| 2 | 7 | 389 | | | | | | | | | | 396 | 1000 | 39.6% |
| 3 | 7 | 7 | 389 | | | | | | | | | 402 | 1000 | 40.2% |
| 4 | 5 | 7 | 7 | 389 | | | | | | | | 407 | 1000 | 40.7% |
| 5 | 3 | 5 | 7 | 7 | 389 | | | | | | | 411 | 1000 | 41.1% |
| 6 | 2 | 3 | 5 | 7 | 7 | 389 | | | | | | 413 | 1000 | 41.3% |
| 7 | 1 | 2 | 3 | 5 | 7 | 7 | 389 | | | | | 414 | 1000 | 41.4% |
| 8 | 0 | 1 | 2 | 3 | 5 | 7 | 7 | 389 | | | | 414 | 1000 | 41.4% |
| 9 | 0 | 0 | 1 | 2 | 3 | 5 | 7 | 7 | 389 | | | 414 | 1000 | 41.4% |
| 10 | | 0 | 0 | 1 | 2 | 3 | 5 | 7 | 7 | 389 | | 414 | 1000 | 41.4% |
| 11 | | | 0 | 0 | 1 | 2 | 3 | 5 | 7 | 7 | 389 | 414 | 1000 | 41.4% |

FIG. 53

Medical Malpractice Statistics from
PIAA Claim Trend Analysis

PIAA Claim Tend Analysis

| Close Year | Closed | Paid | Unpaid | #Unpaid/#Closed |
|---|---|---|---|---|
| 1985 | 8,136 | 2,649 | 5,487 | 0.67 |
| 1986 | 10,966 | 3,697 | 7,269 | 0.66 |
| 1987 | 12,470 | 3,992 | 8,478 | 0.68 |
| 1988 | 11,954 | 3,845 | 8,109 | 0.68 |
| 1989 | 10,193 | 3,324 | 6,869 | 0.67 |
| 1990 | 9,827 | 3,139 | 6,688 | 0.68 |
| 1991 | 9,128 | 3,057 | 6,071 | 0.67 |
| 1992 | 10,875 | 3,687 | 7,188 | 0.66 |
| 1993 | 12,366 | 3,796 | 8,570 | 0.69 |
| 1994 | 11,337 | 3,501 | 7,836 | 0.69 |
| 1995 | 11,035 | 3,322 | 7,713 | 0.70 |
| 1996 | 11,115 | 3,087 | 8,028 | 0.72 |
| 1997 | 8,981 | 2,762 | 6,219 | 0.69 |
| 1998 | 7,873 | 2,471 | 5,402 | 0.69 |
| Total | 146,256 | 46,329 | 99,927 | 0.68 |

| Close Year | Indemnity | All Claims Expense | Expense/ Indemnity | Paid Claims Expense | No Indemnity Expense | No Ind./ Total Expense |
|---|---|---|---|---|---|---|
| 1985 | 230,806,955 | 54,487,667 | 0.24 | 26,765,706 | 27,721,961 | 51% |
| 1986 | 352,405,151 | 89,470,656 | 0.25 | 46,388,838 | 43,081,818 | 48% |
| 1987 | 444,556,280 | 114,618,244 | 0.26 | 55,934,012 | 58,675,232 | 51% |
| 1988 | 487,393,082 | 135,295,483 | 0.28 | 65,031,505 | 70,263,978 | 52% |
| 1989 | 437,279,382 | 133,491,103 | 0.31 | 64,354,106 | 69,136,997 | 52% |
| 1990 | 434,288,627 | 149,093,681 | 0.34 | 69,011,467 | 80,082,214 | 54% |
| 1991 | 489,947,025 | 135,594,441 | 0.28 | 65,444,039 | 71,150,402 | 52% |
| 1992 | 675,717,634 | 180,709,437 | 0.27 | 83,987,987 | 96,721,450 | 54% |
| 1993 | 707,327,001 | 215,897,107 | 0.31 | 105,323,445 | 110,573,662 | 51% |
| 1994 | 660,599,850 | 221,951,193 | 0.34 | 103,671,853 | 118,279,340 | 53% |
| 1995 | 598,416,179 | 210,450,471 | 0.35 | 100,546,582 | 109,903,889 | 52% |
| 1996 | 614,746,787 | 196,992,310 | 0.32 | 95,230,759 | 101,761,551 | 52% |
| 1997 | 642,960,767 | 201,101,870 | 0.31 | 89,205,170 | 111,872,070 | 56% |
| 1998 | 595,298,767 | 194,219,482 | 0.33 | 85,934,524 | 108,284,904 | 56% |
| Total | 7,371,743,487 | 2,233,373,091 | 0.30 | 1,055,838,993 | 1,177,509,468 | 53% |

FIG. 54

Medical Malpractice Statistics from
PIAA Claim Trend Analysis

| Close Year | Total Verdicts | Plaintiff Verdicts | Defendant Verdicts | Plaintiff Settlement | Dropped, Withdrawn or Dismissed | # Closed | Closed w/ no indemnity | # Unpaid/ # Closed | DWD/ Unpaid |
|---|---|---|---|---|---|---|---|---|---|
| 1985 | 585 | 142 | 443 | 2,478 | 5,007 | 8,070 | 5,450 | 0.68 | 0.92 |
| 1986 | 710 | 142 | 568 | 3,530 | 6,643 | 10,883 | 7,211 | 0.66 | 0.92 |
| 1987 | 910 | 187 | 723 | 3,771 | 7,677 | 12,358 | 8,400 | 0.68 | 0.91 |
| 1988 | 892 | 172 | 720 | 3,634 | 7,318 | 11,844 | 8,038 | 0.68 | 0.91 |
| 1989 | 718 | 158 | 560 | 3,110 | 6,221 | 10,049 | 6,781 | 0.67 | 0.92 |
| 1990 | 630 | 111 | 519 | 2,977 | 6,072 | 9,679 | 6,591 | 0.68 | 0.92 |
| 1991 | 608 | 104 | 504 | 2,900 | 5,479 | 8,987 | 5,983 | 0.67 | 0.92 |
| 1992 | 742 | 125 | 617 | 3,497 | 6,459 | 10,698 | 7,076 | 0.66 | 0.91 |
| 1993 | 704 | 127 | 577 | 3,585 | 7,886 | 12,175 | 8,463 | 0.70 | 0.93 |
| 1994 | 717 | 130 | 587 | 3,280 | 7,137 | 11,134 | 7,724 | 0.69 | 0.92 |
| 1995 | 642 | 111 | 531 | 3,112 | 7,063 | 10,817 | 7,594 | 0.70 | 0.93 |
| 1996 | 578 | 109 | 469 | 2,888 | 7,447 | 10,913 | 7,916 | 0.73 | 0.94 |
| 1997 | 722 | 140 | 582 | 2,515 | 5,514 | 8,751 | 6,096 | 0.70 | 0.90 |
| 1998 | 598 | 98 | 500 | 2,244 | 4,808 | 7,650 | 5,308 | 0.69 | 0.91 |
| Total | 9,756 | 1,856 | 7,900 | 43,521 | 90,731 | 144,008 | 98,631 | 0.68 | 0.92 |
|  | 6.8% | 1.9% | 5.5% | 30.2% | 63.0% | 100.0% |  |  |  |

FIG. 55

| Close Year | Plaintiff Verdict Expense | Defendant Verdict Expense | Plaintiff Settlement Expense | DWD Expense | Total Expense | No Indemnity Expense | DWD / No Ind. Expense | DWD/Total Expense |
|---|---|---|---|---|---|---|---|---|
| 1985 | 3,301,714 | 9,723,773 | 22,316,787 | 17,394,315 | 52,736,589 | 27,118,088 | 0.64 | 0.33 |
| 1986 | 4,825,827 | 15,244,970 | 40,769,825 | 26,549,350 | 87,389,972 | 41,794,320 | 0.64 | 0.30 |
| 1987 | 6,643,259 | 18,439,722 | 48,325,368 | 38,236,030 | 111,644,379 | 56,675,752 | 0.67 | 0.34 |
| 1988 | 6,848,726 | 21,978,986 | 56,639,860 | 45,811,515 | 131,279,087 | 67,790,501 | 0.68 | 0.35 |
| 1989 | 7,604,727 | 21,469,932 | 54,197,814 | 44,790,164 | 128,062,637 | 66,260,096 | 0.68 | 0.35 |
| 1990 | 5,138,808 | 25,919,971 | 60,938,243 | 50,233,455 | 142,230,477 | 76,153,426 | 0.66 | 0.35 |
| 1991 | 5,340,509 | 23,127,587 | 56,117,882 | 45,319,756 | 129,905,734 | 68,447,343 | 0.66 | 0.35 |
| 1992 | 7,026,343 | 29,714,659 | 73,581,307 | 61,616,202 | 171,938,509 | 91,330,859 | 0.67 | 0.36 |
| 1993 | 9,716,391 | 28,768,709 | 88,975,541 | 75,733,830 | 203,194,471 | 104,502,539 | 0.72 | 0.37 |
| 1994 | 8,916,290 | 34,880,684 | 98,830,928 | 76,699,019 | 210,526,921 | 111,779,703 | 0.69 | 0.37 |
| 1995 | 8,186,416 | 31,374,999 | 86,144,413 | 70,959,669 | 196,665,497 | 102,334,668 | 0.69 | 0.36 |
| 1996 | 8,183,745 | 27,157,913 | 82,177,245 | 68,966,254 | 186,485,157 | 96,124,167 | 0.72 | 0.37 |
| 1997 | 12,173,129 | 38,422,861 | 71,625,299 | 67,914,337 | 910,135,626 | 106,337,198 | 0.64 | 0.36 |
| 1998 | 8,192,348 | 33,492,740 | 70,740,814 | 69,384,550 | 181,810,452 | 102,877,290 | 0.67 | 0.38 |
| Total | 102,098,232 | 359,717,504 | 902,381,326 | 759,808,446 | 2,124,005,508 | 1,119,525,950 | 0.68 | 0.36 |
| | 4.8% | 16.9% | 42.5% | 35.8% | 100.0% | | | |

FIG. 56

Medical Malpractice Statistics from
PIAA Claim Trend Analysis

| Close Year | Plaintiff Verdict Indemnity | P. Verdict/ Total Indemnity | Plaintiff Settlement Indemnity | P. Settlement/ Total Indemnity | Total Indemnity |
|---|---|---|---|---|---|
| 1985 | 21,339,033 | 9% | 204,067,724 | 91% | 255,406,757 |
| 1986 | 24,717,591 | 7% | 324,912,309 | 93% | 349,629,900 |
| 1987 | 40,346,187 | 9% | 396,743,305 | 91% | 437,089,492 |
| 1988 | 41,436,214 | 9% | 437,387,280 | 91% | 478,823,494 |
| 1989 | 39,032,916 | 9% | 382,018,938 | 91% | 421,051,854 |
| 1990 | 21,334,698 | 5% | 400,748,604 | 95% | 422,083,302 |
| 1991 | 26,406,496 | 6% | 447,712,736 | 94% | 474,119,232 |
| 1992 | 35,437,950 | 5% | 622,869,137 | 95% | 658,307,087 |
| 1993 | 49,164,877 | 7% | 633,313,633 | 93% | 682,478,510 |
| 1994 | 48,343,614 | 8% | 590,798,144 | 92% | 639,141,758 |
| 1995 | 36,814,046 | 6% | 538,265,401 | 94% | 575,079,447 |
| 1996 | 30,147,180 | 5% | 563,703,423 | 95% | 593,850,603 |
| 1997 | 48,561,453 | 8% | 556,866,630 | 92% | 605,428,083 |
| 1998 | 38,309,656 | 7% | 523,085,805 | 93% | 561,395,461 |
| Total | 501,391,911 | 7% | 6,622,493,069 | 93% | 7,123,884,980 |

FIG. 57

Best's Aggregates and Averages - 1997
Schedule P - Medical Malpractice - Occurrence

| Accident Year | Earned Premium | Net Paid Loss | Net Paid ALAE | Paid ALAE/ Paid Loss | Net Loss Case | Net ALAE Case | Incurred Loss | Incurred ALAE | Inc. ALAE/ Inc. Loss |
|---|---|---|---|---|---|---|---|---|---|
| 1988 | 1,542,940 | 617,863 | 253,212 | 0.41 | 121,952 | 8,950 | 739,815 | 262,162 | 0.35 |
| 1989 | 1,470,909 | 578,423 | 237,668 | 0.41 | 163,284 | 14,415 | 741,707 | 252,083 | 0.34 |
| 1990 | 1,299,261 | 602,613 | 259,315 | 0.43 | 221,759 | 23,930 | 824,372 | 283,245 | 0.34 |
| 1991 | 1,211,663 | 598,700 | 268,749 | 0.45 | 320,404 | 33,370 | 919,104 | 302,119 | 0.33 |
| 1992 | 1,194,494 | 537,920 | 243,770 | 0.45 | 350,944 | 45,199 | 888,864 | 288,969 | 0.33 |
| 1993 | 1,189,758 | 403,861 | 197,431 | 0.49 | 522,329 | 64,260 | 926,190 | 261,691 | 0.28 |
| 1994 | 1,383,107 | 340,251 | 185,381 | 0.54 | 595,017 | 90,490 | 935,268 | 275,871 | 0.29 |
| 1995 | 1,459,150 | 232,527 | 100,259 | 0.43 | 593,578 | 99,682 | 826,105 | 199,941 | 0.24 |
| 1996 | 1,405,181 | 75,140 | 30,045 | 0.40 | 349,990 | 73,930 | 425,130 | 103,975 | 0.24 |
| 1997 | 1,389,116 | 13,041 | 4,738 | 0.36 | 167,416 | 43,687 | 180,457 | 48,425 | 0.27 |
| Total | 13,545,579 | 4,000,339 | 1,780,568 | 0.45 | 3,406,673 | 497,913 | 7,407,012 | 2,278,481 | 0.31 |

| | Net Loss IBNR | Net ALAE IBNR | Ultimate Loss | Ultimate ALAE | Ult. ALAE/ Loss | Ult. ALAE/ EP | % Loss Paid | % ALAE Paid |
|---|---|---|---|---|---|---|---|---|
| 1988 | 23,398 | 10,850 | 763,213 | 273,012 | 0.36 | 0.18 | 81% | 93% |
| 1989 | 15,186 | 12,190 | 756,893 | 264,273 | 0.35 | 0.18 | 76% | 90% |
| 1990 | 28,901 | 25,807 | 853,273 | 309,052 | 0.36 | 0.24 | 71% | 84% |
| 1991 | 9,470 | 32,450 | 928,574 | 334,569 | 0.36 | 0.28 | 64% | 80% |
| 1992 | 50,023 | 45,208 | 938,887 | 334,177 | 0.36 | 0.28 | 57% | 73% |
| 1993 | 93,610 | 57,413 | 1,019,800 | 319,104 | 0.31 | 0.27 | 40% | 62% |
| 1994 | 239,578 | 100,507 | 1,174,846 | 376,378 | 0.32 | 0.27 | 29% | 49% |
| 1995 | 443,629 | 203,078 | 1,269,734 | 403,019 | 0.32 | 0.28 | 18% | 25% |
| 1996 | 804,396 | 306,689 | 1,229,526 | 410,664 | 0.33 | 0.29 | 6% | 7% |
| 1997 | 1,172,825 | 380,565 | 1,353,282 | 428,990 | 0.32 | 0.31 | 1% | 1% |
| Total | 2,881,016 | 1,174,757 | 10,288,028 | 3,453,238 | 0.34 | 0.25 | 39% | 52% |

FIG. 58

Best's Aggregates and Averages - 1997
Schedule P - Medical Malpractice - Claims-Made

| Accident Year | Earned Premium | Net Paid Loss | Net Paid ALAE | Paid ALAE/ Paid Loss | Net Loss Case | Net ALAE Case | Incurred Loss | Incurred ALAE | Inc. ALAE/ Inc. Loss |
|---|---|---|---|---|---|---|---|---|---|
| 1988 | 2,737,934 | 871,856 | 400,703 | 0.46 | 55,234 | 6,021 | 927,090 | 406,724 | 0.44 |
| 1989 | 2,883,221 | 982,010 | 447,683 | 0.46 | 90,917 | 8,393 | 1,072,927 | 456,076 | 0.43 |
| 1990 | 2,855,935 | 1,036,169 | 509,004 | 0.49 | 119,655 | 13,853 | 1,115,824 | 522,857 | 0.45 |
| 1991 | 2,801,136 | 1,352,422 | 584,414 | 0.43 | 188,587 | 21,640 | 1,541,009 | 606,054 | 0.39 |
| 1992 | 2,862,585 | 1,347,026 | 644,974 | 0.48 | 370,007 | 41,771 | 1,717,033 | 686,745 | 0.40 |
| 1993 | 3,030,116 | 1,391,780 | 653,005 | 0.47 | 562,283 | 73,206 | 1,954,063 | 726,211 | 0.37 |
| 1994 | 3,197,550 | 1,268,111 | 634,981 | 0.50 | 904,998 | 122,693 | 2,173,109 | 757,674 | 0.35 |
| 1995 | 3,209,722 | 1,020,753 | 514,826 | 0.50 | 1,394,779 | 204,493 | 2,415,532 | 719,319 | 0.30 |
| 1996 | 3,349,526 | 483,318 | 298,157 | 0.62 | 1,796,282 | 314,285 | 2,279,600 | 612,442 | 0.27 |
| 1997 | 3,509,502 | 110,328 | 74,952 | 0.68 | 1,703,101 | 418,984 | 1,813,429 | 493,936 | 0.27 |
| Total | 30,437,227 | 9,863,773 | 4,762,699 | 0.48 | 7,185,843 | 1,225,339 | 17,049,616 | 5,988,038 | 0.35 |

| | Net Loss IBNR | Net ALAE IBNR | Ultimate Loss | Ultimate ALAE | Ult. ALAE/ Loss | Ult. ALAE / EP | % Loss Paid | % ALAE Paid |
|---|---|---|---|---|---|---|---|---|
| 1988 | 24,855 | 9,378 | 951,945 | 416,102 | 0.44 | 0.15 | 92% | 96% |
| 1989 | 29,192 | 17,986 | 1,102,009 | 474,062 | 0.43 | 0.16 | 89% | 96% |
| 1990 | 50,110 | 20,154 | 1,205,934 | 543,011 | 0.45 | 0.19 | 86% | 94% |
| 1991 | 60,696 | 41,788 | 1,601,705 | 647,842 | 0.40 | 0.23 | 84% | 90% |
| 1992 | 59,109 | 56,653 | 1,776,142 | 743,398 | 0.42 | 0.26 | 76% | 87% |
| 1993 | 69,306 | 84,765 | 2,023,369 | 810,976 | 0.40 | 0.27 | 69% | 81% |
| 1994 | 108,373 | 135,339 | 2,281,482 | 893,013 | 0.39 | 0.28 | 56% | 71% |
| 1995 | 149,692 | 176,697 | 2,565,224 | 896,016 | 0.35 | 0.28 | 40% | 57% |
| 1996 | 287,781 | 294,907 | 2,567,381 | 907,349 | 0.35 | 0.27 | 19% | 33% |
| 1997 | 859,465 | 523,323 | 2,672,894 | 1,017,259 | 0.38 | 0.29 | 4% | 7% |
| Total | 1,698,579 | 1,360,990 | 18,748,195 | 7,349,028 | 0.39 | 0.24 | 53% | 65% |

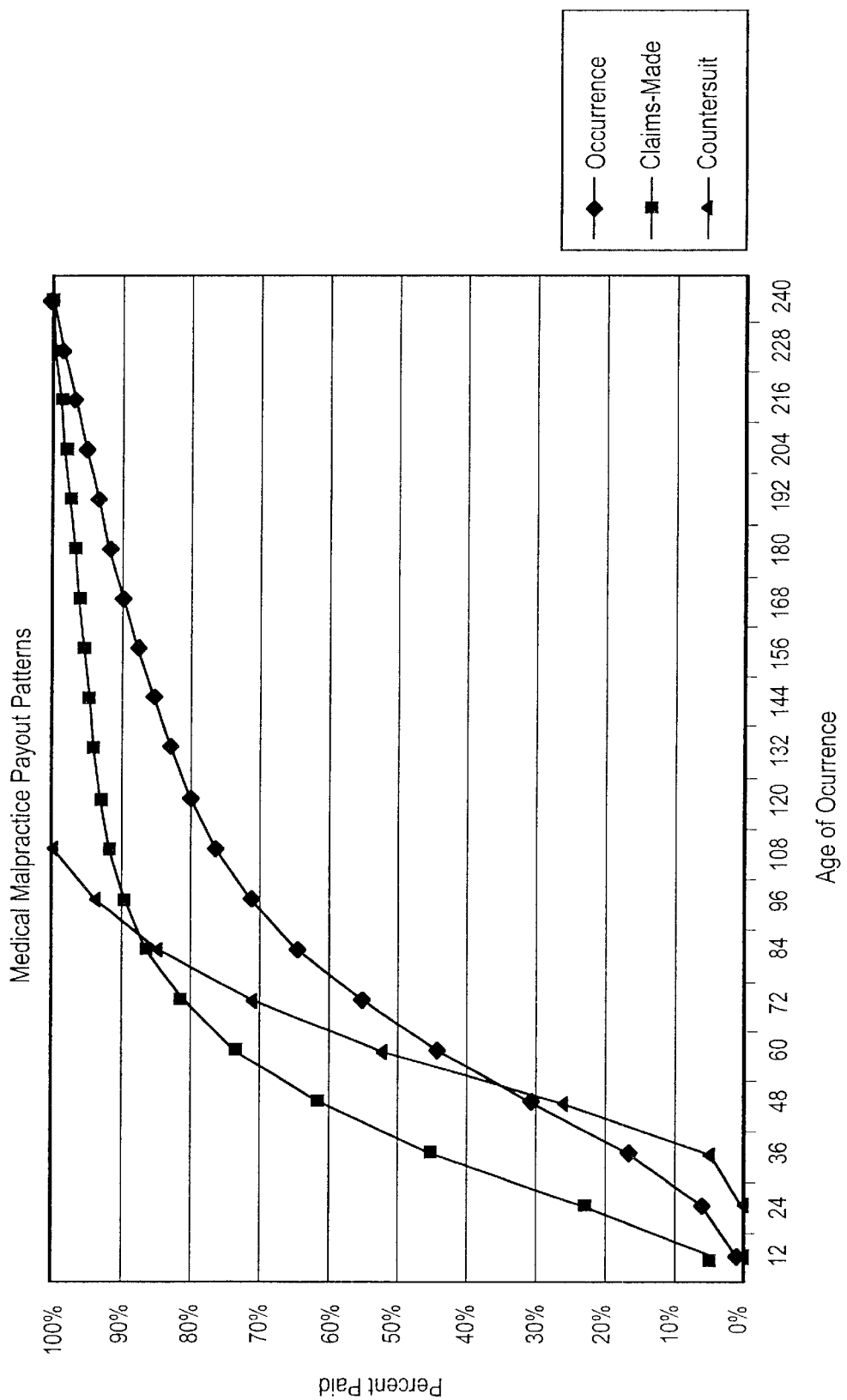
FIG.59 Medical Malpractice Payout Patterns

FIG. 60

Payout Patterns
Base on 1997 AM Best's Data

From AM Best's Analysis

|     | Loss and ALAE Occurrence | Change | Loss and ALAE Claims-made | Change | Payout for $0 or small | Payout of Countersuit |
|-----|---|---|---|---|---|---|
| 12  | 1%   | 1%  | 4%   | 4%  | 5%   | 0%   |
| 24  | 6%   | 5%  | 23%  | 19% | 26%  | 0%   |
| 36  | 17%  | 11% | 45%  | 22% | 52%  | 5%   |
| 48  | 31%  | 14% | 62%  | 16% | 71%  | 26%  |
| 60  | 44%  | 14% | 74%  | 12% | 85%  | 52%  |
| 72  | 55%  | 11% | 81%  | 8%  | 94%  | 71%  |
| 84  | 65%  | 10% | 86%  | 5%  | 100% | 85%  |
| 96  | 71%  | 7%  | 89%  | 3%  |      | 94%  |
| 108 | 77%  | 5%  | 92%  | 2%  |      | 100% |
| 120 | 80%  | 4%  | 93%  | 1%  |      |      |
| 132 | 83%  | 3%  | 94%  | 1%  |      |      |
| 144 | 86%  | 3%  | 95%  | 1%  |      |      |
| 156 | 88%  | 2%  | 95%  | 1%  |      |      |
| 168 | 90%  | 2%  | 96%  | 1%  |      |      |
| 180 | 92%  | 2%  | 97%  | 1%  |      |      |
| 192 | 94%  | 2%  | 98%  | 1%  |      |      |
| 204 | 95%  | 2%  | 98%  | 1%  |      |      |
| 216 | 97%  | 2%  | 99%  | 1%  |      |      |
| 228 | 99%  | 1%  | 99%  | 1%  |      |      |
| 240 | 100% | 1%  | 100% | 1%  |      |      |

Note: Assumes no $0 or small after 7 years, and 2 year lag behind Med Mal. Coverage

DIGITAL ELECTRICAL COMPUTER SYSTEM FOR DETERMINING A PREMIUM STRUCTURE FOR INSURANCE COVERAGE INCLUDING FOR COUNTERCLAIM COVERAGE

BACKGROUND OF THE INVENTION

A. Copyright Notice

A portion of the disclosure of this patent document contains material which is subject to copyright protection. The copyright owner has no objection to a statutory fair use of this material, as it appears in the files of the files or records of the U.S. Patent and Trademark Office, but otherwise reserves all copyright rights whatsoever.

B. Field of Invention

This invention relates to the reduction of frivolous professional liability claims. More particularly, this invention relates to the provision of insurance to pay the costs of counter litigation, especially, but not necessarily only for malicious prosecution of frivolous professional liability claims, including publicizing the identities of holders of such insurance as a deterrent.

Still more particularly, present invention is in the field of digital electrical apparatus and methods for making and using the same, and products produced thereby. More particularly, the present invention is directed to a digital electrical apparatus and method for data processing, data management, and computer communications, having particular utility in the fields of insurance, accounting, marketing, etc. Still more particularly, the present invention pertains to a a digital electrical apparatus and method for making and using it to process and produce digital electrical signals relating to insurance coverage for funding counterlitigation, counterclaim, and countersuit cost, or other counter proceedings.

C. Background of Invention

As society has become more litigious, any reason for people to amicably resolve their differences by other avenues would be worthwhile. Unfortunately, people have found themselves defending litigation more frequently, and sometimes counterclaiming or countersuing where they would have otherwise walked away.

Consider an example. Professionals (including physicians, attorneys, architects and others) have found themselves defending an increasing number of professional liability claims brought by patients or clients unhappy with the quality of the professional services rendered, or with the results of those services. In some cases, charges of professional misconduct are warranted. However, in many cases, the charges are unwarranted; despite competent services rendered at or above the appropriate level of care, concern and attention, and without fault on the part of the professional, the desired result may not be achieved in all cases. Nevertheless, to avoid the disruption of a protracted legal action, such frivolous cases are frequently settled by the accused professionals for their nuisance value.

A frivolous charge of professional misconduct may be brought on behalf of an unhappy patient or client simply because there is no adequate disincentive not to do so. Although it may be possible, if the frivolous nature of the complaint can be proven, to pursue counter litigation (for example, a "countersuit" for wrongful or malicious prosecution against the proponents of frivolous claims, e.g., the patient/client or his or her attorney), such countersuits frequently are not instituted or pursued because of the commitment in time, and particularly in legal fees, that is involved.

Although these problems affect anyone and many different professional fields as discussed above, the problem is particularly acute in the case of physicians. Therefore, the remainder of this specification will be addressed to medical malpractice counterclaim insurance, it being understood that the discussion applies equally well to other counterclaims, including separate countersuits and non-court activity, such as expert witness or attorney disciplinary proceedings; administrative action, presentations to prosecuting attorneys, and the like. The discussion also applies to different types of legal subject matter, professional liability claims, and insurance.

Even though medical malpractice claims usually are covered by insurance, they have many negative implications. First, one's competence is challenged and one's reputation is damaged,threatening one's future livelihood. Second, the stress of practicing medicine is increased. Third, the physician-patient relationship is damaged. Fourth, physicians are encouraged to practice cost-inefficient defensive medicine. Fifth, the physician is required to prepare for the lawsuit, spending time away from the office that does not generate income. Sixth, the premiums for malpractice liability insurance may increase, possibly even after a successful defense. Seventh, the physician is placed in a vulnerable and uncomfortable position as a witness. Eighth, the physician may be pitted against another physician (a) in trying to allocate blame if more than one physician was involved, or (b) where another physician appears as an expert witness on behalf of the plaintiff. Ninth, stress develops at home between the physician and his or her spouse and family. Tenth, the joy is taken out of practicing medicine. Eleventh, a judgment over the maximum coverage limits of a physician's malpractice insurance policy can bankrupt the physician.

For these reasons it would be desirable to be able to provide an improved deterrent to the filing and prosecution of litigation, especially frivolous professional liability claims.

SUMMARY OF THE INVENTION

A. Objects of the Invention

It is an object of this invention to attempt to provide an improved deterrent to the filing and prosecution of litigation, especially frivolous professional liability claims.

It is another object of this invention to provide computer support for the improved deterrent.

It is yet another object of this invention to provide an integrated system of multiple computer support systems for efficiently supporting the improved deterrent.

In accordance with this invention, there is provided a method of deterring litigation claims such as prosecution of frivolous professional liability claims against professionals.

B. Summary of the Invention

The method includes offering to professionals a plan of insurance for paying costs of prosecuting a claim against a proponent of a frivolous professional liability claim. Applications are received from professionals for the insurance, including by means of one or more of the computer systems discussed subsequently herein. Professionals (i.e., those from whom the applications are received) are provided with insurance coverage by significant computer support, including support for determining a suitable premium structure, generating insurance documentation, accounting, marketing, intra and inter-computer data processing, handling claims, updating premium structures, and auditing financial operations. A database of professionals covered under the plan of insurance is maintained as professionals are accepted into and added to the plan of insurance. The database is linked to a publicly-accessible communications interface for viewing by any computer of a member of the public, and the existence of the database is publicized.

Accordingly, the invention includes apparatus, method for making the apparatus, and method for using the apparatus, articles of manufacture (e.g., program with storage medium) data base and data structures and necessary intermediates.

A broad view of the invention is as follows: A computer-implemented method for determining a premium structure for insurance providing coverage including counterclaim coverage, the method comprising the steps of: receiving actuarial data and census data, at least one of said data including indicia of litigation frequency and cost; computing a premium structure, based upon the actuarial data and the census data, for the insurance providing coverage including counterclaim coverage; and generating insurance documentation including premium structure.

D. BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

Figure 12A:
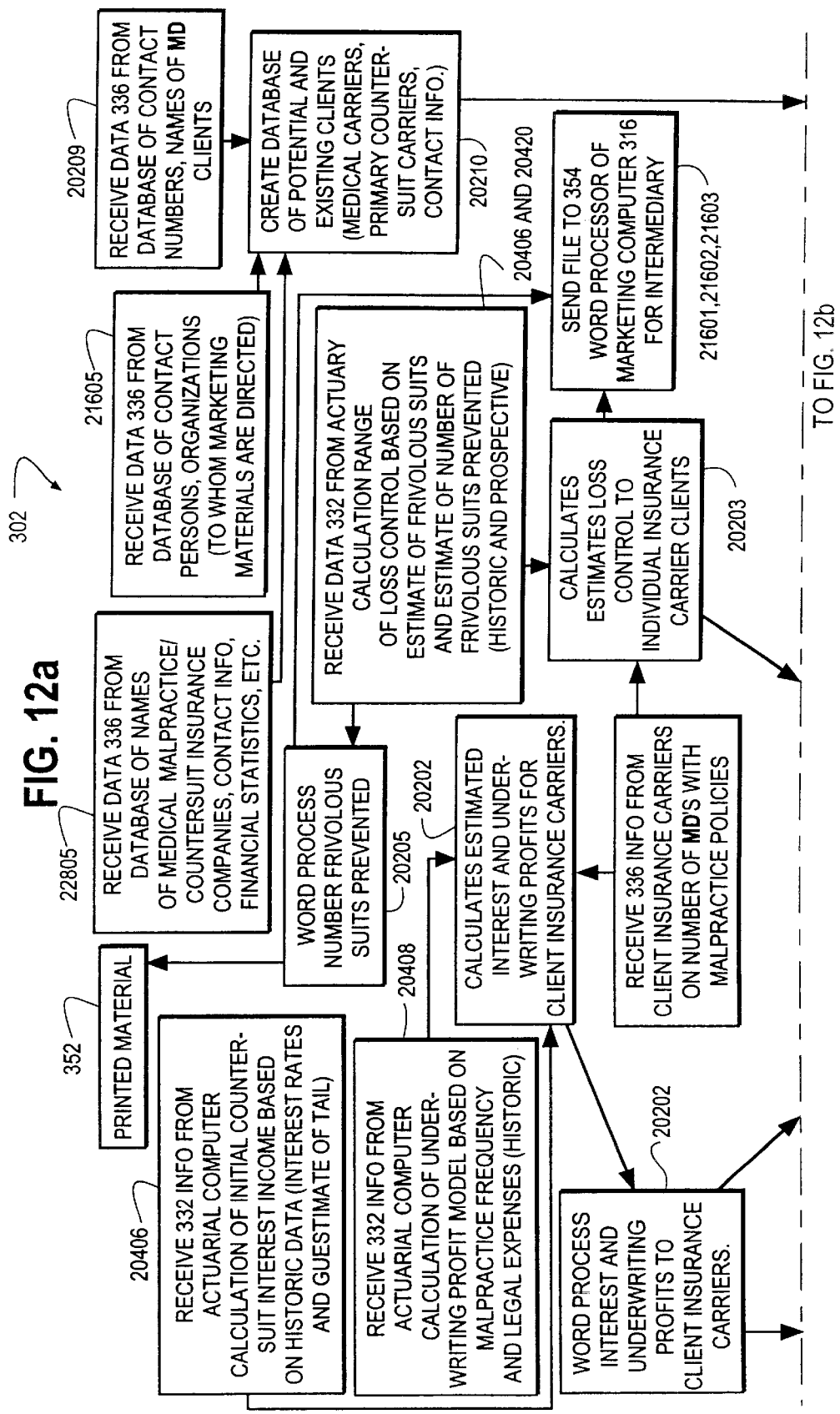
Figure 12B:
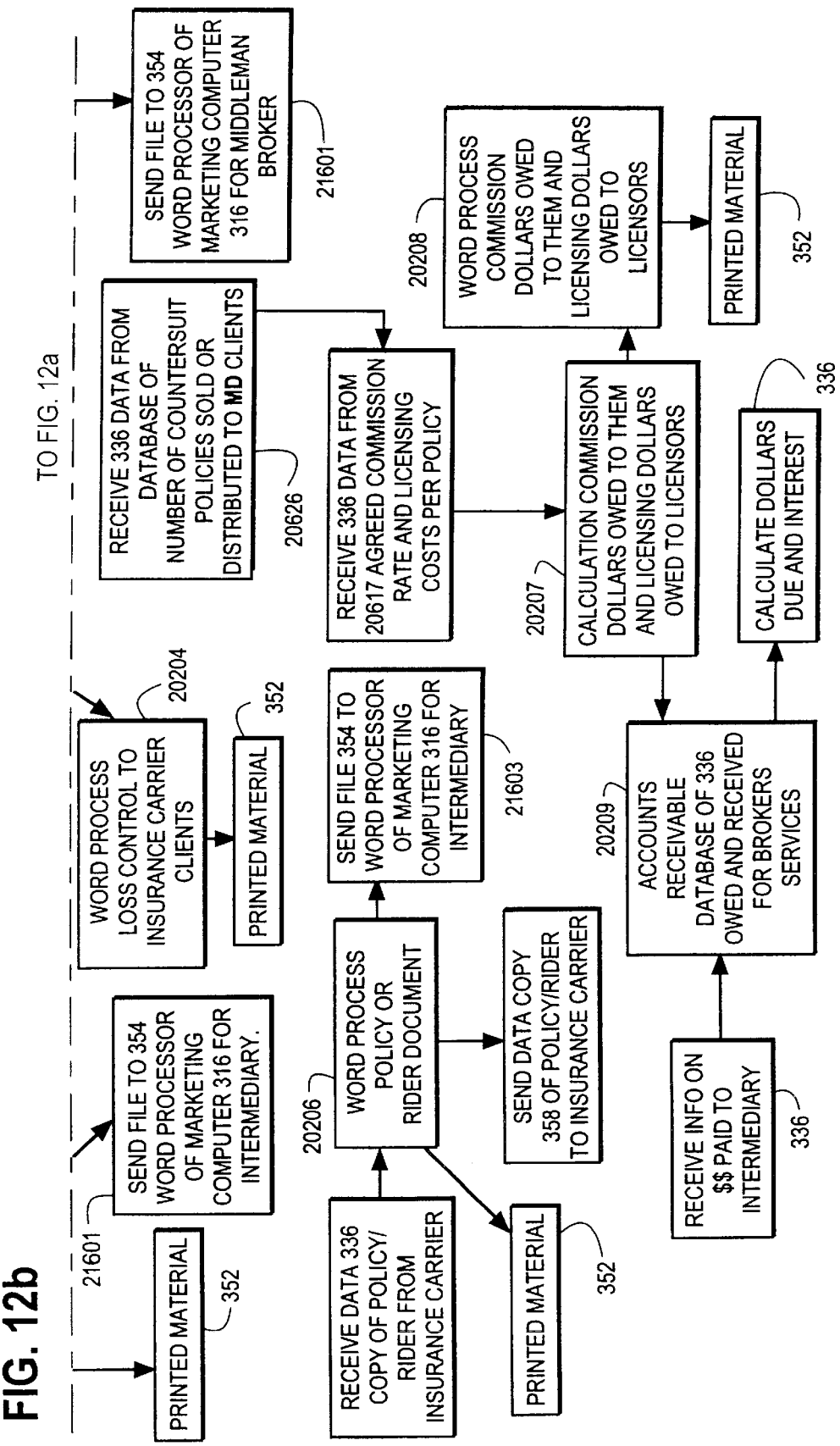
Figure 13A:
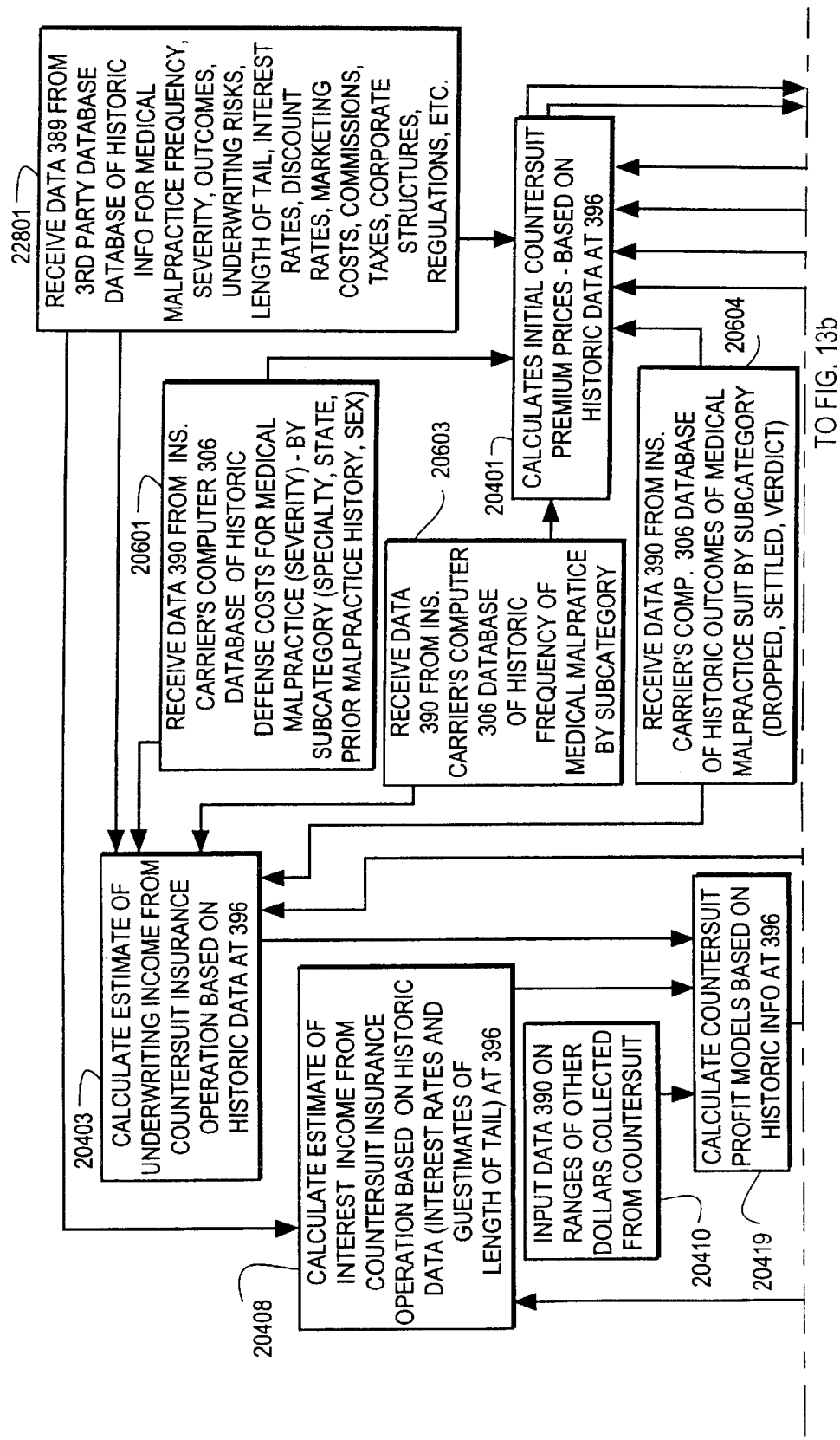
Figure 13B:
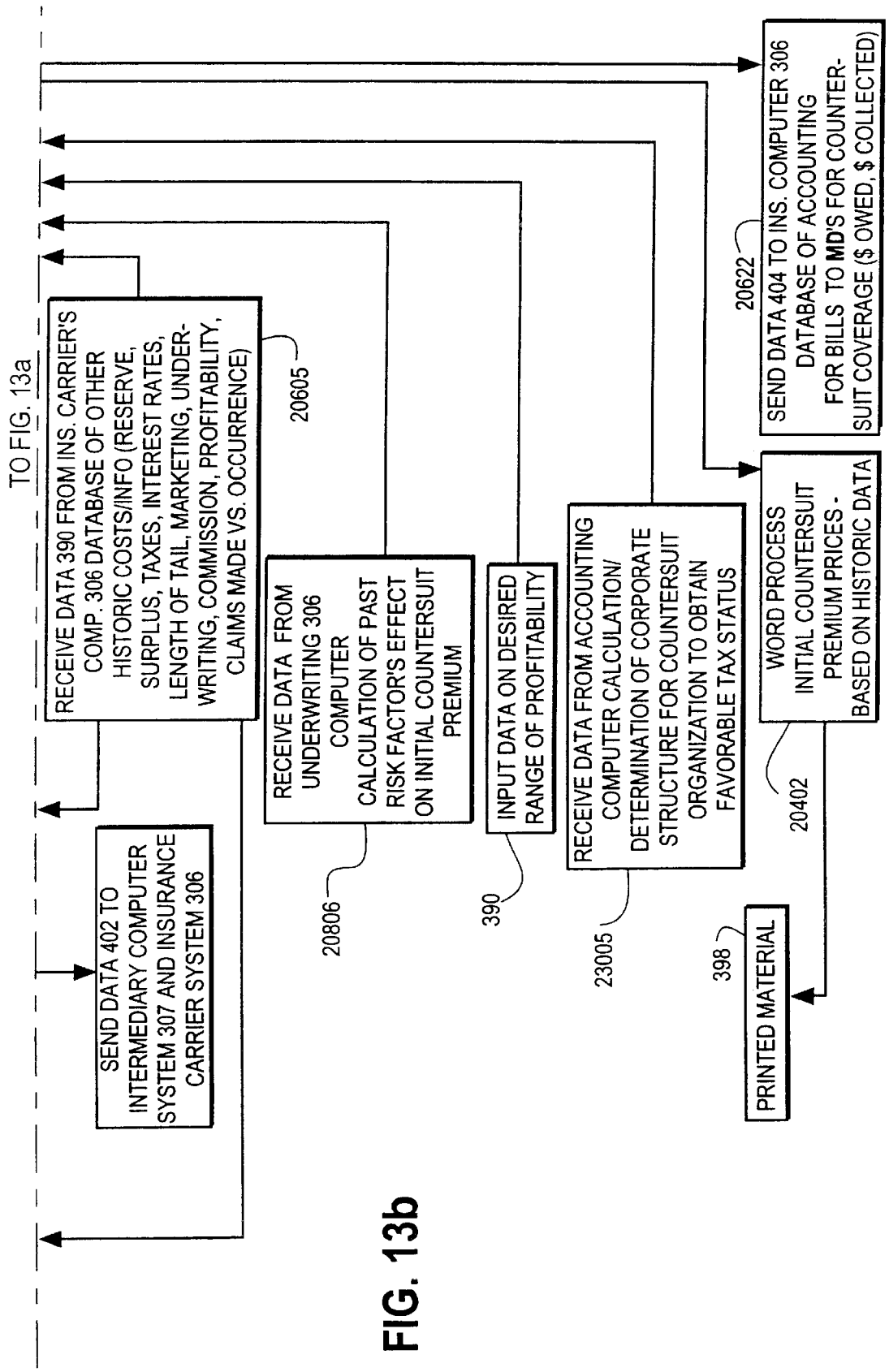
Figure 16:
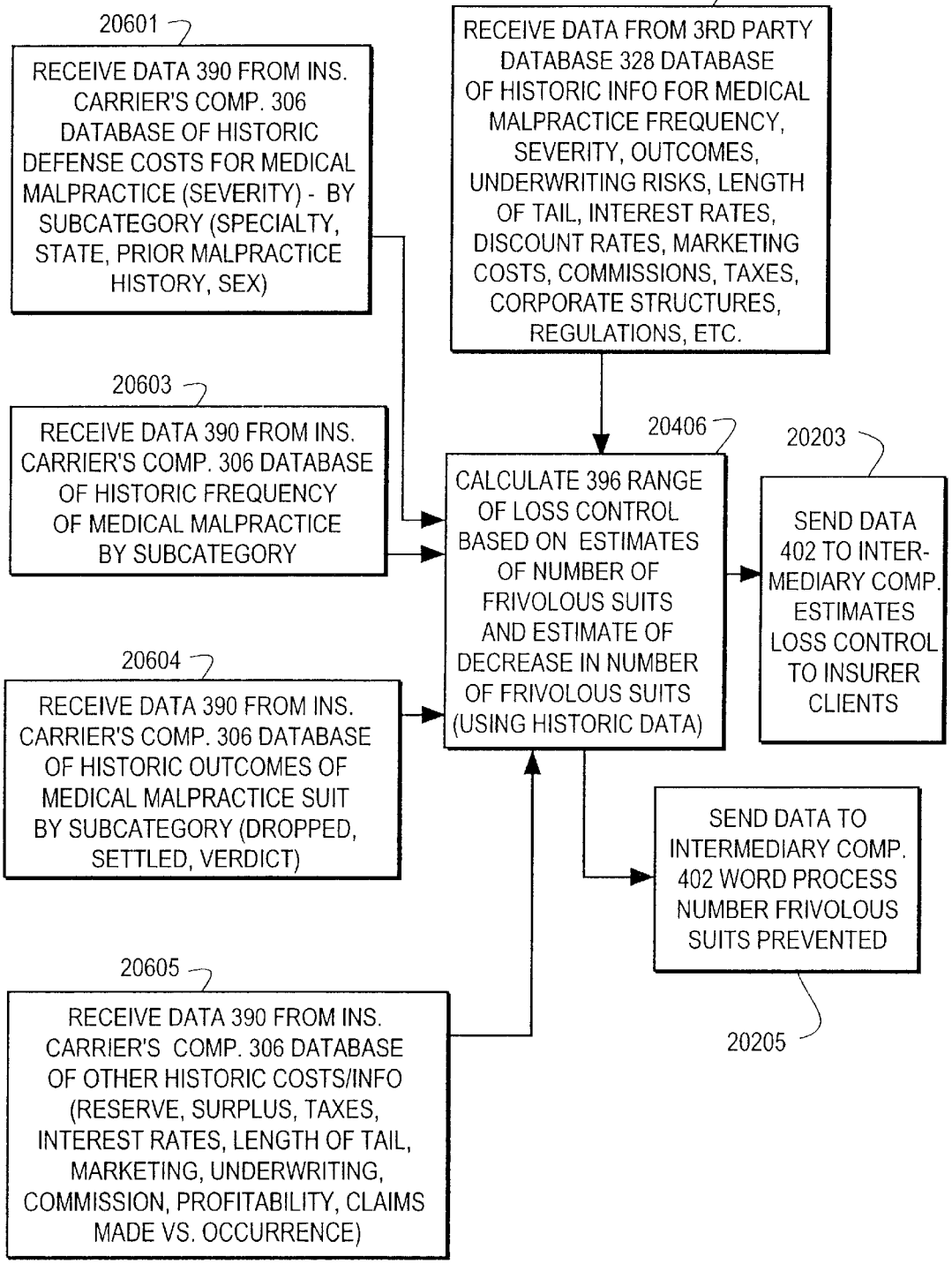
Figure 17:
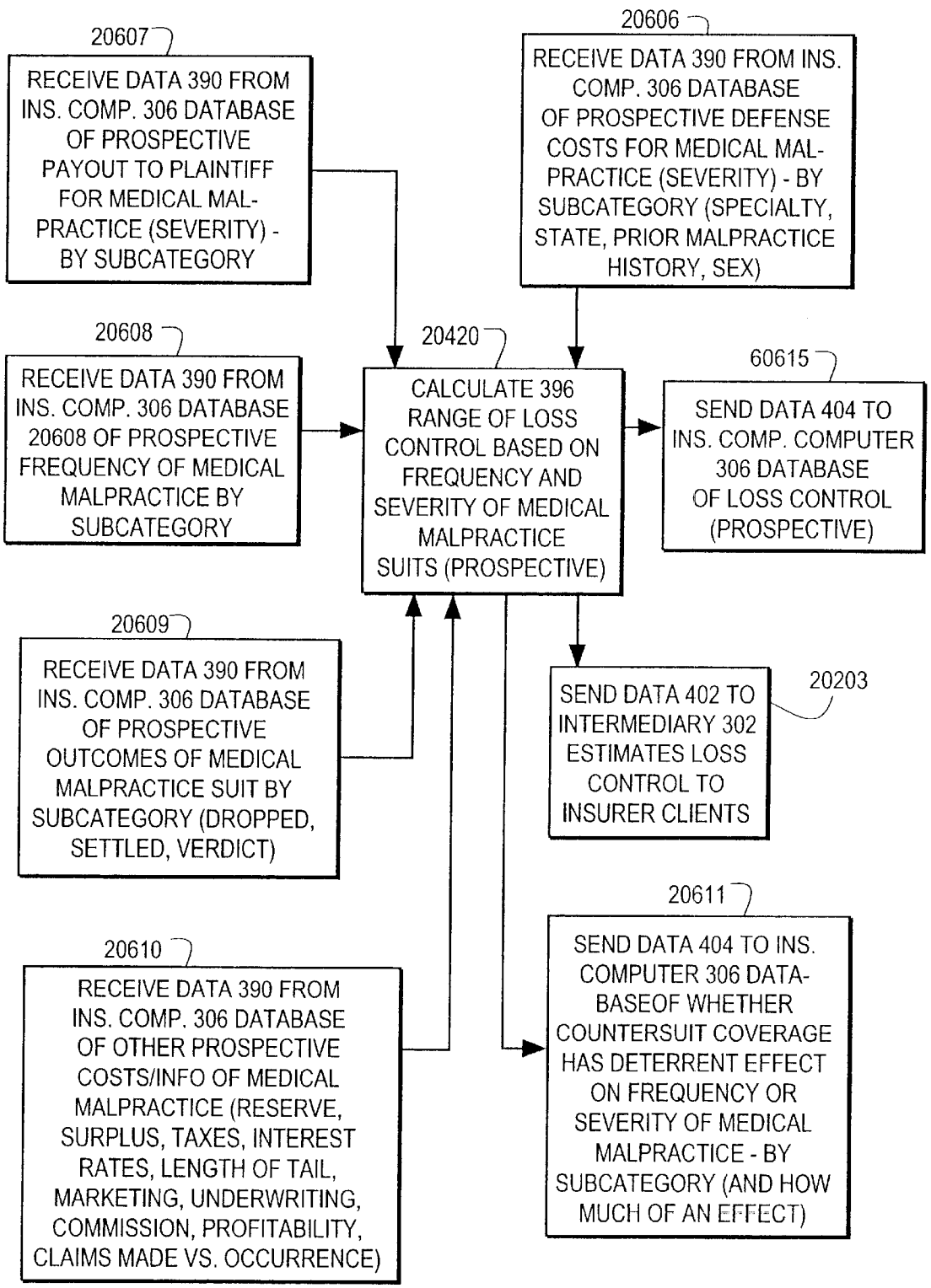
Figure 18:
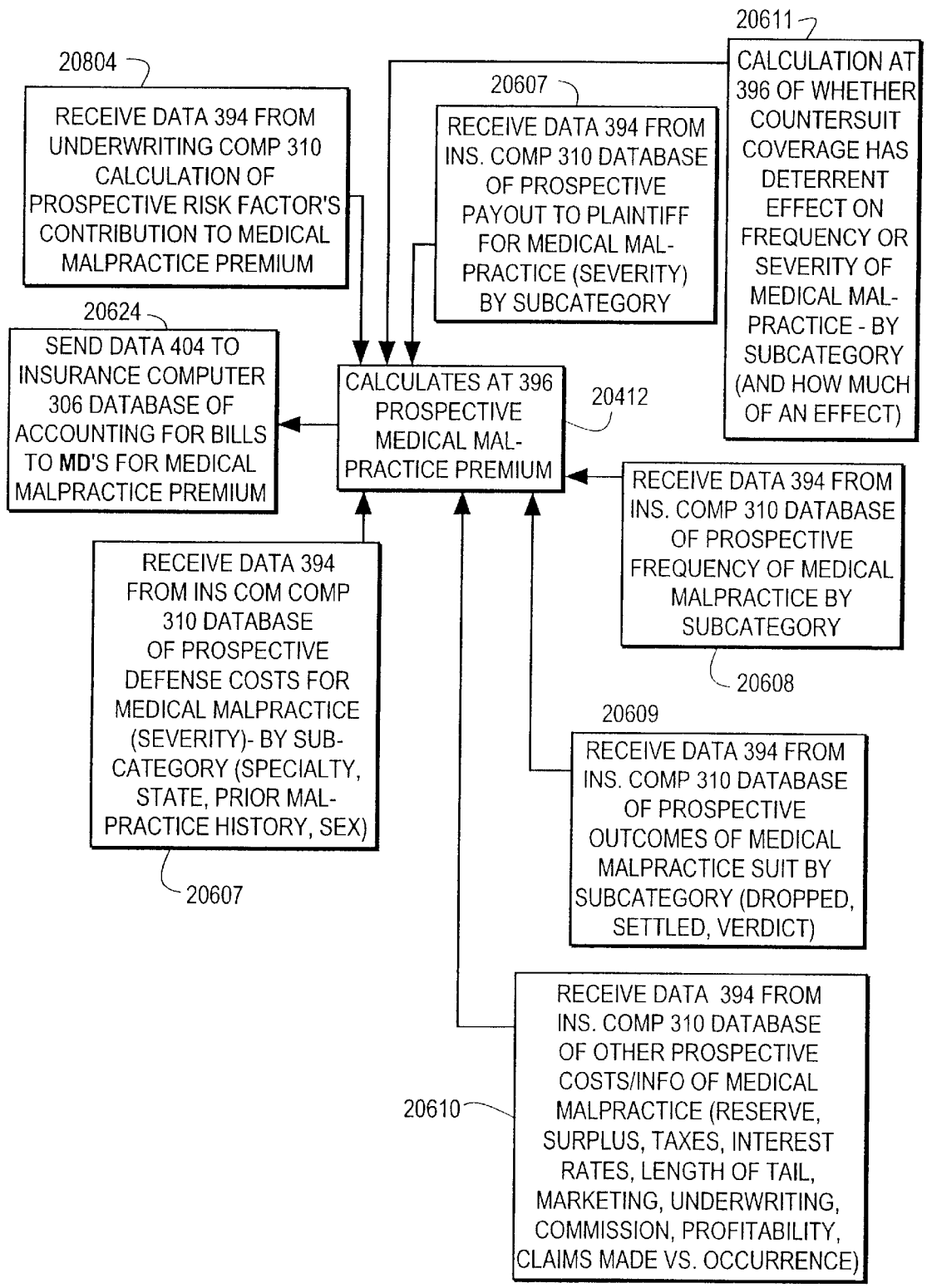
Figure 19D:
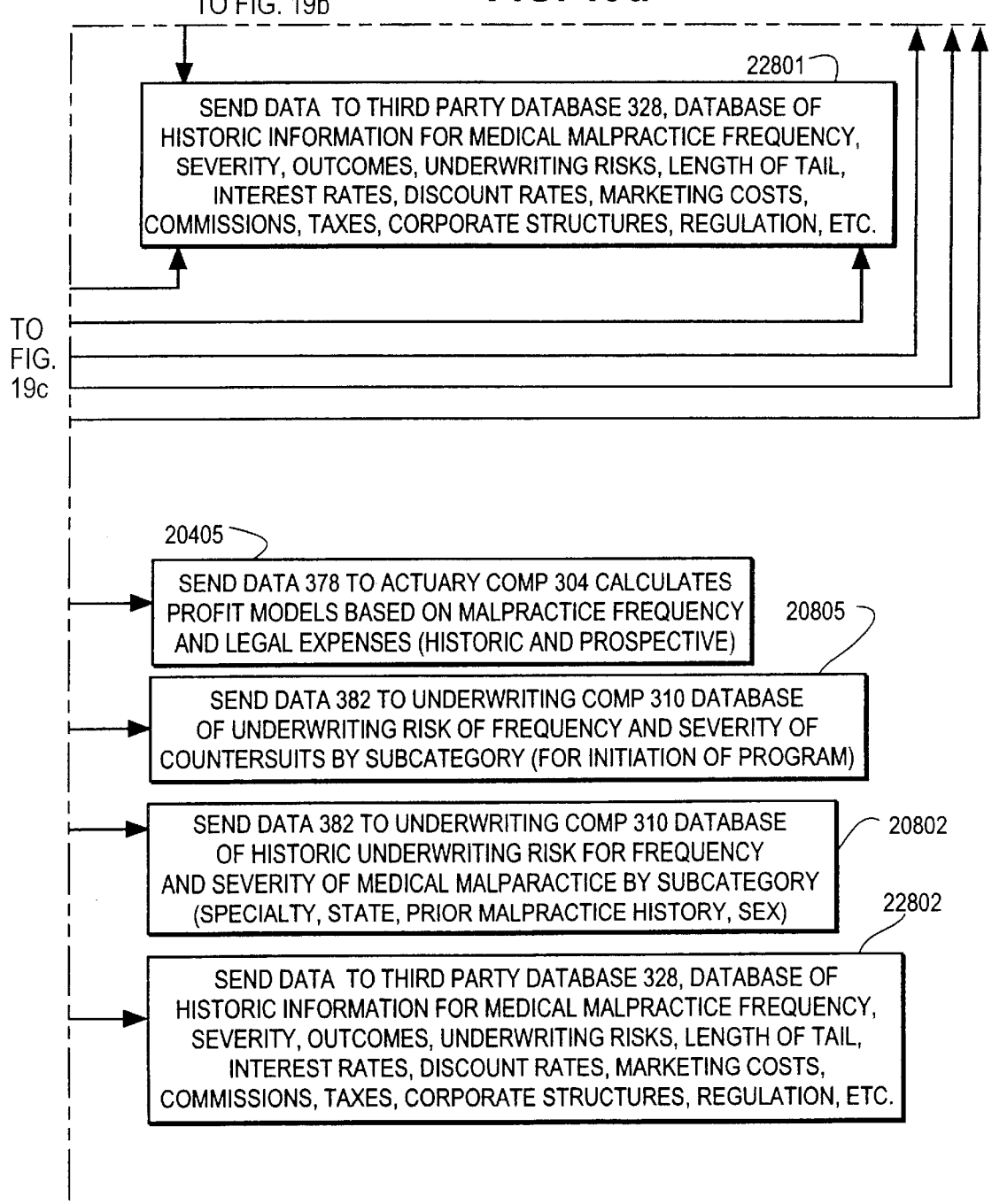
Figure 20A:
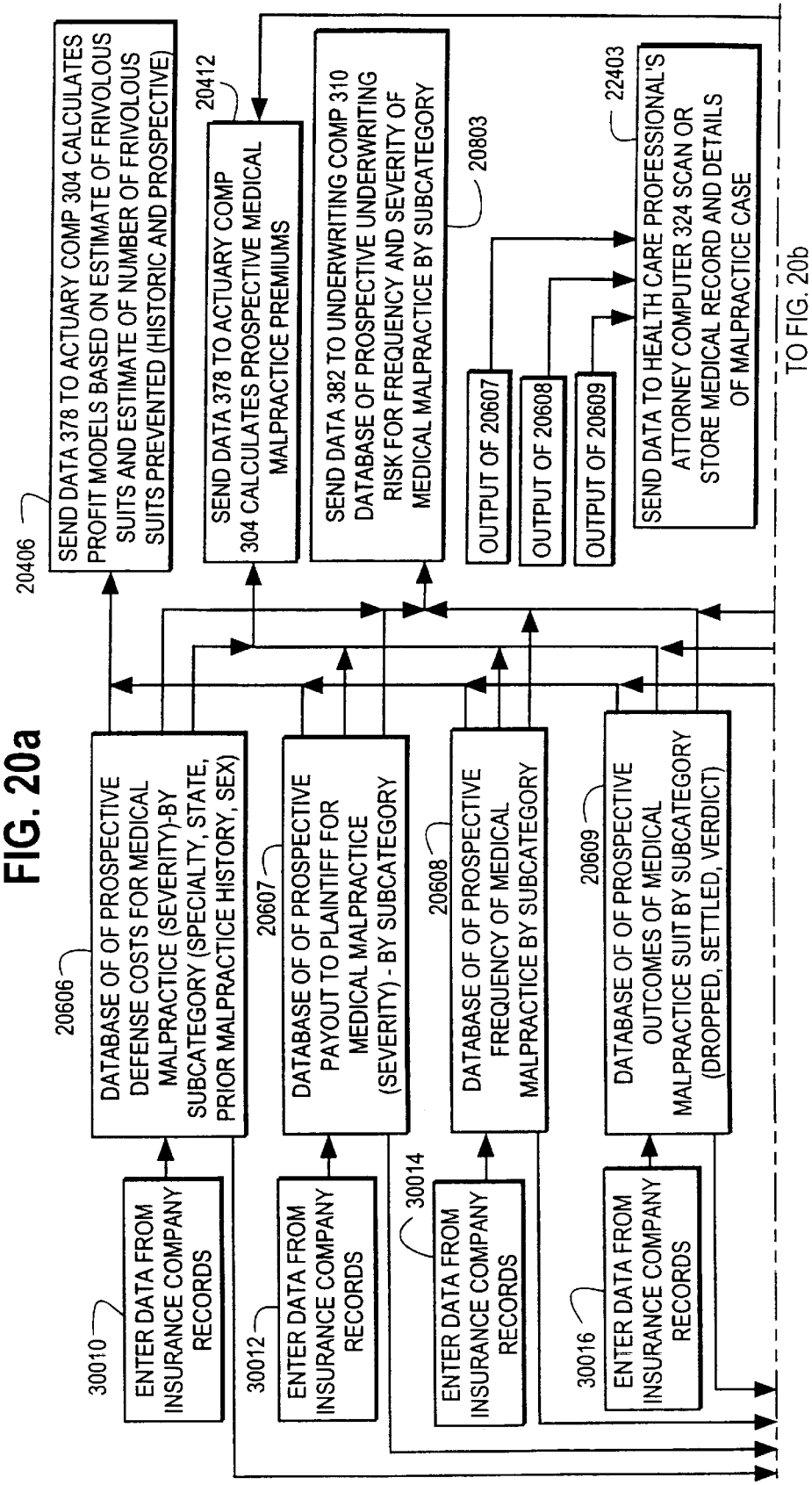
Figure 21:
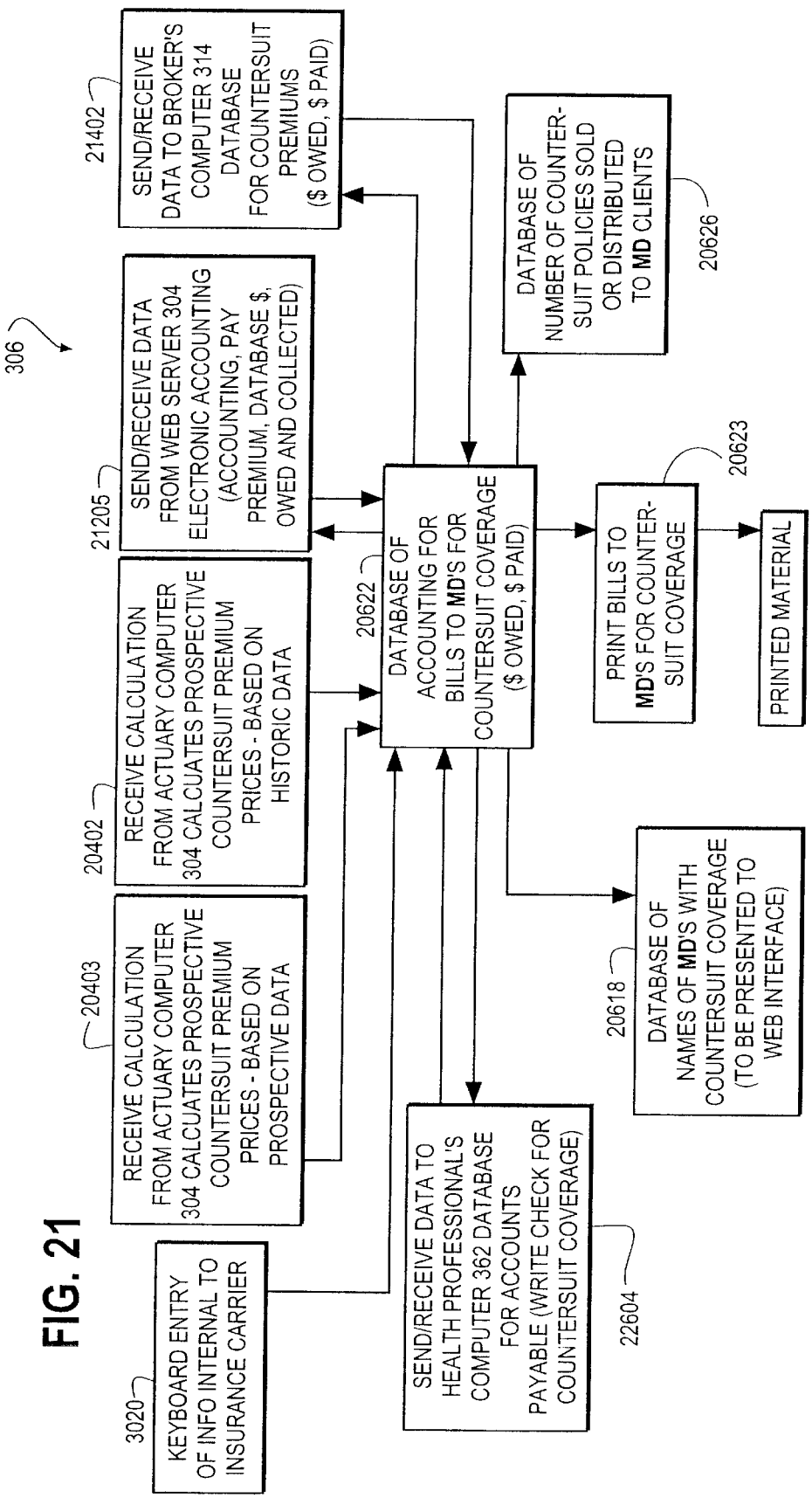
Figure 23A:
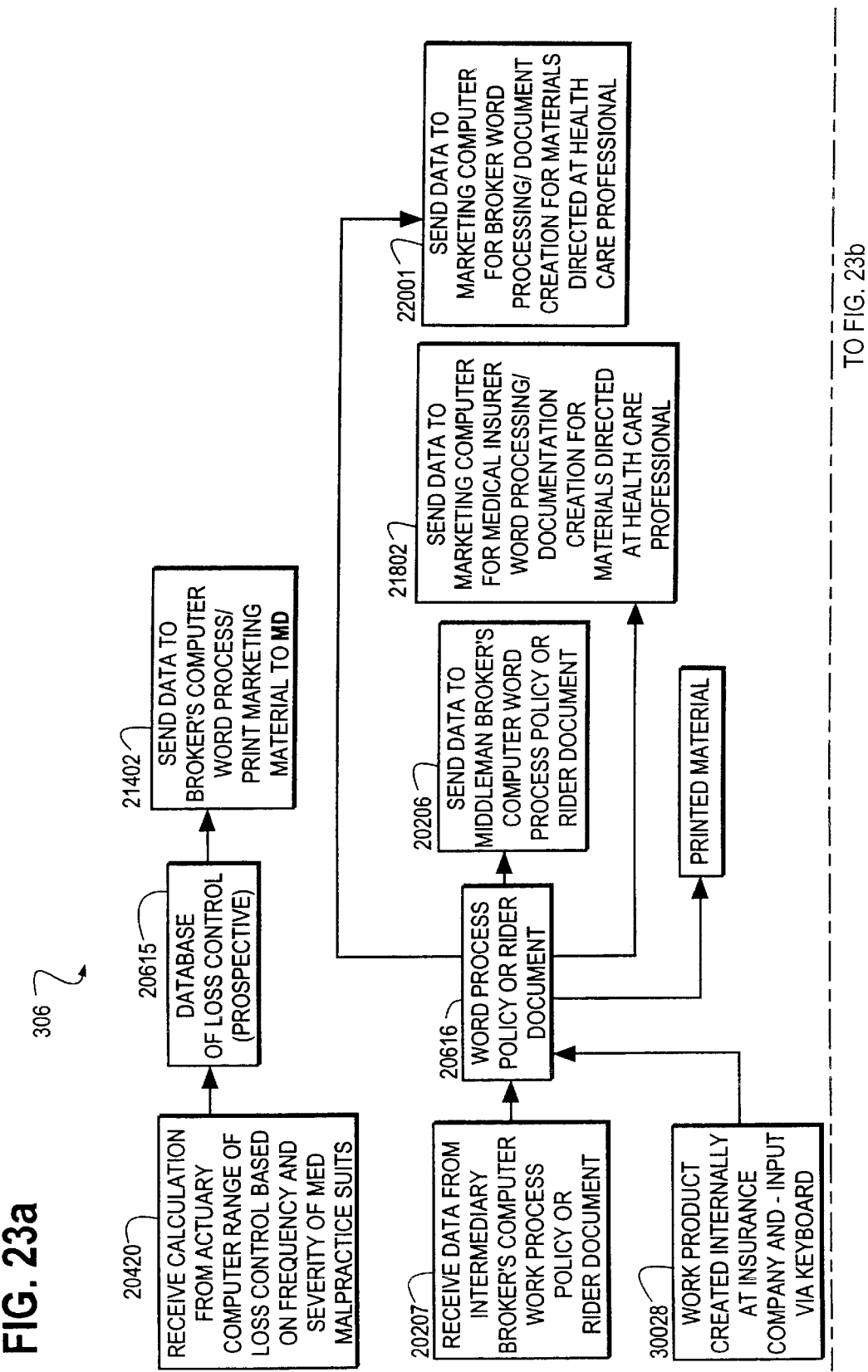
Figure 23B:
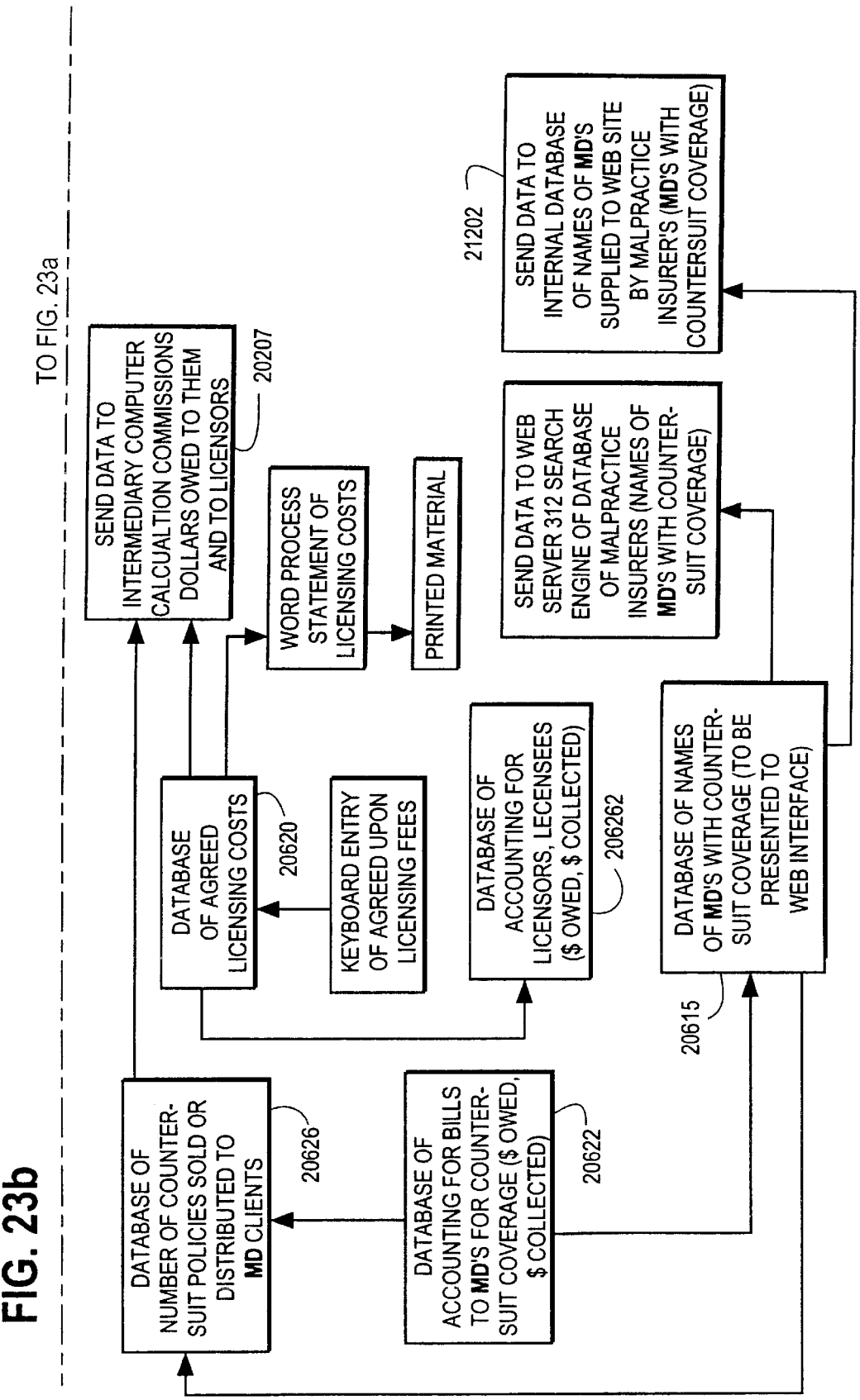
Figure 24A:
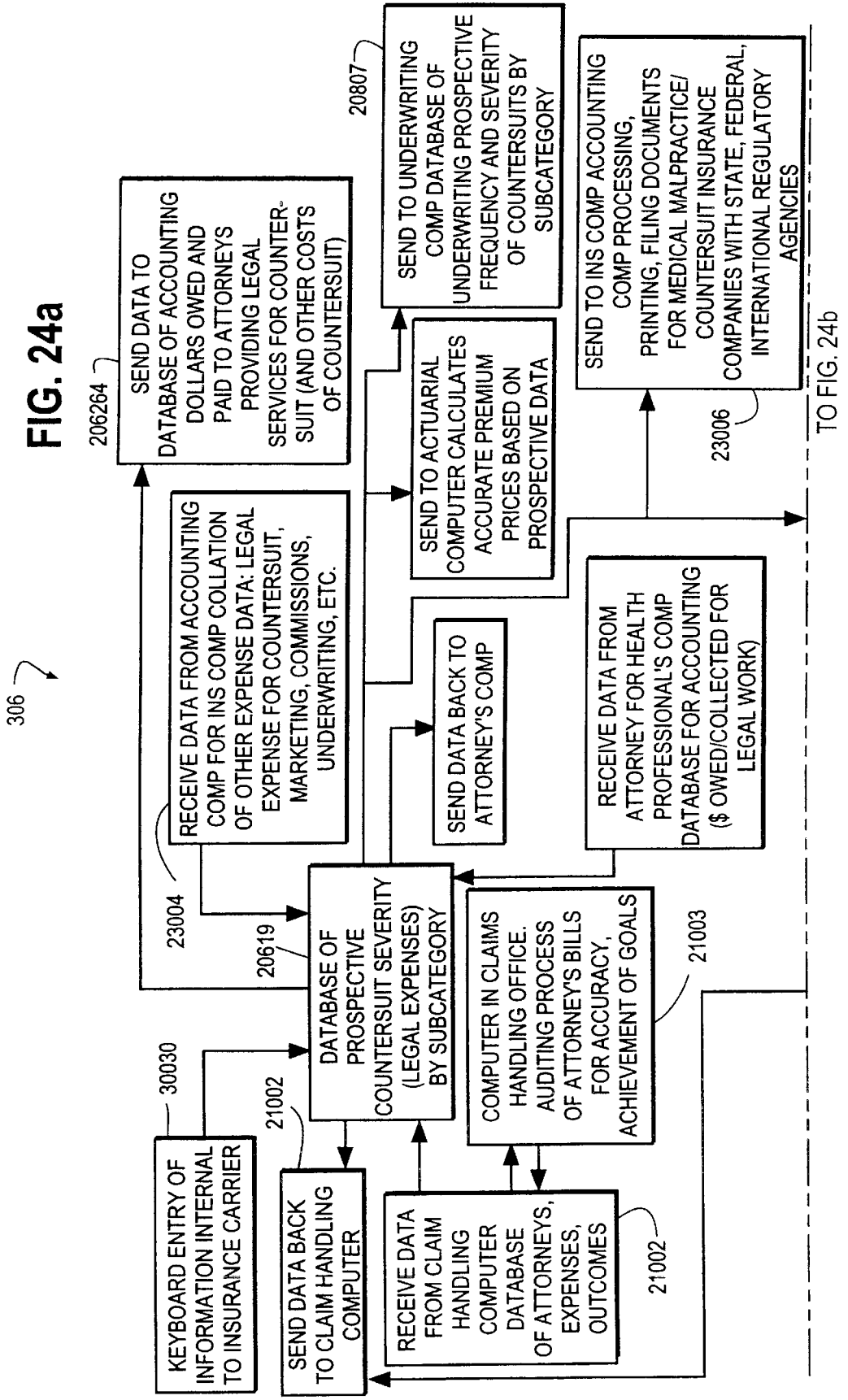
Figure 24B:
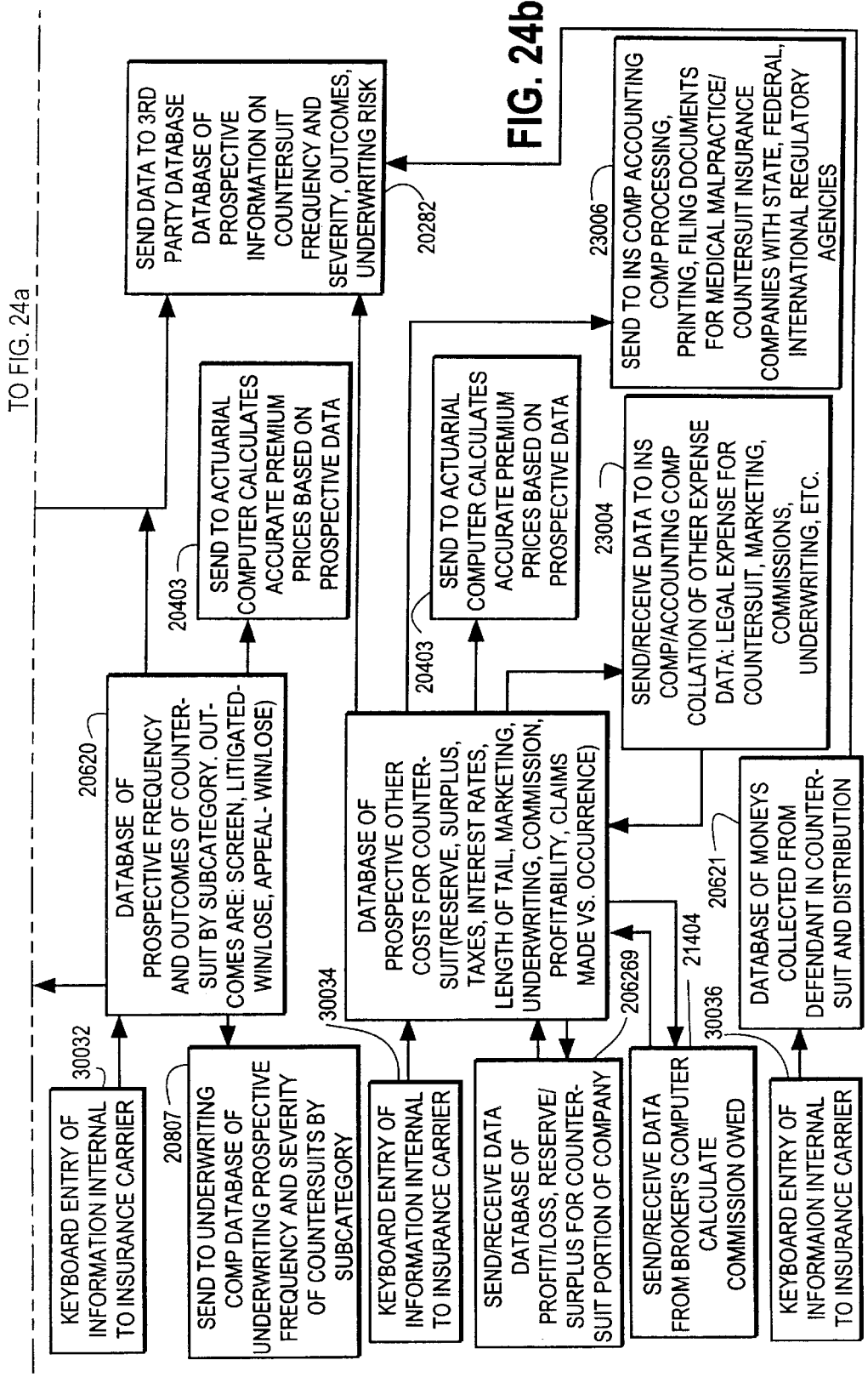
Figure 25A:
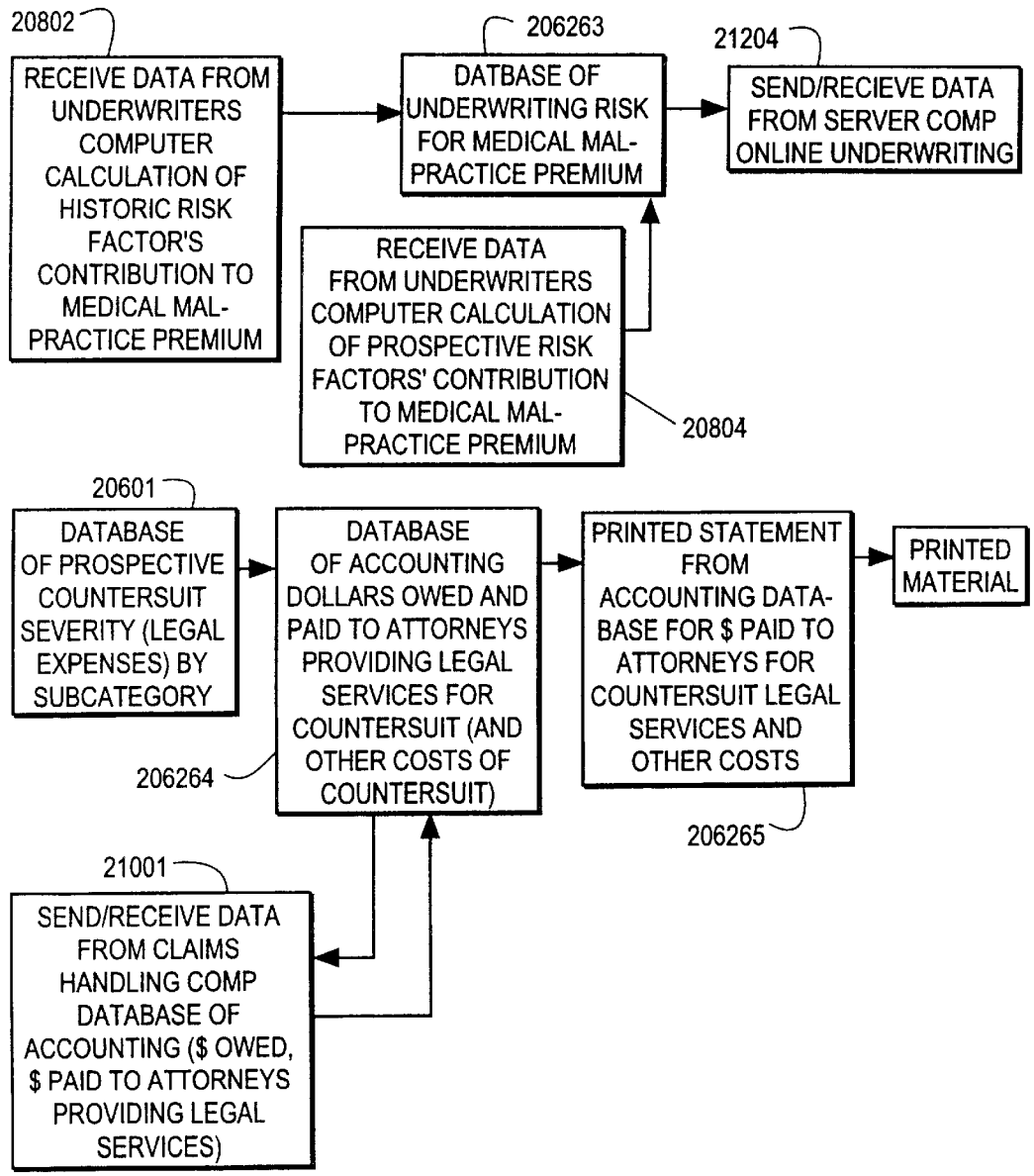
Figure 25B:
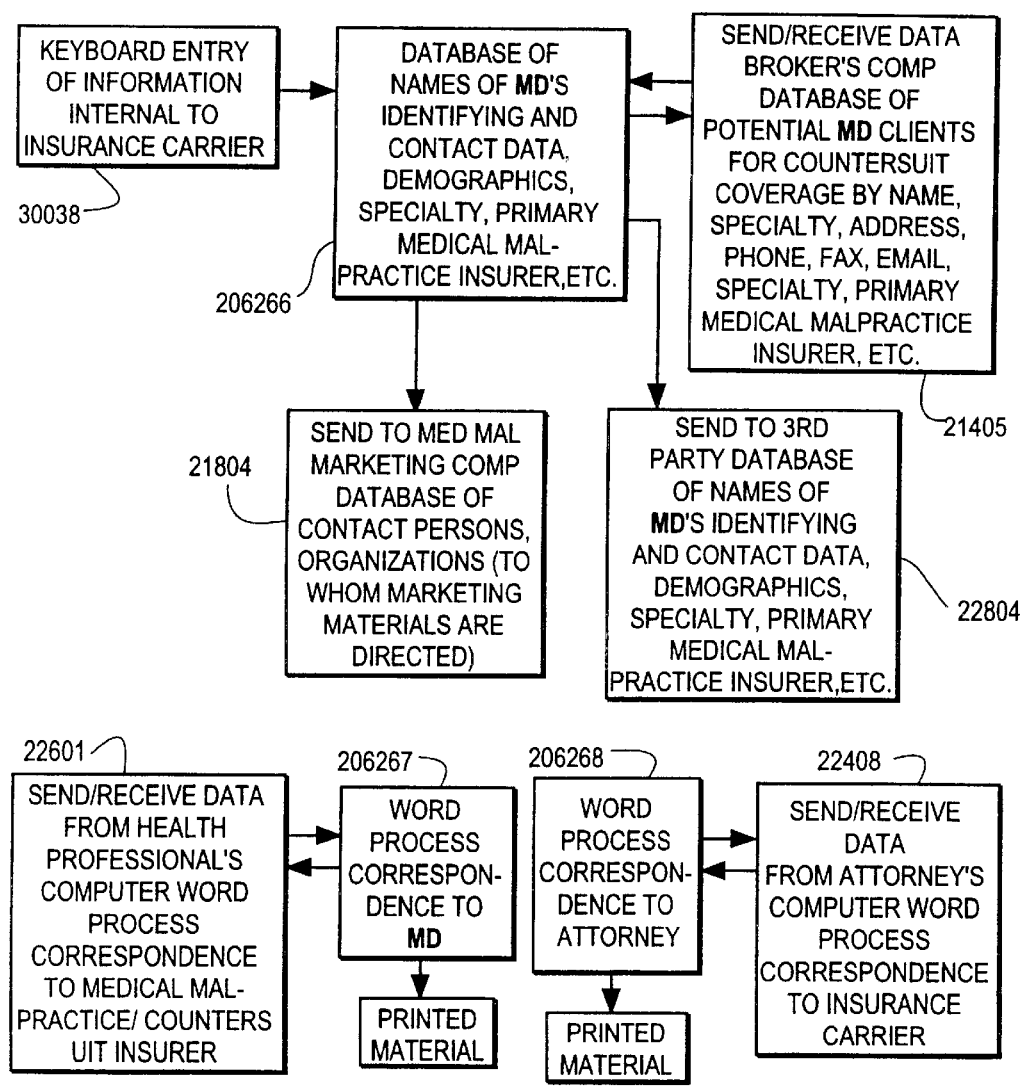
Figure 26B:
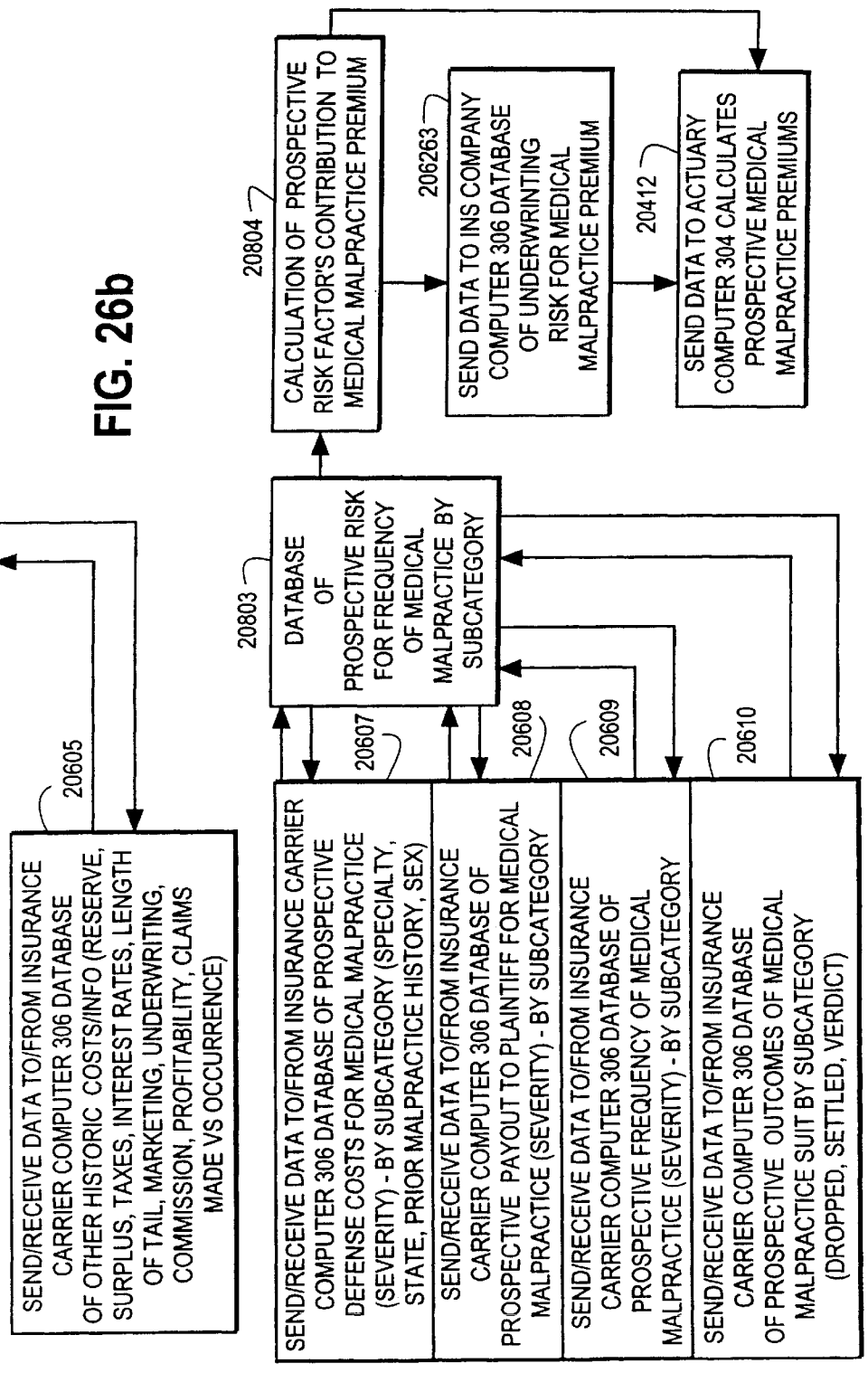
Figure 28:
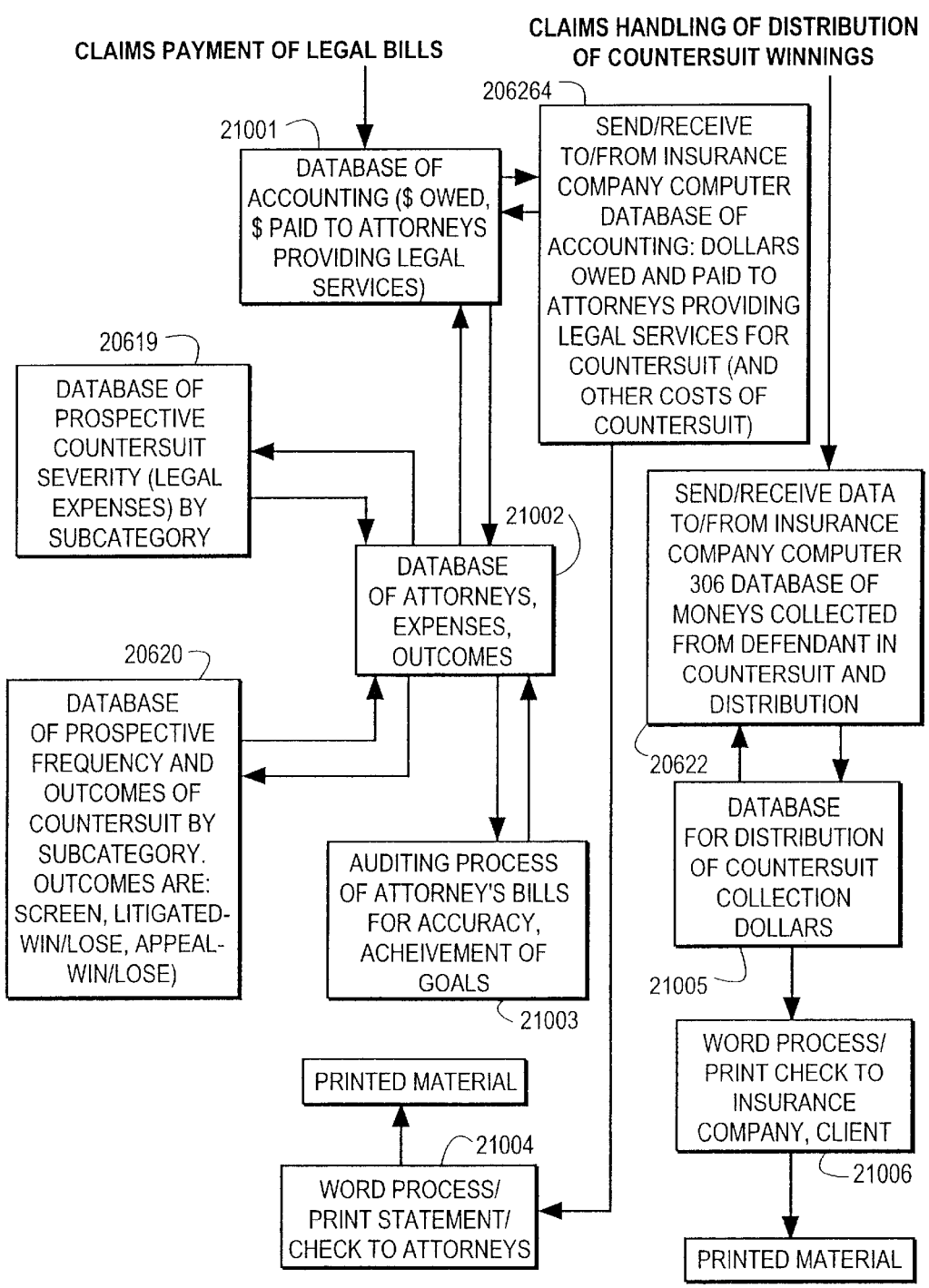
Figure 29A:
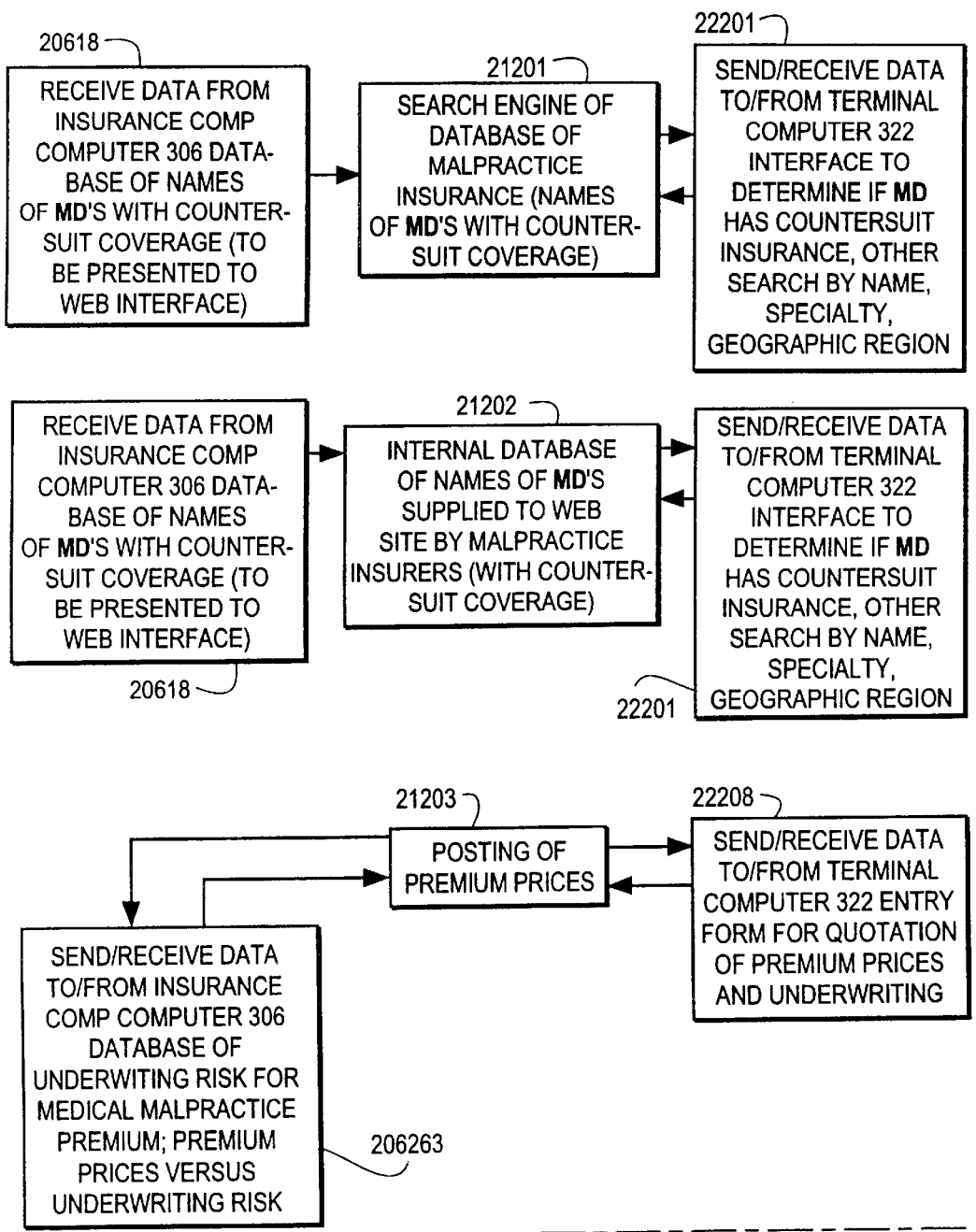
Figure 29B:
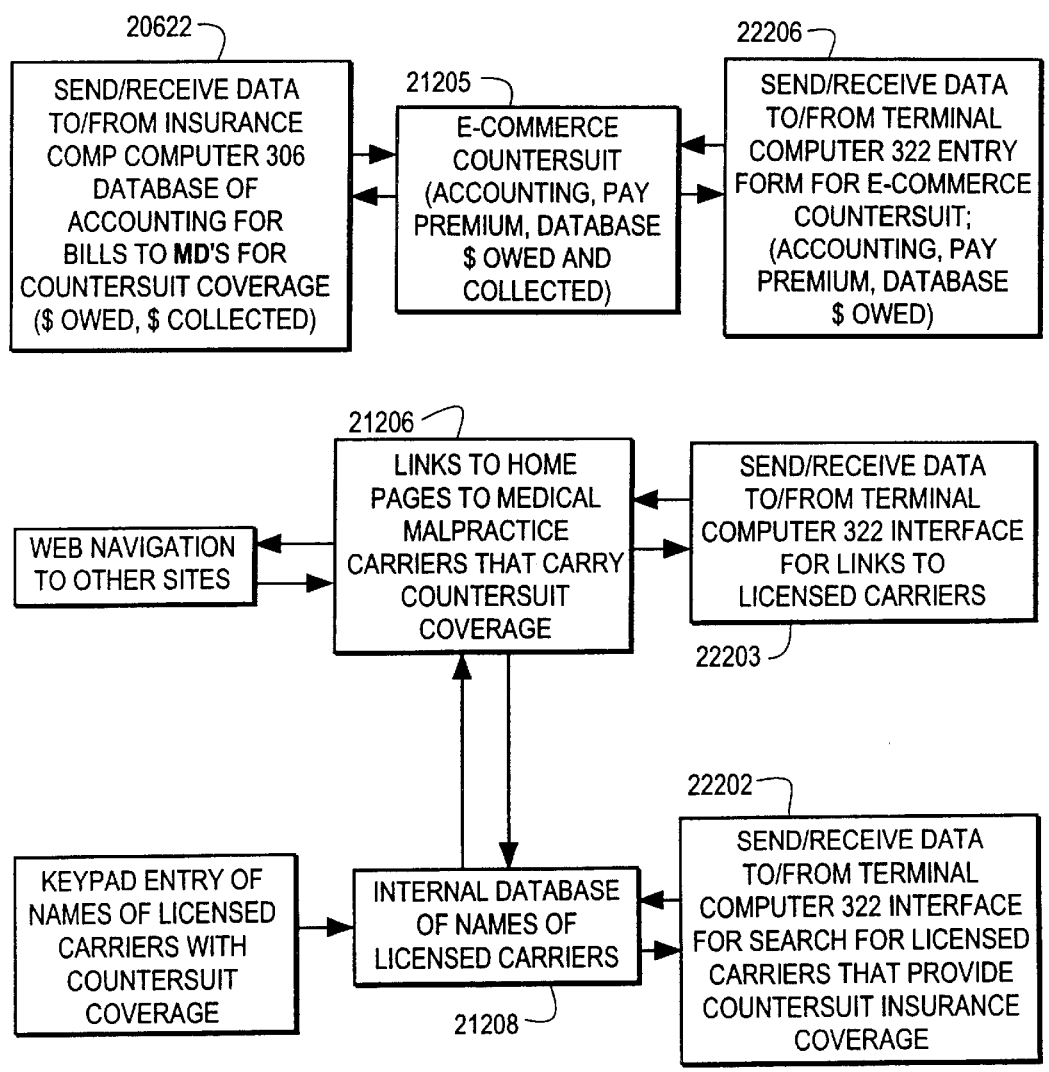
Figure 30A:
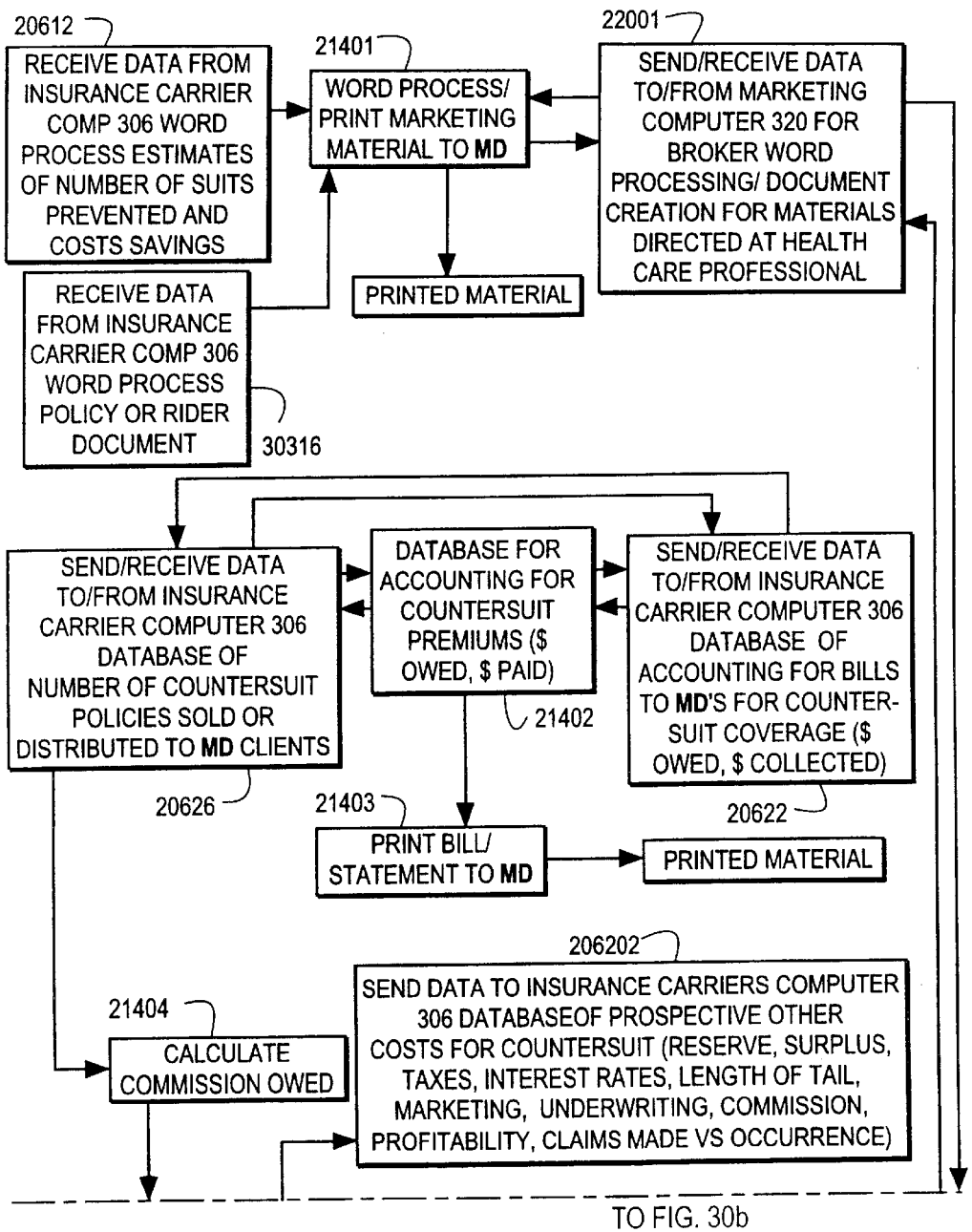
Figure 32B:
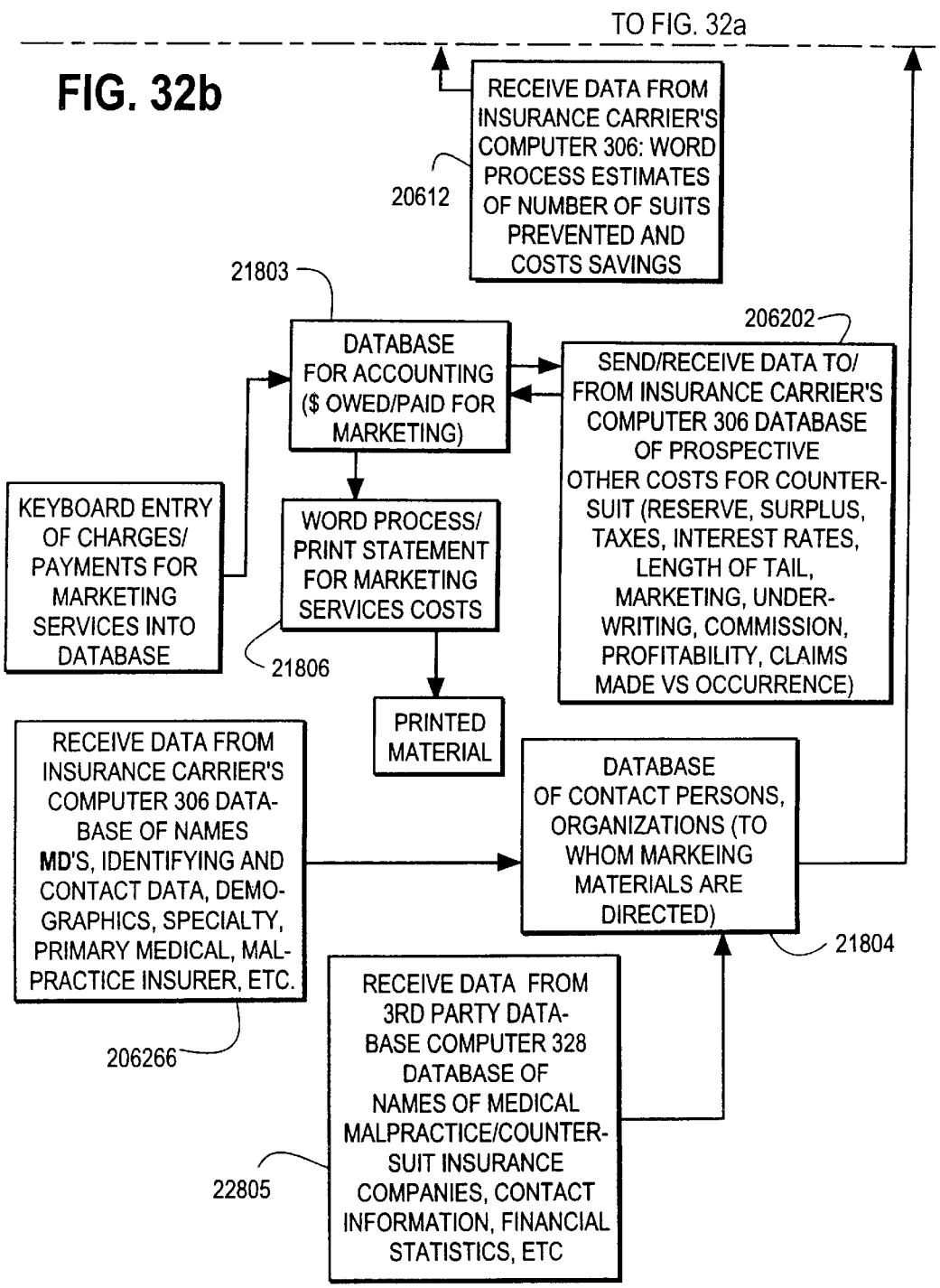
Figure 36:
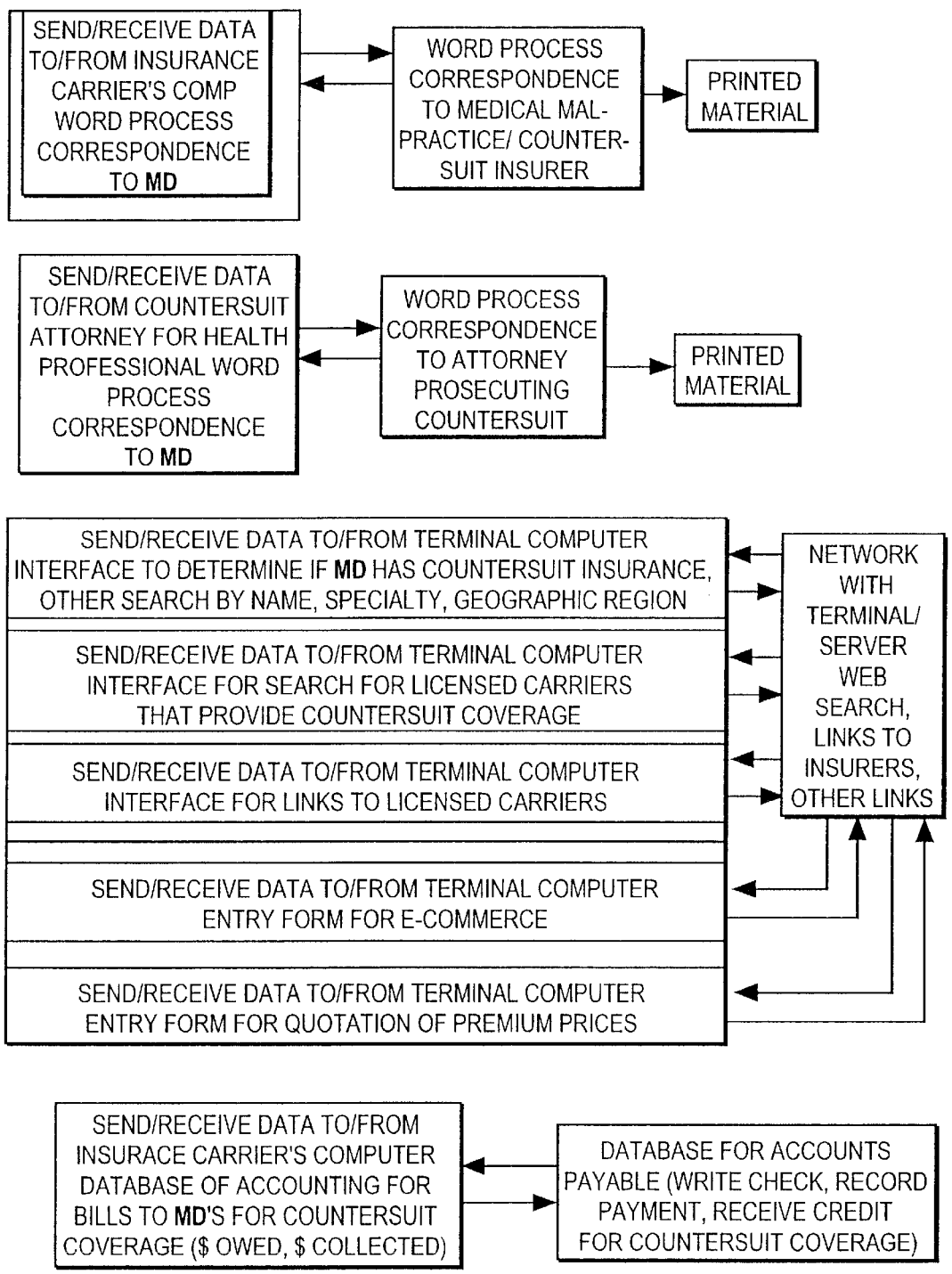
Figure 39A:
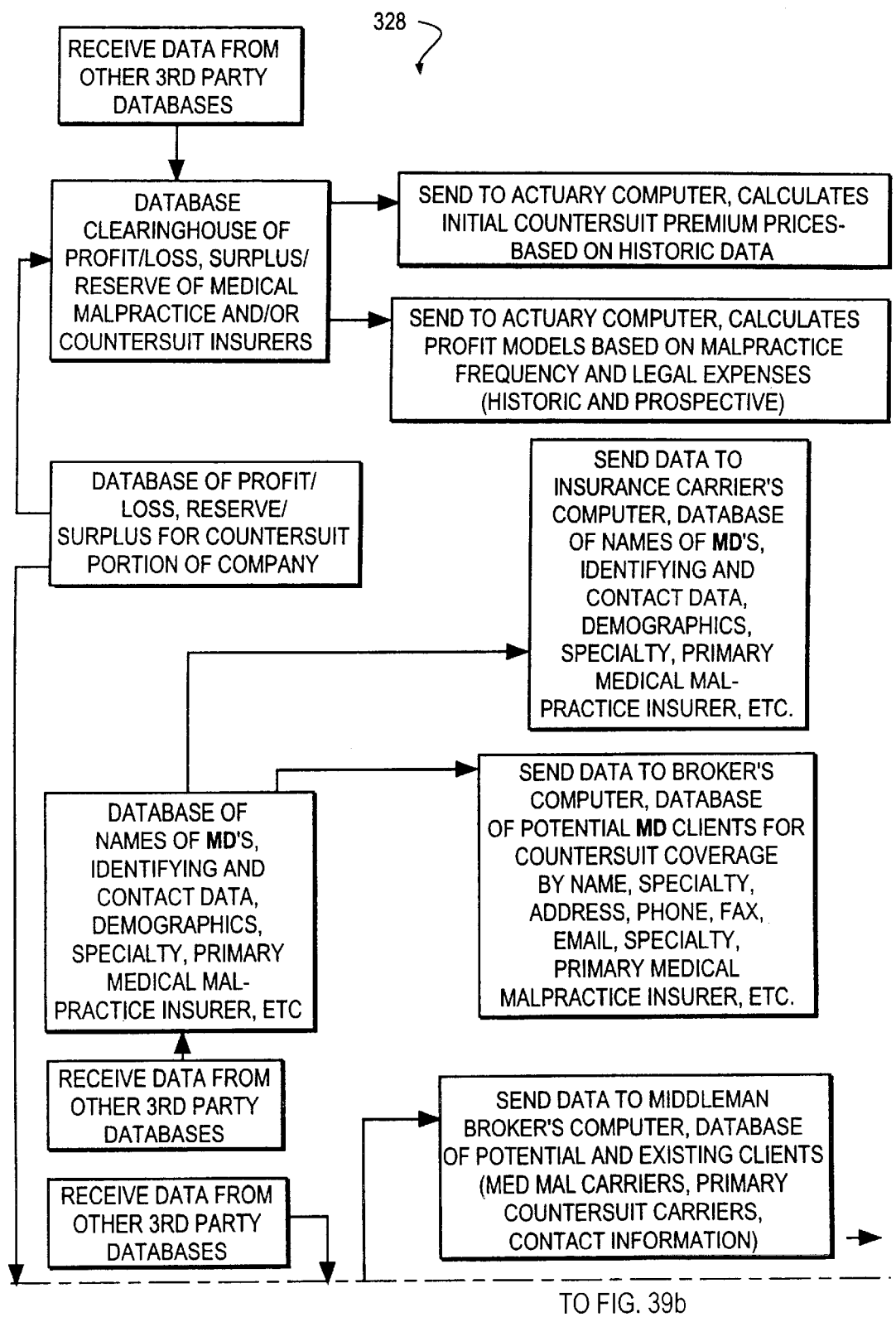
Figure 39B:
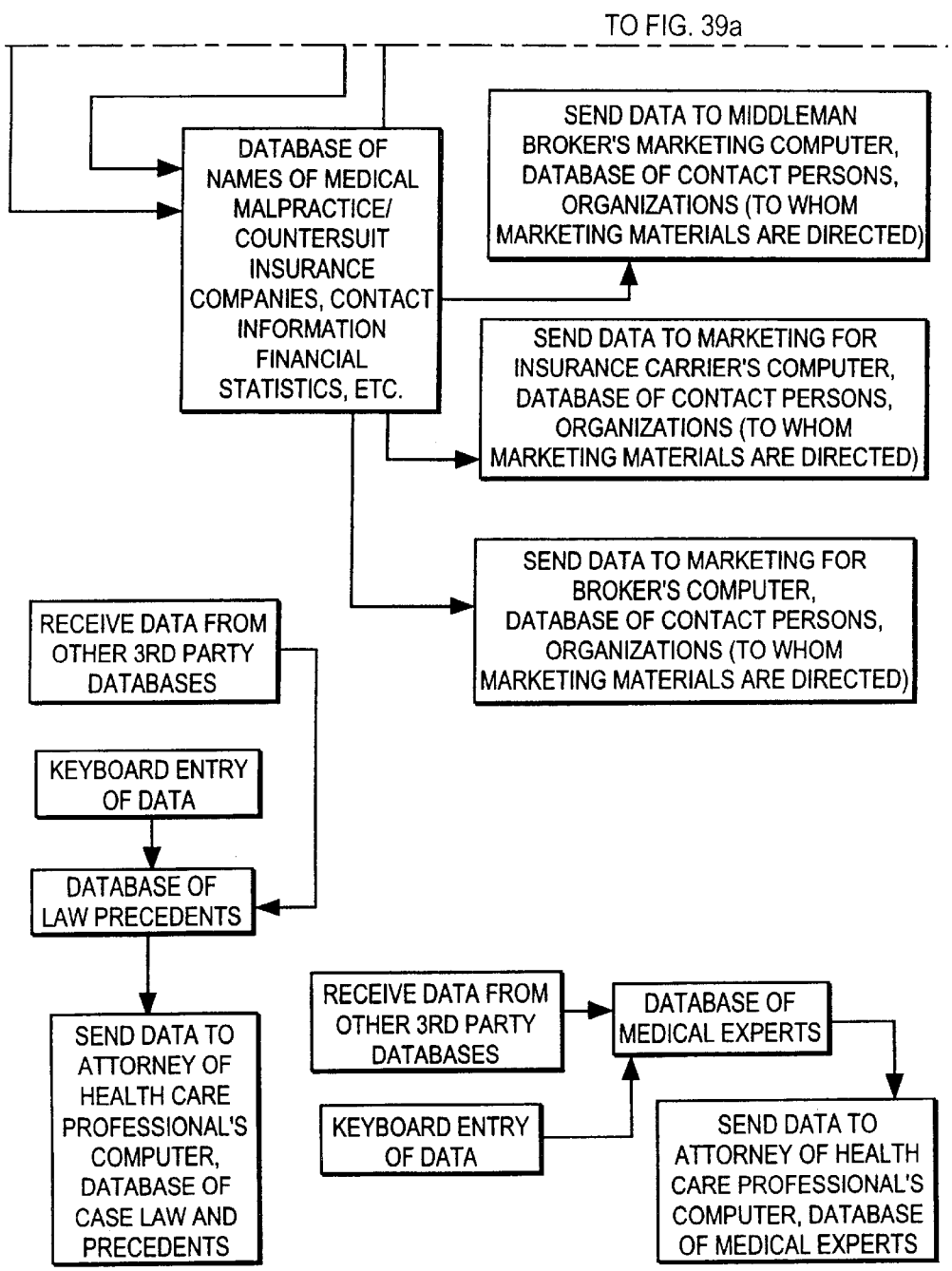
Figure 41:
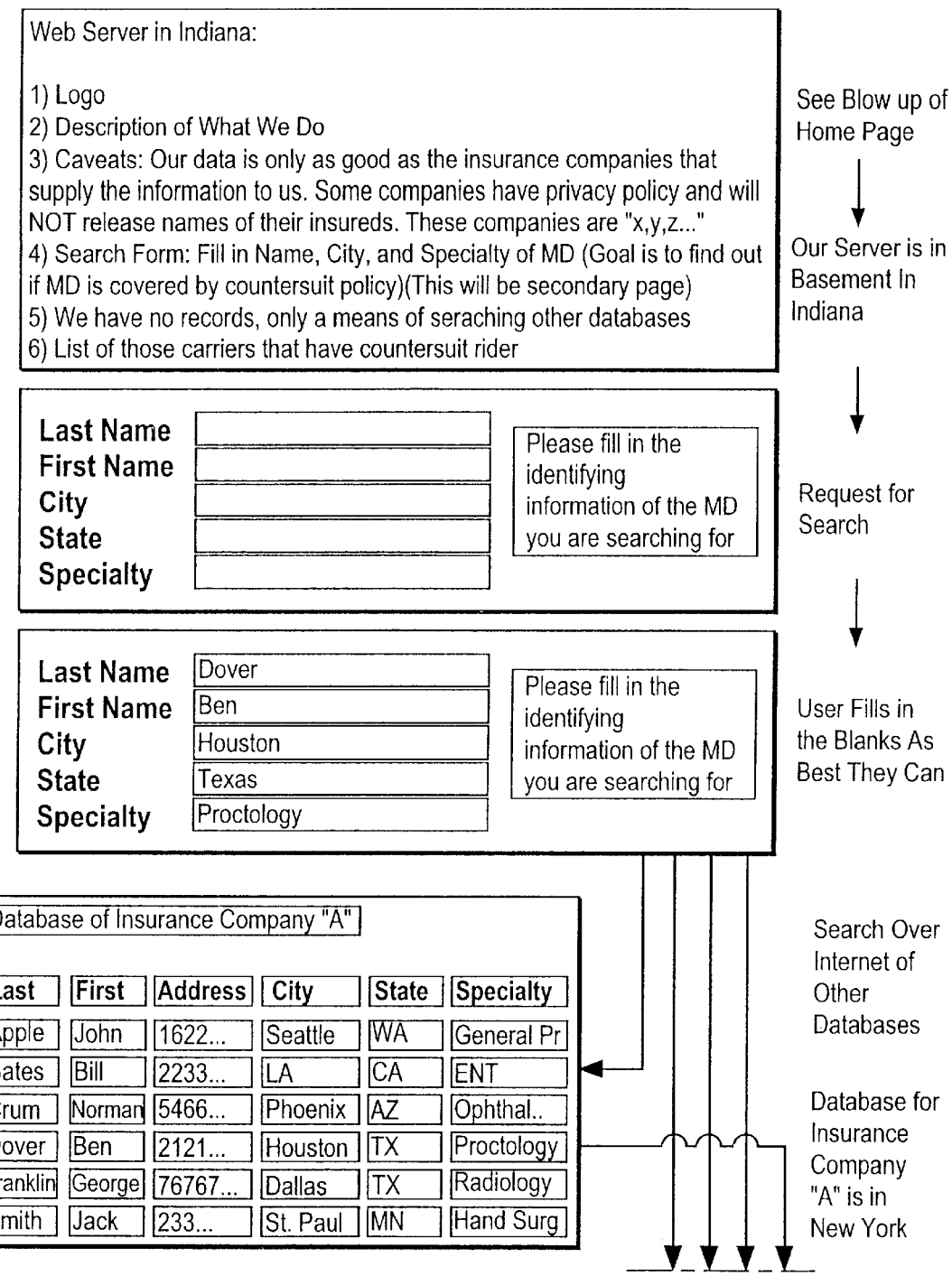
Figure 42:
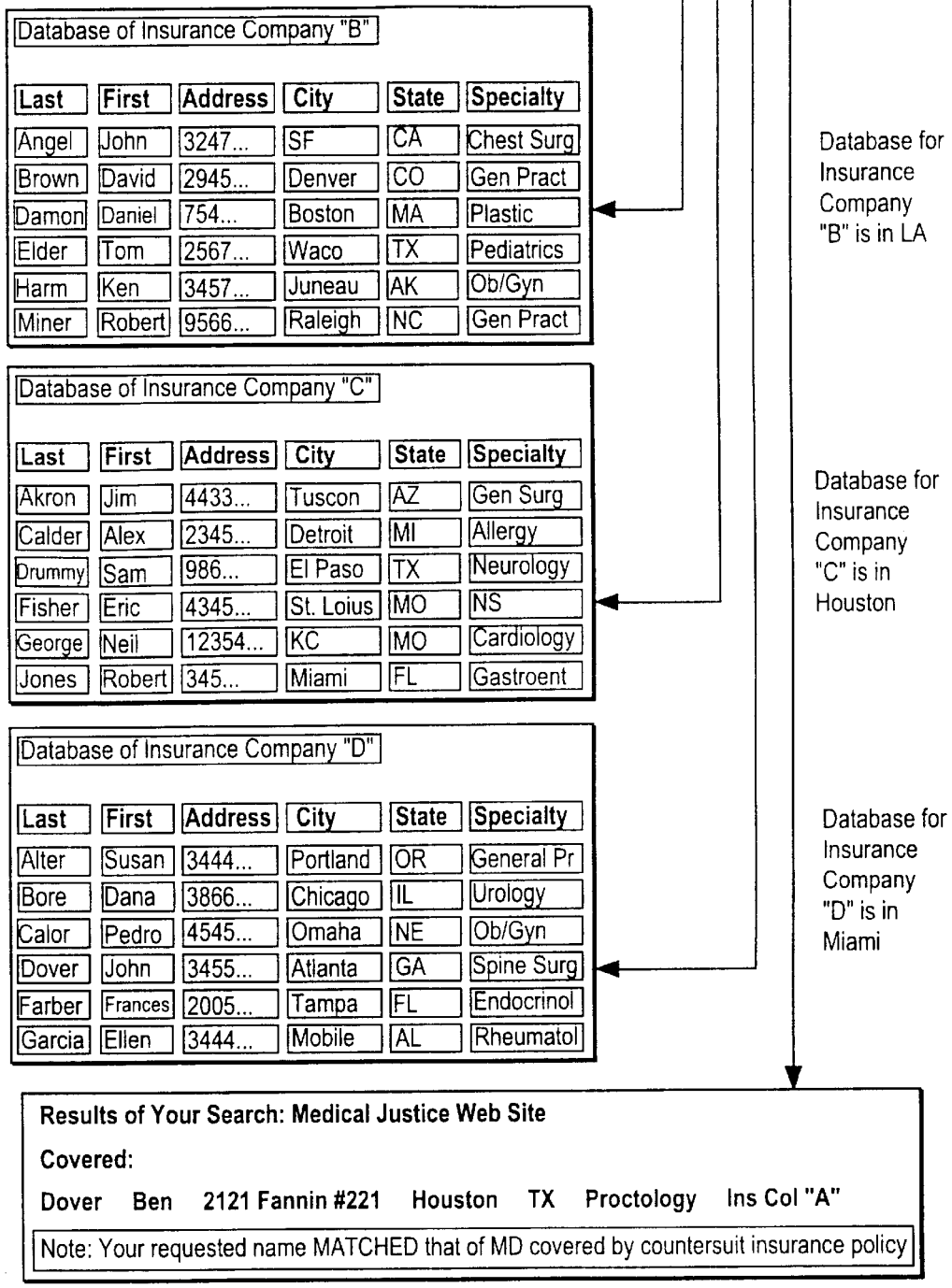
Figure 48:
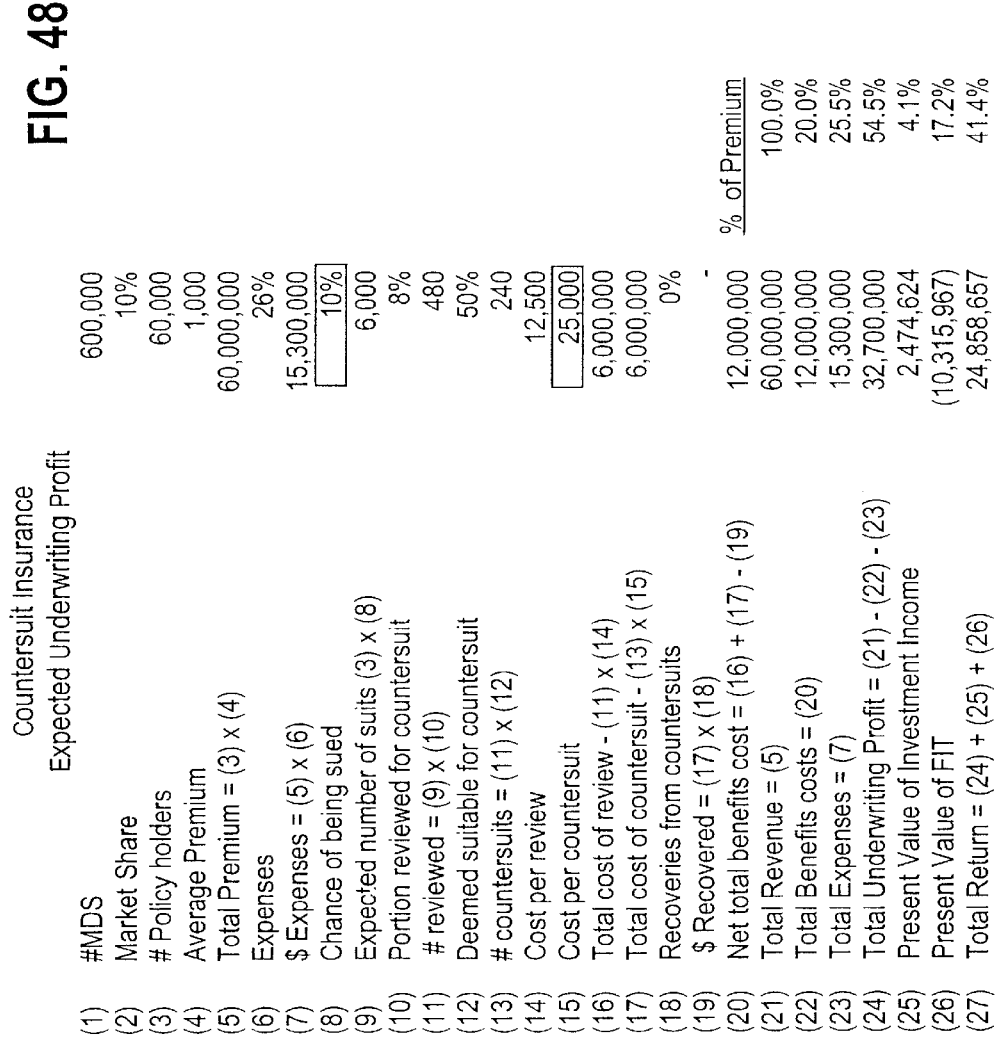

FIGS. 12a and 12b (hereinafter collectively referred to as FIG. 12) are a data processing map for the Intermediary Computer System for the present invention;

FIGS. 13a and 13b (hereinafter collectively referred to as FIG. 13) are a data processing map for the Actuary Computer System for the present invention;

FIG. 14 is another data processing map for the Actuary Computer System for the present invention;

FIG. 15 is still another data processing map for the Actuary Computer System for the present invention;

FIG. 16 is yet another data processing map for the Actuary Computer System for the present invention;

FIG. 17 is an additional data processing map for the Actuary Computer System for the present invention;

FIG. 18 is a further data processing map for the Actuary Computer System for the present invention;

FIGS. 19a, 19b, 19c and 19d (hereinafter collectively referred to as FIG. 19) are a data processing map for the Carrier Computer System for the present invention;

FIGS. 20a and 20b (hereinafter collectively referred to as FIG. 20) are another data processing map for the Carrier Computer System for the present invention;

FIG. 21 is still another data processing map for the Carrier Computer System for the present invention;

FIG. 22 is yet another data processing map for the Carrier Computer System for the present invention;

FIGS. 23a and 23b (hereinafter collectively referred to as FIG. 23) are an additional data processing map for the Carrier Computer System for the present invention;

FIGS. 24a and 24b (hereinafter collectively referred to as FIG. 24) are a further data processing map for the Carrier Computer System for the present invention;

FIGS. 25a and 25b (hereinafter collectively referred to as FIG. 25) are still a further data processing map for the Carrier Computer System for the present invention;

FIGS. 26a and 26b (hereinafter collectively referred to as FIG. 26) are a data processing map for the Underwriting Computer System for the present invention;

FIGS. 27a and 27b (hereinafter collectively referred to as FIG. 27) are another data processing map for the Underwriting Computer System for the present invention;

FIG. 28 is a data processing map for the Claims Handling Computer System for the present invention;

FIGS. 29a and 29b (hereinafter collectively referred to as FIG. 29) are a data processing map for the Front End Network Gateway Computer System for the present invention;

FIGS. 30a and 30b (hereinafter collectively referred to as FIG. 30) are a data processing map for the Broker's Computer System for the present invention;

FIGS. 31a and 31b (hereinafter collectively referred to as FIG. 31) are a data processing map for the Intermediary's Marketing Computer System for the present invention;

FIGS. 32a and 32b (hereinafter collectively referred to as FIG. 32) is a data processing map for the Carrier's Marketing Computer System for the present invention;

FIG. 33 is a data processing map for the Broker's Marketing Computer System for the present invention;

FIG. 34 is a data processing map for Terminal Computer Systems for the present invention;

FIGS. 35a and 35b (hereinafter collectively referred to as FIG. 35) are a data processing map for the Insured's Attorney's Computer System for the present invention;

FIG. 36 is a data processing map for the Insured's Computer System for the present invention;

FIGS. 37a and 37b (hereinafter collectively referred to as FIG. 37) are a data processing map for the Accounting Computer System for the present invention;

FIGS. 38a and 38b (hereinafter collectively referred to as FIG. 38) are a data processing map for the Third Party Database Computer System for the present invention;

FIGS. 39a and 39b (hereinafter collectively referred to as FIG. 39) are another data processing map for the Third Party Database Computer System for the present invention;

FIG. 40 is a home page for the present invention;

FIG. 41 is a web page for the present invention;

FIG. 42 is another web page for the present invention;

FIGS. 43a and 43b (hereinafter collectively referred to as FIG. 43) are a web page for the present invention;

FIG. 44 is another web page for the present invention;

FIG. 45 is a first specimen of representative output generated in connection with determining a premium structure for the present invention;

FIG. 46 is a second specimen of representative output generated in connection with determining a premium structure for the present invention;

FIG. 47 is a third specimen of representative output generated in connection with determining a premium structure for the present invention;

FIG. 48 is a forth specimen of representative output generated in connection with determining a premium structure for the present invention;

FIG. 49 is a fifth specimen of representative output generated in connection with determining a premium structure for the present invention;

FIG. 50 is a sixth specimen of representative output generated in connection with determining a premium structure for the present invention;

FIGS. 51a and 51b (hereinafter collectively referred to as FIG. 51) is a seventh specimen of representative output generated in connection with determining a premium structure for the present invention;

FIG. 52 is a eighth specimen of representative output generated in connection with determining a premium structure for the present invention;

FIG. 53 is a ninth specimen of representative data useful in connection with determining a premium structure for the present invention;

FIG. 54 is a tenth specimen of representative data useful in connection with determining a premium structure for the present invention;

FIG. 55 is an eleventh specimen of representative data useful in connection with determining a premium structure for the present invention;

FIG. 56 is a twelfth specimen of representative data useful in connection with determining a premium structure for the present invention;

FIG. 57 is a thirteenth specimen of representative data useful in connection with determining a premium structure for the present invention;

FIG. 58 is a fourteenth specimen of representative data useful in connection with determining a premium structure for the present invention;

FIG. 59 is a specimen of representative marketing documentation including a graphical representation of a pay out pattern for the present invention; and FIG. 60 is a fifteenth specimen of representative data useful in connection with determining a premium structure for the present invention.

DETAILED DESCRIPTION OF THE INVENTION

According to the present invention, the incidence of litigation (especially medical malpractice claims) is reduced because a credible threat of a funded counterclaim (claims within the suit, or separate countersuit, say for prosecution of a frivolous claim) exists. That threat is created and backed up by the availability of "counterclaim insurance" which, under appropriate conditions, will pay the costs of any counter litigation against the proponent of a claim and/or complaint. Potential defendants in such a counterclaim could include the original plaintiff (i.e., in a medical malpractice context, the patient who had claimed injury), the original plaintiff's attorney, and any expert on behalf of the original plaintiff. The insurance of the invention could be offered as a separate insurance policy, but more preferably could be offered as a rider, e.g., to a standard medical malpractice insurance policy.

Once an applicant has been accepted for coverage under a policy or rider of the insurance according to the present invention, the insured's name and other data would be entered into the carrier's computer system. In addition to all the standard processing that would normally be carried out in connection with the issuance and support of a policy of insurance, the system would copy the insured's name to a database of covered individuals to be publicized. It is believed that the publicizing of names of those insured, such as physicians covered by the insurance, will deter the filing of such claims as frivolous medical malpractice claims because those who might bring such claims would have to consider the possibility that the physician might prevail in defending against the claim and would then institute a counterclaim, e.g., for malicious prosecution.

Note again that the counterclaim insurance could work the other way around, for example, if an attorney files suit for non-payment of a legal bill, the insurance policy could fund a malpractice counterclaim or separate proceeding against the attorney. In providing an incentive not to litigate, the insurance could fund completely unrelated causes of action: slip-and-fall complaint by a sailor could trigger a maritime countersuit, or whatever.

The database of names of those covered preferably will be available to the public via a public data network such as the Internet or World Wide Web. However, the database could also be available on a private network, or on a dial-up "BBS" or "bulletin board system." Preferably, all providers of counterclaim insurance would make their databases of those covered available at a common location.

It is preferred that public access to the database be without cost to the computer-querying member of the public, so as not to discourage potential plaintiffs or their attorneys from querying the database. In the case of a dial-up or BBS embodiment, a toll-free telephone number can be provided.

In the most particularly, preferred embodiment of the invention, each insurance carrier or broker would maintain its own database of covered individuals linked to, and accessible by, a common search engine on a single World Wide Web site on the Internet or other front end network gateway. Alternatively, each insurance carrier or broker would upload the names from its proprietary database to a single data base accessible from a single World Wide Web site. According to any of these alternatives, those who query the database would be advised to do so again after a suitable interval (e.g., a few days later) in case a covered's name is in the process of being added to the database or, particularly in the case where the public site is a common search engine that searches the databases of several insurance companies to which it is linked, because the connection to one or more of the linked databases may be temporarily inoperative.

Whatever public access vehicle is chosen, its existence would be publicized by advertisements, e.g., in the general press and in publications aimed at attorneys who handle plaintiff's cases, such as medical malpractice litigation. The advertising would encourage potential plaintiffs or their representatives to check the database for the name of any potential defendant prior to initiating legal action. It then would be foolish for anyone to initiate a frivolous medical malpractice action without checking the database.

Counterclaim insurance according to the invention can be offered either as a separate policy or as a rider preferably to a professional (e.g., medical) malpractice liability insurance policy. Either way, in a preferred embodiment, if a counterclaim, claim, suit, administrative proceeding, or the like is brought under the policy, and damages are awarded against the proponent, then the insurer will collect a portion (e.g., between 30% and 60%) of the damages as compensation for funding the suit, and to cover administrative costs of administering the program for all policyholders. Therefore, in a preferred embodiment, any premium charged to policyholders will be minimal. Indeed, if insurance according to the invention is offered as a rider to a malpractice insurance policy, there may not need to be any additional charge beyond the premium charged for the underlying malpractice insurance policy, though of course there would be a premium for the overall coverage including the counterclaim coverage. This is because the damages recovered in successful counterclaims, plus the reduction in nuisance settlement payments on underlying malpractice claims, preferably would offset for the costs of offering and administering the insurance program and the costs of prosecuting counterclaim.

In addition, almost anyone who desired the added coverage would be eligible. At one extreme is the "good" physician whose competence is beyond question and who is rarely sued. Such a physician is a good risk for counterclaim insurance because the physician will rarely, if ever, make a claim for insurance benefits. At the opposite extreme is the "bad" physician who is sued frequently and frequently settles or loses. This physician also is a good risk for counterclaim insurance. In a preferred embodiment, the requirements for eligibility for insurance benefits with respect to a particular claim are that the underlying lawsuit proceeded to a favorable termination for the covered individual or company. In another preferred embodiment, the benefit requirements can be more restrictive, e.g., favorable judgment or even favorable judgment without being settled. In yet another preferred embodiment, the benefit requirements can be even more restrictive, e.g., that an independent review of the underlying claim concludes that the underlying claim was frivolous. Therefore, depending on the restrictiveness of the benefits, the "bad" physician who settles the underlying claim would not be eligible for benefits. For the cases where the "bad" physician does not settle and prevails on the underlying claim, there is no reason why that physician should not be eligible for benefits if the malpractice claim was frivolous.

The worst risk from the point of view of the insurer could be the physician who is sued frequently but always prevails. Preferably, the insurer's share of the recovery in a successful counterclaim would be available to fund other counterclaims on behalf of other covered physicians, spreading the cost of counterclaims over all covered physicians. In the case of a physician who is sued frequently, always wins, and then always counterclaims, any counterclaim recoveries would go toward funding subsequent counterclaims on behalf of the same physician, possibly without leaving enough to fund counterclaims on behalf of other covered physicians. Still, it is also possible that the recoveries would have a punitive component such that the recoveries would be well in excess of the cost.

As discussed above, benefits can be structured so that they are not available in connection with a claim that is settled, or, of course, lost. Moreover, even if a case is won, it is still possible that the claim was not frivolous. Therefore, depending on the benefit structuring, as discussed above, as part of the plan of insurance, an independent review of the underlying claim, to determine whether or not it could be proved to have been frivolous, is conducted when a claim for counterclaim benefits is made.

In a preferred embodiment, the independent review is conducted by an attorney retained by the carrier. The attorney could be an in-house attorney, but could be one of several outside attorneys retained by the carrier for this purpose. Alternatively, it may be possible to develop a set of criteria that could allow an objective determination of the qualification for benefits to be made, at least in the first instance, by a computer, based, e.g., on responses by the physician to a questionnaire developed for this purpose. If a computer is used to make the initial determination of qualification for benefits, then preferably there is opportunity for human review of that decision. In one embodiment, human review would come only if the determination was made that there was no frivolousness, in which case the covered physician could ask for a review. In another embodiment, the computer determination would include a quantitative ranking, and whenever that ranking was not overwhelmingly toward the determination that was made (either for or against the benefits) a review would be conducted. As a failsafe, any determination of frivolousness would receive a de facto review by the attorney to whom the counterclaim was assigned, as part of his or her preparations for bringing the counterclaim.

In carrying out a preferred embodiment, as viewed from a computer'science standpoint, there is a computer-assisted or computer-implemented method for determining a premium structure for insurance providing coverage including funding counterclaim (i.e., both counterclaim litigation within the context of one suit and separate countersuit litigation, or even a motion, etc.—responsive to a frivolous position). The invention includes apparatus (machine), method of making and method of using the same, an article of manufacture (e.g., software on a disk), data base, data structures, and necessary intermediates, all of which can be summarized with reference to the method for the sake of brevity). The method include receiving actuarial data and census data, at least one of said data including indicia of litigation frequency and cost, the data in a predetermined format corresponding to computer operations; calculating a premium structure, based upon the actuarial data and the census data, for the insurance; and generating insurance documentation including premium structure.

More particularly, the step of receiving the actuarial data and census data can be carried out at an actuarial or other computer system; the step of calculating a premium structure can be carried out at a carrier computer system located remotely from the actuarial or other computer system; and there can further be the step of: communicating the actuarial data and census data from the actuarial computer system to the carrier computer system by a computer-to-computer communications device, such as a modem or the like.

In any of the embodiments, the there can be further steps of: receiving premium payment data for the insurance; receiving claim data for the insurance; calculating an updated premium structure, based upon the claims data, for the insurance; and generating documentation including the updated premium structure for the insurance.

More over, the step of generating can be carried out by a carrier computer system and the step of receiving the premium payment data can be carried out by inputting information (preferably) at a computer system remote from the carrier computer system and (preferably) by further including the step of: communicating the information to the carrier computer system by a computer-to-computer communications device.

Any of the embodiments can further include the steps of: inputting broker information at the computer system remote from the carrier computer system; communicating the information to the carrier computer system; and calculating an updated premium structure based upon broker information.

Again, in any of the embodiments, the step of generating can be carried out by a carrier computer system and the step of receiving the claim and/or payment data can be carried out by inputting information (preferably) at a computer system remote from the carrier computer system and (preferably) by further including the step of: communicating the information to the carrier computer system by a computer-to-computer communications device. This is especially preferable in connection with calculating an updated premium structure based upon the claim information, say, from a claimant computer and payment data from an insured's computer system.

Still again, in any of the embodiments, the invention can be carried out by further including the steps of receiving premium payment data for the insurance, the payment data including respective names corresponding to coverage by the insurance; posting the names and indicia of the coverage by the insurance on a front end network gateway to provide a warning at remote terminals, especially by using the Internet—particularly the World Wide Web—as the front end network gateway.

Additionally, any of the embodiments can further include the steps of: receiving, at an intermediary computer (for example), the actuarial data and census data, at least one of said data including indicia of litigation frequency and cost, the data in a predetermined format; and calculating, at the intermediary computer (for example), a premium structure, based upon the actuarial data and the census data, for an independent verification of the premium structure.

Also, in any of the embodiments, the actuarial data can include indicia of suits eliminated, reduced settlement cost for suits, defense cost, frequency of claims, the cost of the claims, reduction in medical malpractice cost, and/or indemnity savings.

Note that, in any of the foregoing, calculating the premium structure can include calculating a premium cost for the counterclaim brought as a counterclaim, a separate countersuit, or an administrative complaint, especially for frivolous suit or litigation.

All of the embodiments can be carried out by further including the steps of: generating marketing documentation including a graphical representation of a pay out pattern corresponding to the insurance coverage, especially where the actuarial data is carried out with actuarial data including indicia of a reduction in medical malpractice cost. However, as previously mentioned, the invention embodiments can be viewed such that the step of calculating the premium structure includes calculating a premium cost for the counterclaim brought as a countersuit to a professional malpractice cause of action, especially for litigation cost for really any frivolous litigation, including or not including counterclaim cost. It is only preferred that the step of calculating the premium structure includes calculating a premium cost for the counterclaim brought as a medical malpractice cause of action.

It is envisioned that in carrying out the foregoing method, there can be at least one digital electrical computer and data processing system comprising: a digital electrical computer, an input device for inputting data electrically connected to the digital electrical computer, and an output device electrically connected to the digital electrical computer, wherein the digital electrical computer is controlled by a computer program to form a programmed digital electrical computer for processing input electrical signals, the input electrical signals being produced in response to information entered at the input device, the information including actuarial data and census data, at least one of said data including indicia of litigation frequency and cost, the data in a format specified by the computer program, the processing including modifying the input electrical signals into output electrical signals representing a projection of a premium structure, based upon the actuarial data and the census data, for insurance funding of a counterclaim, the output electrical signals being communicated to the output device which, in response to the output electrical signals, generates a depiction of the projection. The foregoing computer system can be made by providing a digital electrical computer having a programmable processor, an input device for inputting data electrically connected to the digital electrical computer, an output device electrically connected to the digital electrical computer; programming the processor (preferably with an article of manufacture such as a program stored on memory such as a diskette), to control the digital electrical computer for processing input electrical signals, the input electrical signals being produced in response to information entered at the input device.

The invention will now be described with reference to the FIGS.

Figure 1:
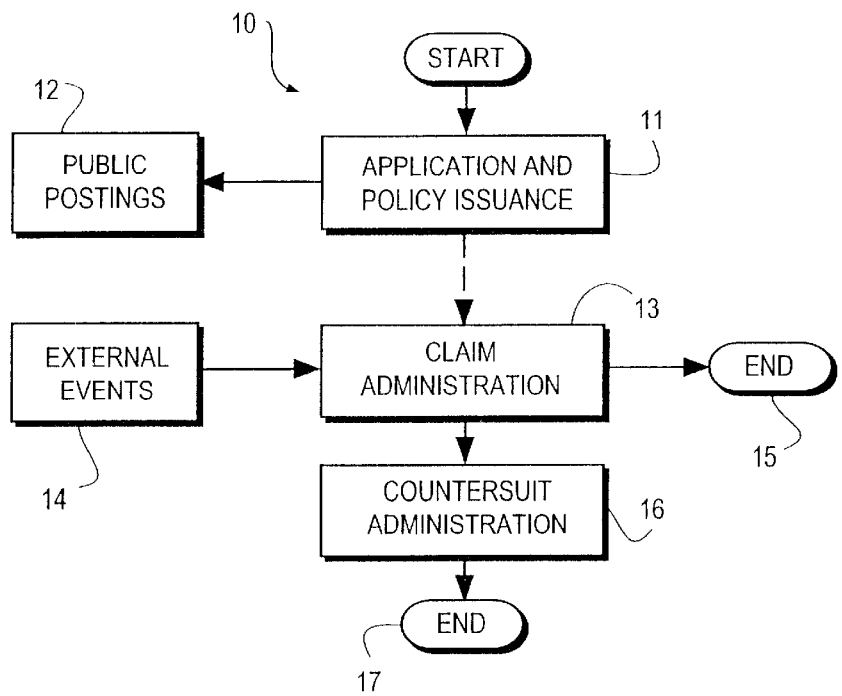
FIG. 1 is a flow diagram representing a preferred embodiment of a process according to the present invention from the initial application for coverage through the completion of a counterclaim brought on behalf of the insured.

FIG. 1 shows an overview of a preferred embodiment of the process 10 for administering the plan of insurance according to the present invention. Process 10 starts with module 11, which is explained in more detail below. Briefly, in module 11 an application for coverage under a policy of counterclaim, countersuit, counter litigation, or the like insurance is made, accepted, and processed and the insurance policy is issued if the application is approved. As part of issuance of the policy, the covered's name is posted on a publicly accessible database as indicated at step 12.

Next, process 10 proceeds to module 13, based on the occurrence of external events at 14. Briefly, in module 13, a covered individual, group, or company such as a physician, having been sued for malpractice as part of events 14, makes a claim for insurance benefits, and the claims administration process is carried out to determine whether or not the insured is entitled to benefits. If not, process 10 ends at 15.

If in claim administration module 13 it is determined that the insured is eligible for benefits, then the funding for filing of a counterclaim is authorized, and process 10 proceed to administration module 16, in which the progress of the counterclaim is monitored, attorneys' bills are paid and the carrier's share of any damages awarded is collected. Process 10 then ends at 17.

Figure 2:
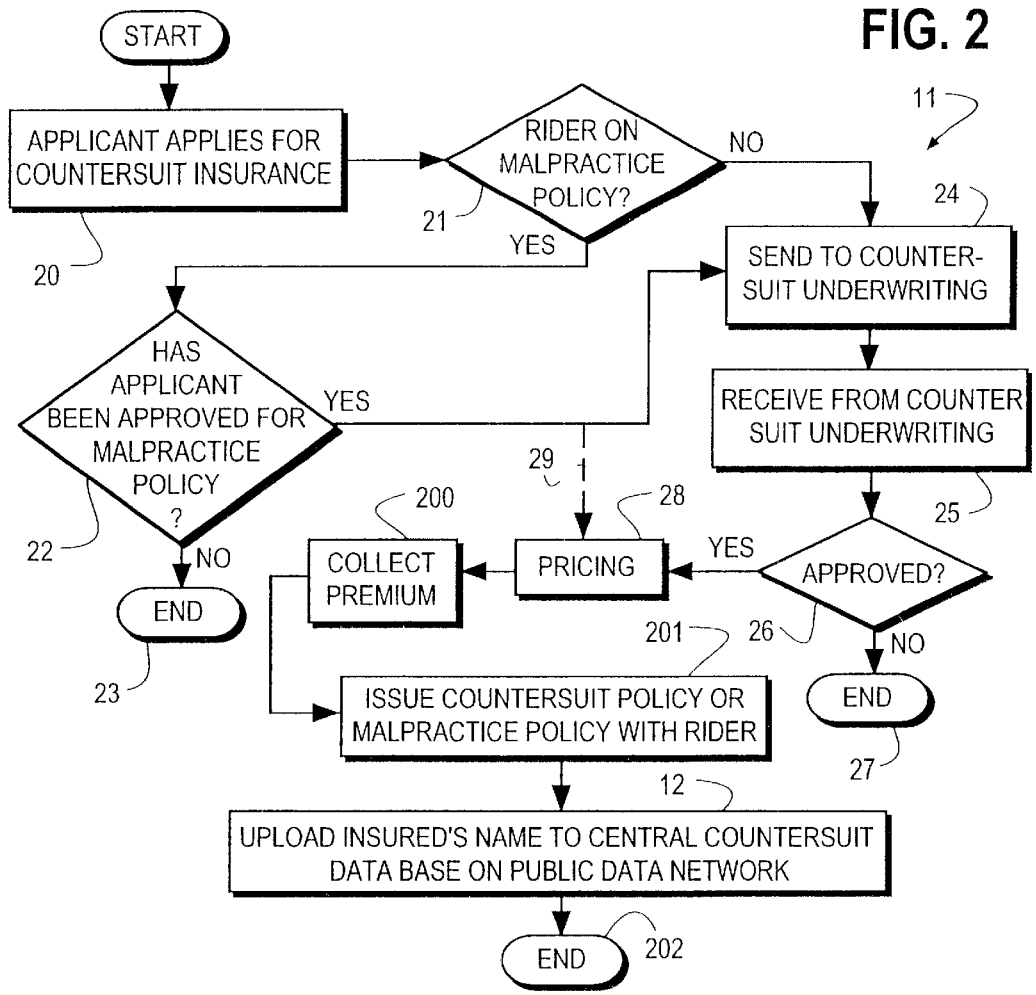
FIG. 2 is a flow diagram of the application/issuance module of the process of FIG. 1, including database posting according to the invention.

Application and issuance module 11 is shown in more detail in FIG. 2. Module 11 begins at step 20 where the applicant submits an application for the insurance. Ideally, the application would be submitted by computer, for example, over the Internet, though state insurance regulations to date may interfere with out-of-state insurance applications. The application data preferably are filled in by the applicant on a form (not shown) and then preferably entered or received at the insurer's data processing system 510, e.g., as at keyboard 528 (see FIG. 5). Alternatively, an electronic application can be made available on a publicly accessible data network such as the Internet, and the application data entered by the physician can be entered into system 510 directly at 534 via modem (example of a computer-to-computer communications device) or router 532.

As mentioned above, the insurance according to the invention can be offered as a stand-alone policy of insurance or as a rider to a malpractice insurance policy. At test 21, it is determined (by reference to the application data) whether the applicant is applying for the stand-alone policy or a rider. If the applicant has applied for a rider, then at test 22 it is determined whether or not the applicant has been approved for the underlying coverage. If at test 22 the applicant has not been approved for coverage (either because of the applicant's risk rating or other factors, or because no application was made for an underlying insurance policy, meaning that the request for a rider was an error), then the process ends at 23 and no coverage is provided.

If at test 22 the applicant has been approved for the underlying insurance policy, or if at test 21 the applicant is not applying for a rider but for a stand-alone policy, the process proceeds to step 24 for underwriting, where it is determined whether or not the applicant qualifies, from a risk management perspective, for the insurance. Although it may be possible to provide a sufficiently complex expert system, and to gather sufficient information on the application, for the underwriting to be performed automatically (e.g., by a computer), traditionally underwriting has been done manually (e.g., by actuaries). Thus at step 24 the application data would be sent to an underwriter and the process would wait for completion of the underwriting. At step 25, on completion of the underwriting, the application would be returned and the underwriter's comments and conclusions would be entered into the system (or, in the case of automated underwriting, the underwriting conclusions would be generated and stored). Note that the underwriting can be carried out by the carrier's computer system or by underwriting operations remote from carrier's computer system. Next, at test 26, the process would determine, based on the underwriter's entries (or the automated underwriting), whether or not to approve the application. If not, the process ends at 27. If at test 26, the application is approved, then the process proceeds to step 28 for pricing of the insurance as well as other premium computing.

The underwriting step could be unnecessary for separating out a premium for this aspect of the insurance coverage, particularly where the counterclaim coverage is being purchased as a rider to a malpractice policy, for reasons set forth above. Specifically, it may be that every applicant is a good risk for this type of insurance, as discussed. When the coverage is being purchased as a stand-alone policy, some underwriting may be required. However, when the coverage is being purchased as a rider, it may be possible to avoid particularized underwriting and skip directly to pricing step 28, as indicated by dashed alternate path 29.

As discussed above, insurance according to the invention could pay for itself, especially when offered as a rider to a malpractice insurance policy. Therefore, particularized pricing step 28 may be unnecessary (i.e., apart from pricing of premium computing for the coverage as a whole) and may constitute the imposition of a "zero" premium. However, it may be that carriers may charge at least a nominal administrative charge for the countersuit coverage, and moreover it may be found that the coverage does not pay for itself, depending on how the invention is .implemented, so that pricing step 28 would be required.

Following pricing step 28, process 10 continues with step 200 in which an insurance policy, such as a malpractice insurance policy with an insurance rider, is issued. At the time that the policy is issued or, as a practical matter, shortly thereafter (perhaps on a regular basis such as daily), the name of the covered is uploaded to a publicly available database.

Figure 2A:
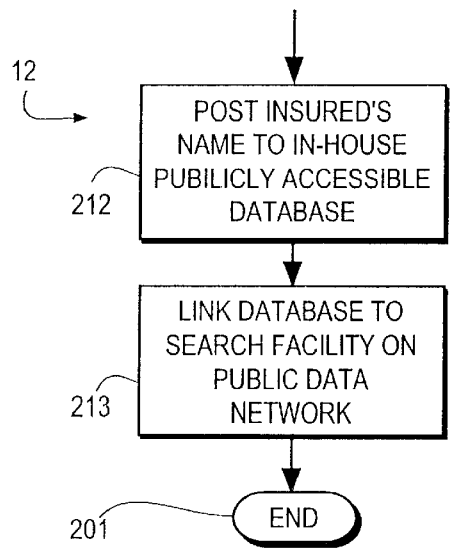
FIG. 2A is flow diagram of an alternative embodiment of the database posting shown in FIG. 2.

As shown in FIG. 2, this posting step 12 involves posting the physician's name to a central database of all those covered by the insurance, which is available on a public data network such as the World Wide Web portion of the Internet. In an alternative shown in FIG. 2A, the posting step 12 involves the posting at step 212 of the insured's name to a publicly accessible database on an in-house computer system at the carrier or broker, which is then linked at step 213 to a search facility that is available on a public data network. Again, this could be a search engine available on a World Wide Web site, such as those using the Common Gateway Interface search protocol. Preferably, all carriers link their databases to the same search engine.

Whatever searching mechanism is provided, preferably if a person querying any database according to the invention (whether it is one central database, one central searching site, or one of several sites to be searched), then if a particular physician's name is entered as the search criterion, the system will return not only the name entered, but also similar names. Preferably, the list of names returned will be alphabetical centered on the name entered by the searcher, with names listed before and after. If the name entered by the searcher is not found in the search, then preferably the results are centered on the closest match. This would allow the searcher to check for alternate spellings, etc., and would account for a search, based on a diminutive of the physician's given name (e.g., "Bob" instead of "Robert"). Although in the most particularly preferred embodiment only alphabetically similar names would be returned, in alternative embodiments it impossible to provide more sophisticated searching that would check alternate spellings and similar-sounding names that are spelled differently. In any event, the searcher preferably would be advised to check other spellings, etc., when the results are returned.

Module 11 ends at 201 following posting step 12 or 12'.

Figure 3:
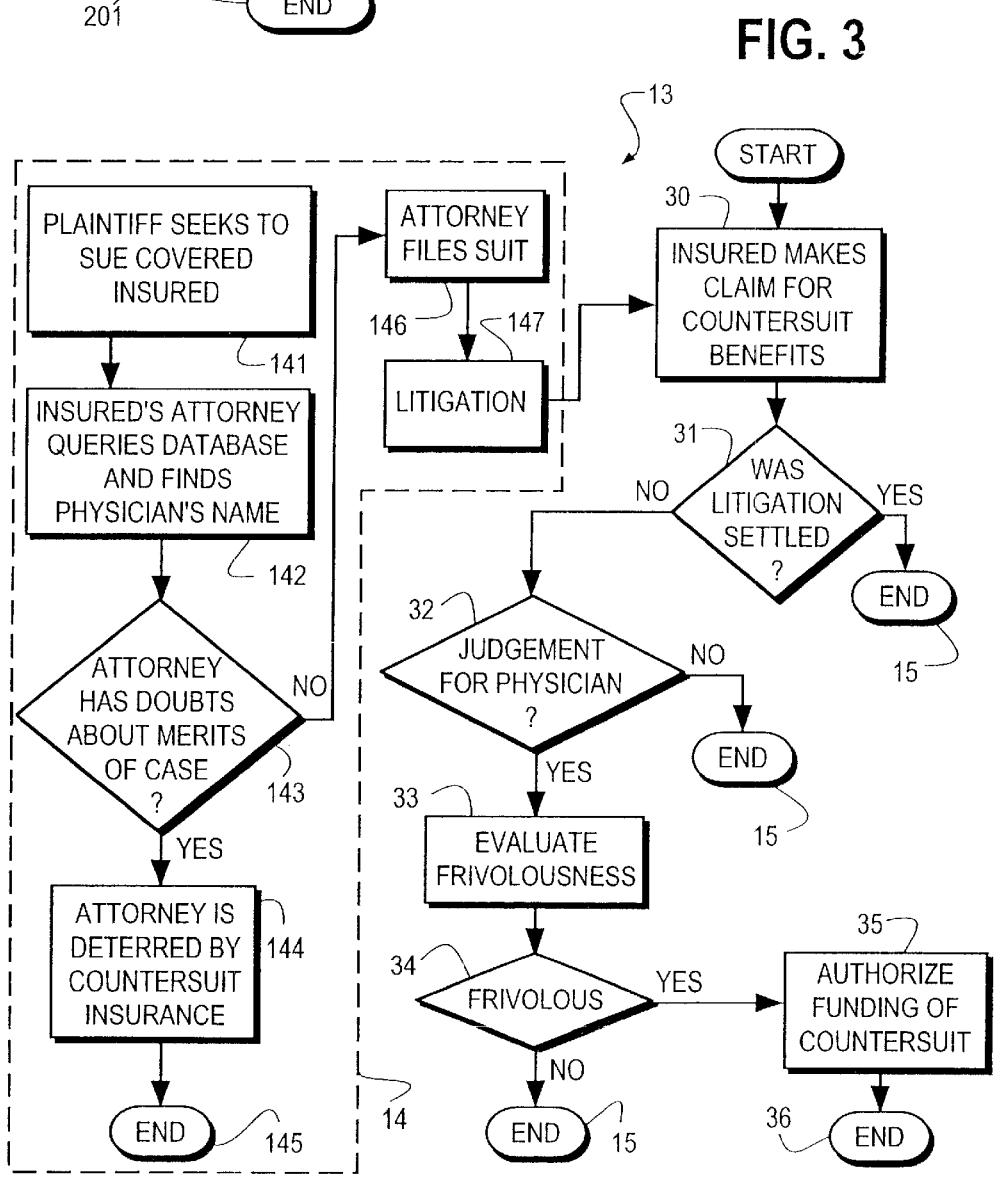
FIG. 3 is a flow diagram of the claims processing/counterclaim qualification module of the process of FIG. 1.

FIG. 3 shows claim administration module 13, as influenced by external events 14. At event 141, as an illustrative example, a patient seeks to sue a physician covered by the insurance according to the present invention. At event 142, the patient has contacted his or her attorney, who queries the publicly accessible counterclaim database (or databases if each insurer maintains a separate database, or if different groups of insurers maintain different group databases) and finds that the physician is listed. The attorney then considers at event 143 any doubts regarding the merits of plaintiffs case. If the attorney has sufficient doubts, he or she may be deterred at event 144 from filing suit against the covered physician, and the patient's attempt to sue the physician ends at 145. If at 143 the attorney is not deterred, then at event 146 the attorney files suit on behalf of the patient, and at event 147, the litigation proceeds—in one example—to a conclusion.

claims administration module 13 then begins at step 30, as the physician, on conclusion of litigation 147, makes a claim for benefits under the insurance policy or rider. At test 31, it is determined whether or not litigation 147 qualifies for benefits under the coverage, e.g., whether the litigation was settled. If it was, the physician is not eligible for benefits and claim administration module 13 ends at 15. If at test 31 it is determined that litigation 147 was not settled then at test 32, it is determined whether or not judgment in litigation 147 was rendered for the physician. If at test 32 it is determined that judgment had been entered against the physician, then claim administration module 13 ends at 15. If at test 32 it is determined that judgment had been entered for the physician, then at step 33 the frivolousness of the underlying malpractice claim is analyzed. Normally, this step would have to be performed by a human being, preferably one trained in legal matters such as an attorney. When the person analyzing the frivolousness of the claim has completed that analysis and entered conclusions into the system, then at test 34 it is determined whether or not the claim was frivolous. If at test 34 it is determined that the claim was not frivolous, then claim administration module 13 ends at 15. If at test 34 it is determined that the claim was frivolous, then at step 35 a counterclaim is authorized and claim administration module 13 ends at 36.

Figure 4:
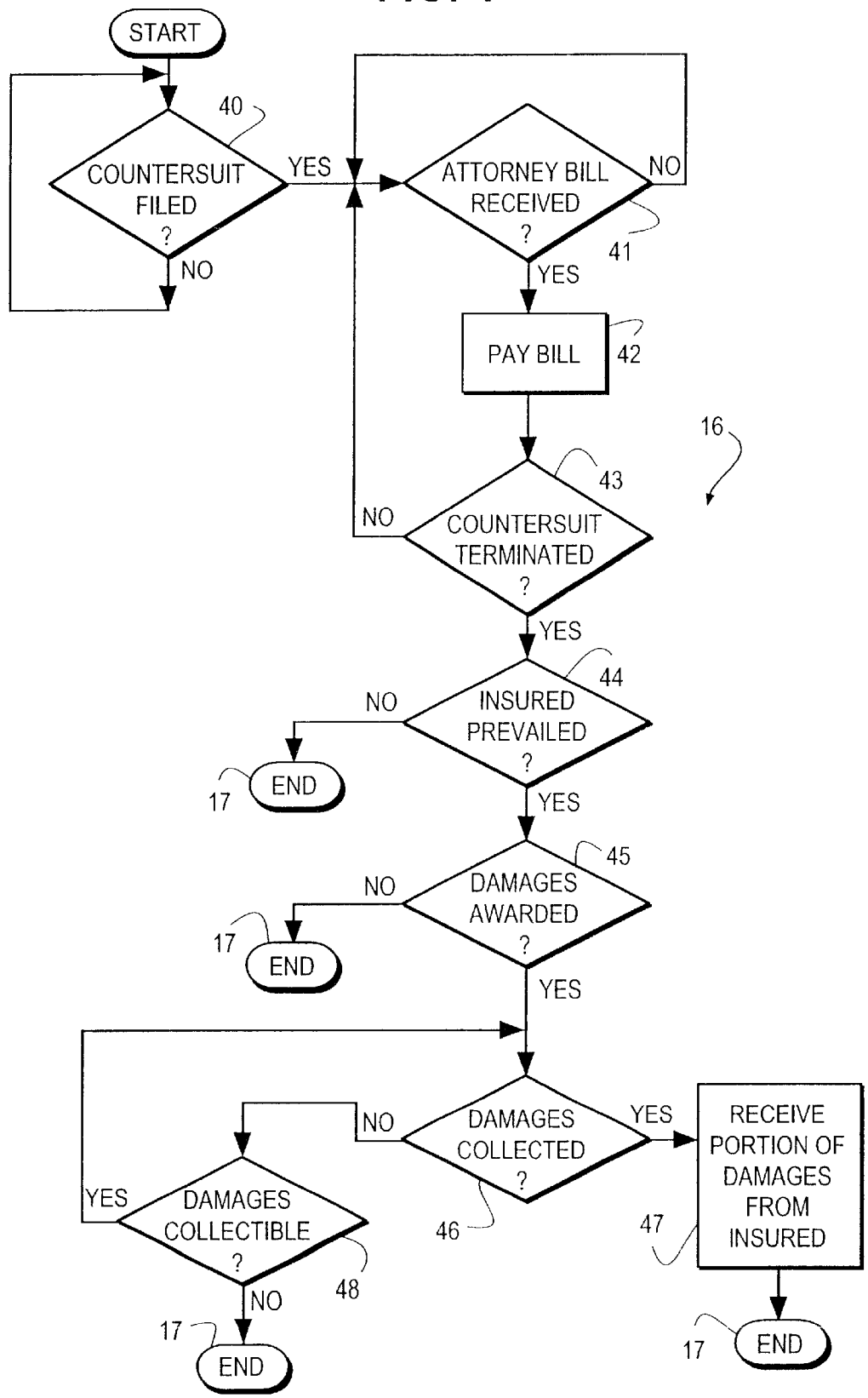
FIG. 4 is a flow diagram of the counterclaim administration module of the process of FIG. 1.

FIG. 4 shows the insurance administration module 16, which starts at test 40 awaiting the filing of the counterclaim authorized in step 35 of module 13. Once the counterclaim has been filed, the module 16 awaits at test 41 the receipt of a bill (preferably by computer) from the attorney handling the counterclaim on behalf of the physician. Once a bill is received, then at step 42 funds are disbursed (again, preferably by computer) to pay the bill, the expenditure having been authorized by the authorization 35 to file the counterclaim. As soon as the bill has been paid, then at test 43 it is determined whether or not the counterclaim has terminated. If it has not, then module 16 loops back to test 41 to await further bills.

Once the counterclaim has terminated, then it is determined at test 44 whether or not the physician prevailed in the counterclaim. If not, process 10 ends at 17. If at test 44 it is determined that the physician did prevail, then at test 45 it is determined whether or not damages were awarded. If not, process 10 ends at 17. If at test 45 it is determined that damages were awarded, then at test 46 it is determined whether or not damages were collected. If so, then at step 47, a predetermined share of the damages implemented, so that pricing step 28 would be required. (e.g., 30%, 40% or 50% according to the policy terms) is collected from the physician. If at test 46 it is determined that damages that were awarded have not been collected, then at test 48 it is determined whether or not the damages are collectible (e.g., the defendant might be judgment-proof). If not, process 10 ends at 17. Otherwise, process 10 loops back to test 46 to await collection of the damages.

Figure 5:
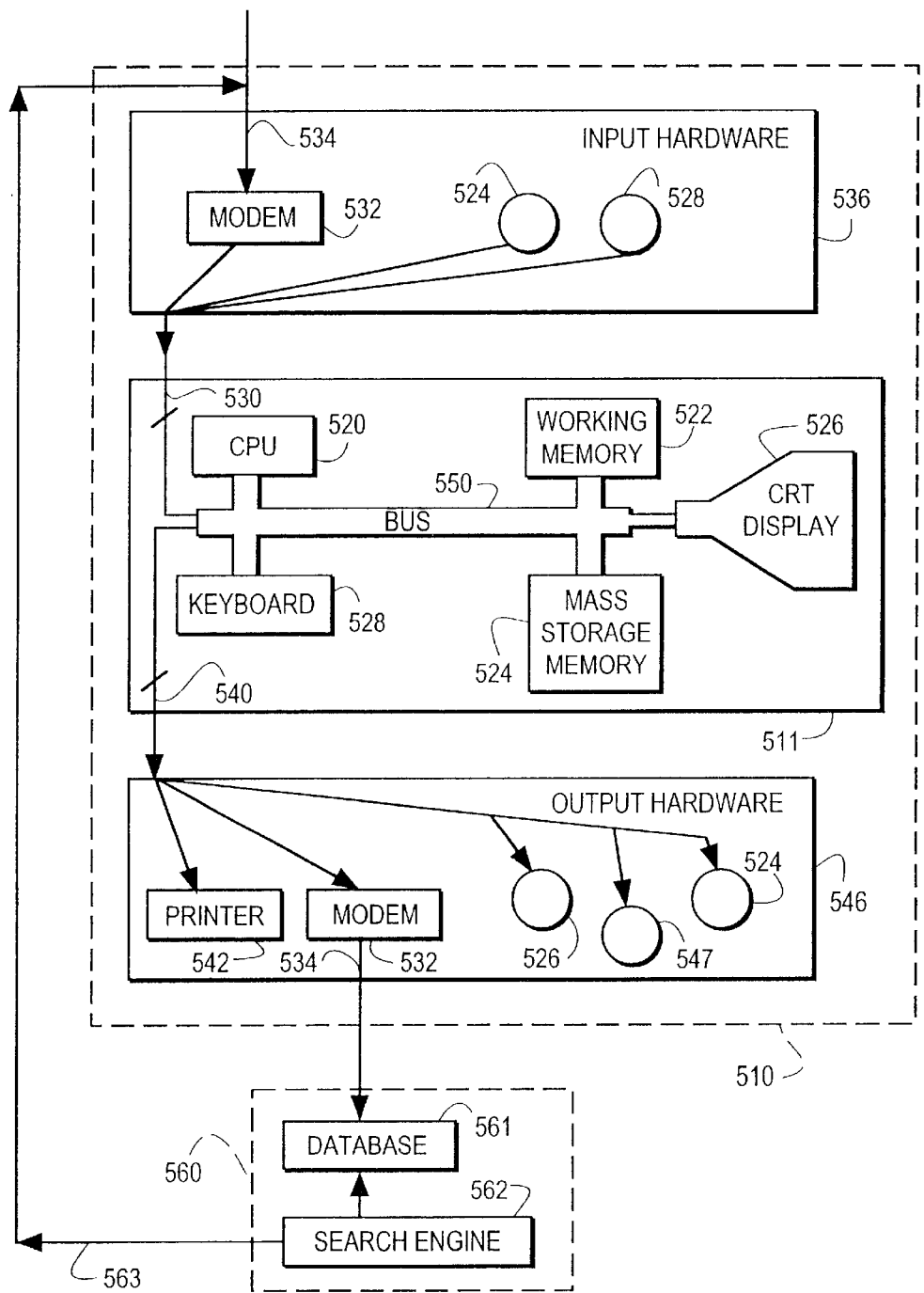
FIG. 5 is a schematic view of a preferred embodiment of a local hardware system for implementing the present invention.
Figure 6:
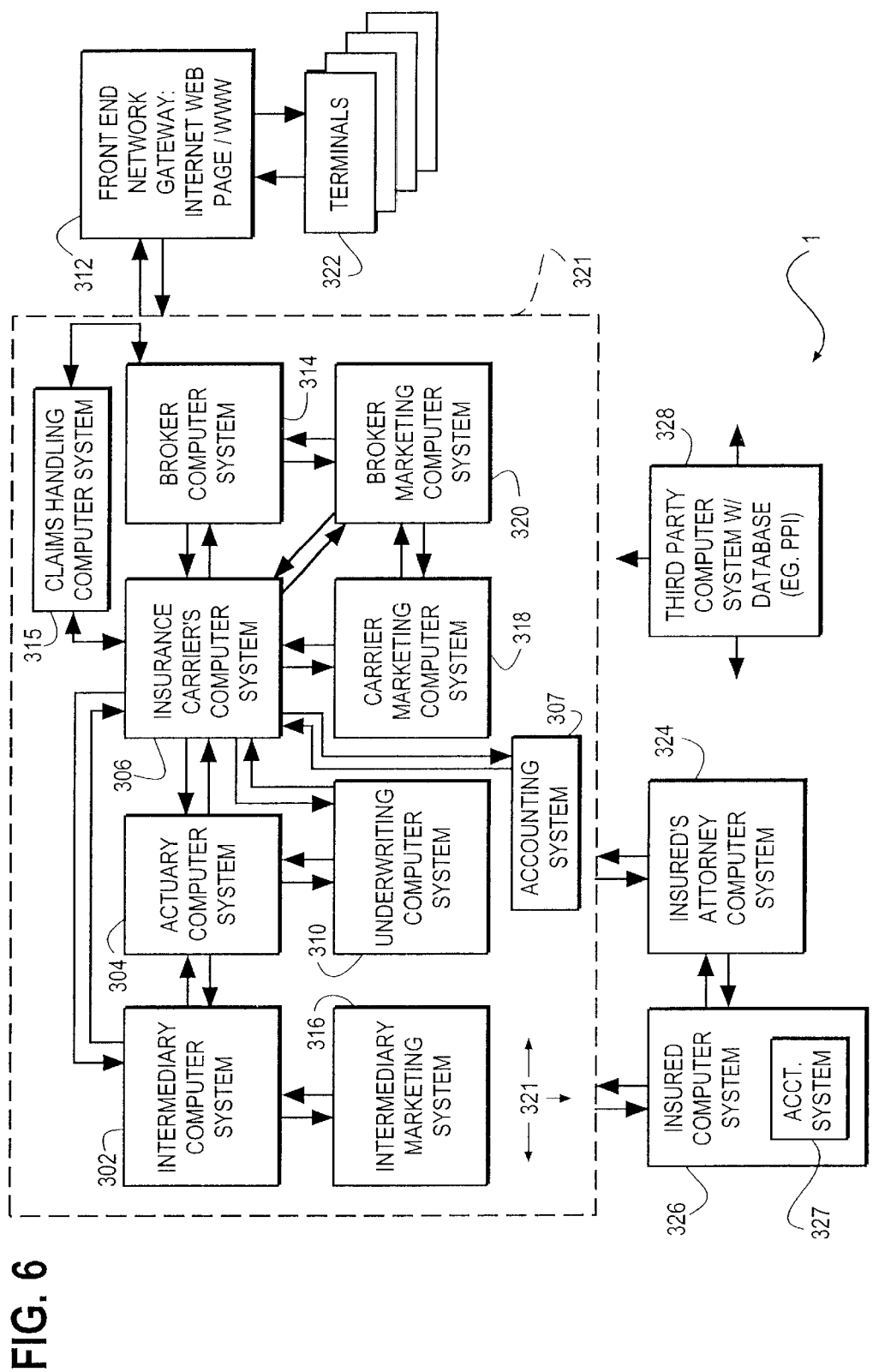
FIG. 6 is a schematic view of a preferred embodiment of a systemic hardware system for implementing the present invention.

An exemplary, computer hardware system 510 with which the present invention may be implemented is shown in FIGS. 5–6. In FIG. 5, which shows a first preferred embodiment of apparatus according to the invention, system 510 includes a computer 511 comprising a central processing unit ("CPU") 520, a working memory 522 which may be, e.g., RAM (random-access memory) or "core" memory, mass storage memory 524 (such as one or more disk drives or CD-ROM drives), one or more cathode-ray tube ("CRT") display terminals 526, one or more input devices such as keyboards 528, one or more input lines 530, and one or more output lines 540, all of which are interconnected by a conventional bidirectional system bus 550.

Input hardware 536, coupled to computer 511 by input lines 530, may be implemented in a variety of ways. Modem or modems 532, which also may be routers, or other computer-to-computer communication devices, can be connected by a telephone line or dedicated data line 534 can be used to allow attorneys to dial up in an embodiment in which the carrier maintains its own database (on mass storage device 524) and allows direct dial-up access. Modems/routers/etc. 532 also may be used to allow access by a central Internet search engine 562 in an embodiment where each insurer maintains its own database but access is through the central search engine. Alternatively or additionally, the input hardware 530 may comprise CD ROM drives or disk drives 524. In conjunction with display terminal 526, keyboard. 528 may also be used as an input device. For example, application data, underwriting data from the underwriter, or frivolousness analysis data from the attorney (see above), may be entered through one or more keyboards 528.

Output hardware 546, coupled to computer 511 by output lines 540, may similarly be implemented by conventional devices. By way of example, output hardware 546 may include CRT display terminal 526 for displaying the premium to be charged or whether or not an application is approved or a counterclaim authorized. Output hardware 546 might also include a printing device or printer 542, so that hard copy output may be produced, or a disk drive 524, to store system output for later use. Where the names of covered physicians are to be uploaded to a central database 561 (e.g., at a site 560 on the Internet), information may be transmitted over telephone or dedicated data lines 534, possibly with the use of modem or router/etc. 532.

Output hardware 546 preferably also includes a payment unit 547 for disbursing funds to attorneys who are prosecuting authorized counterclaim. Payment unit 547 could be a check printer if payment is made by check. Alternatively, payment unit 547 could be an electronic funds transfer unit that, using modem/router/etc. 532, communicates with the insurer's bank and the attorney's bank to transfer funds directly to the attorney's account.

Internet site 560 preferably includes a search engine 562 for querying database 561 or, where site 560 does not include database 561, search engine 562 will query the individual insurer databases via connections such as connection 563 to input data line 534. Indeed, a carrier if desired could provide access to its database both through the Internet site 560 and by a dial-up facility at input data line 534. Moreover, even if an external central database 561 is used, it need not be hosted on an Internet site, but could be accessible on a dial-up basis, or it could be accessible both through the Internet or as a dial-up facility.

In operation, CPU 520 coordinates the use of the various input and output devices 536, 546, coordinates data accesses from mass storage 524 and accesses to and from working memory 522, and determines the sequence of data processing steps.

The publication of insured physician's names allows the present invention to achieve maximum deterrence of frivolous malpractice lawsuits. Normally, insurers do not publicize their policyholders' names, and many policyholders probably prefer it that way. However, it would preferably be a condition of the counterclaim insurance contract that the insured allow his or her name to be publicized as a condition to receiving coverage or benefits under the counterclaim insurance. Alternatively, benefits might be available to those unwilling to have their names listed but, because the deterrent effect is missing or reduced (potential plaintiffs may still be deterred somewhat by the uncertainty as to whether or not the professional is covered by the insurance, although in that case it would have to be publicized that some physicians may choose not be listed for there to be any deterrent effect at all), they may be charged a higher premium.

Turning now to FIG. 6 there is a representative illustration of a System 1 for carrying out the present invention. The System 1 preferably involves multiple computer systems for cooperatively carrying out the invention, each of the computer systems as illustrated in FIG. 5.

In FIG. 6, there is at least one digital electrical computer 321 for implementing a method for determining a premium structure for insurance providing coverage including funding for a counterclaim. The at least one digital electrical computer 321 can be comprised as set out in FIG. 5. For example, the at least one digital electrical computer 321 can include: a digital electrical computer, an input device for inputting data electrically connected to the digital electrical computer, and an output device electrically connected to the digital electrical computer, wherein the digital electrical computer is controlled by a computer program to form a programmed digital electrical computer (processor for processing input electrical signals, the input electrical signals being produced in response to information entered at the input device, the information including actuarial data and census data, at least one of said data including indicia of litigation frequency and cost, the data in a format specified by the computer program, the processing including modifying the input electrical signals into output electrical signals representing a projection of a premium structure, based upon the actuarial data and the census data, for insurance funding of a counterclaim (including for a professional malpractice, medical malpractice claim, and/or frivolous medical malpractice claim), the output electrical signals being communicated to the output device which, in response to the output electrical signals, generates a depiction of the projection.

Preferably, however, the computing operations of the at least one digital electrical computer system 321 are distributed to remote locations, for example; to make use of specialized skills and economies of scale. Accordingly, the at least one digital electrical computer 321 can be configured so that computing including receiving actuarial data and census data, at least one of said data including indicia of litigation frequency and cost, the data in a digital format predetermined according to computer programmed input requirements; calculating a premium structure, based upon the actuarial data and the census data, for the insurance providing coverage including funding for counterclaim; and generating insurance documentation including premium structure need not be carried out at the same location. That is, while it would not be unusual for this computing to be carried out just at one location for system 321, particularly that of Insurance Carrier Computer System 306, different computing architectures and operations can be carried out at remote locations, which is why the system 321 is illustrated in dashed lines in FIG. 6.

Thus, for example, FIG. 6 shows the at least one digital electrical computer 321 in a distributed configuration, in this case including an Intermediary Computer System 302, for example, a computer system of an investment banking company, financial advisor, valuation firm, consulting firm, or auditor. Intermediary Computer System 302 can also handle marketing, actuarial, and underwriting computing, internally, thought it is preferable to separate these activities to other computer systems for such reasons as set out above. Accordingly, FIG. 6 shows an Intermediary Marketing Computer System 316 for generating marketing pieces, preferably with graphical representations as discussed subsequently herein. Actuary Computer System 304 and Underwriting Computer System 310 can alternatively be internalized into Insurance Carrier Computer System 306 along with the carrier's internal accounting computing. Similarly, FIG. 6 shows a Carrier Marketing Computer System 318 for generating other marketing pieces, again preferably with graphical representations as discussed subsequently herein. Also illustrated in FIG. 6 is a Broker's Computer System 314 analogously showing a Broker's Marketing Computer System 320 in dashed lines or generating other marketing pieces, again preferably with graphical representations as discussed subsequently herein.

The at least one digital electrical computer 321 is operable to communicate data with other computer systems, including though Internet (World Wide Web or front end network gateway) Computer System 312, which has been discussed previously, along with local Terminals 322, representing the computer systems of the public that may query the Internet Computer System 312. An Insured's Attorney's Computer System 324 and the Insured's Computer System 326 are illustrated in FIG. 6, as being in respective communication, e.g., email, as well as each or both being in communication with the at least one digital electrical computer 321. A Third Party Computer System With Database 328 represents such data sources as the Physicians Insurer's Association of America (PIAA) database.

Figure 7:
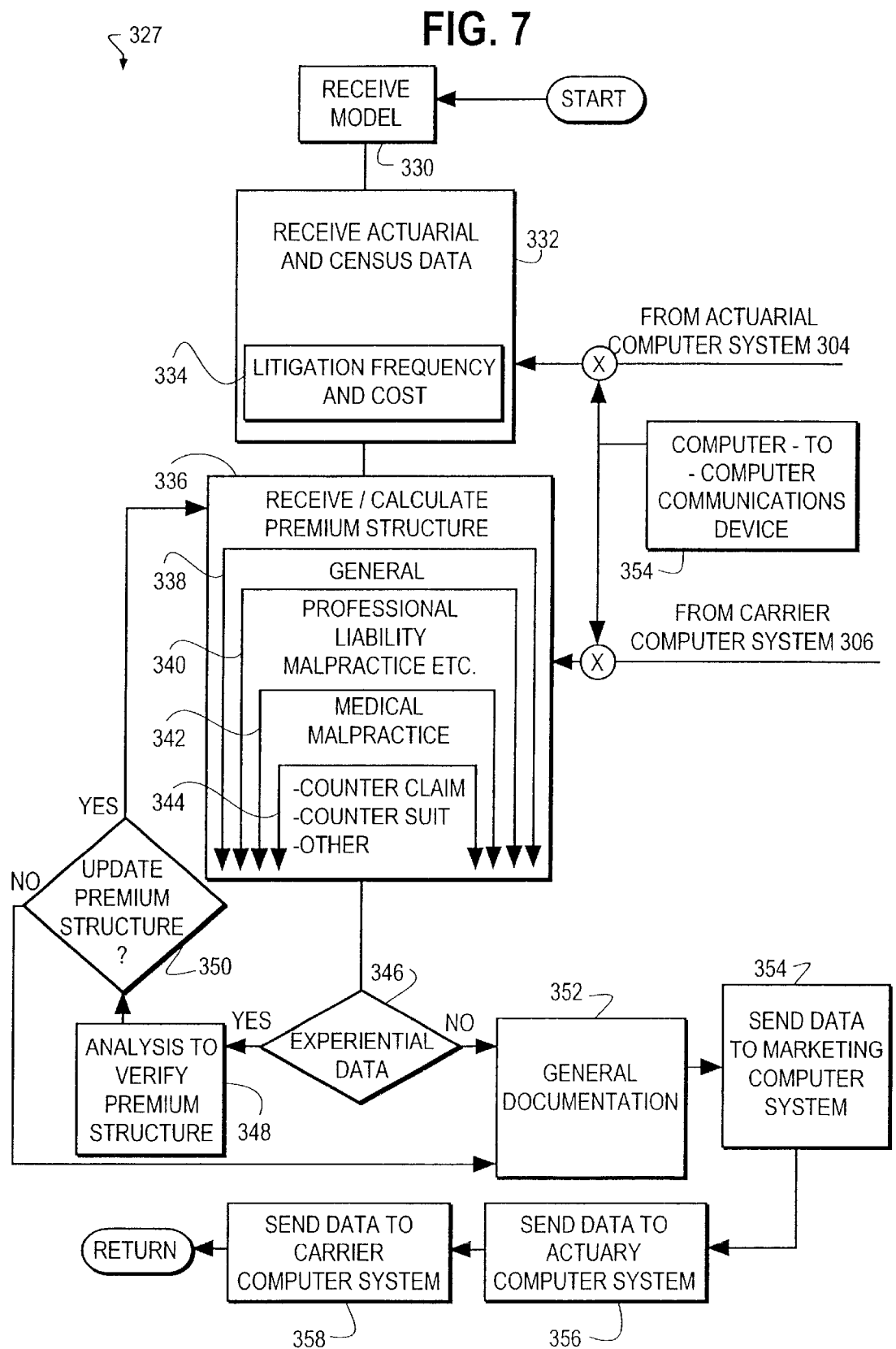
FIG. 7 is a flow diagram for an Intermediary Computer System for the present invention.

FIG. 7 provides a flow chart illustrating representative computing activities preferably allocated to Intermediary Computer System 302. Logic begins with Receive Product Model 330, which may include receiving at least one actuarial model from, say, Actuary Computer System 304 to permit analyzing the insurance product associated with the present invention. The model(s) permit(s) computing underwriting and other profits, as well as calculating a premium structure, usually from conducting sensitivity analyses in adjusting the model or in handling hypothetical additional data. At Receive Actuarial Data 332, System 302 receives data, including actuarial data and census data, e.g., interest rates, insurance claim tail data. Receive Litigation Frequency and Cost 334 data is also obtained from Actuary Computer System 304, for example by utilizing respective computer-to-computer communication devices 354, such as a modem. Receive/Compute Premium Structure 336 can be a completely local computing operation, but preferably this involves receiving data from the Carrier Computer System 306, as discussed below. The premium structure could be for General 336 counterclaim coverage, Professional Liability 338 coverage, such as professional malpractice, or more preferably for Medical Malpractice 342 coverage; wherein for any of these coverages, the premium structure can be for countersuit, counterclaim, or other (e.g., not necessarily in court, such as for bringing professional disciplinary proceedings or presenting evidence to a prosecuting attorney). Of course, the coverage of the present invention will most likely be incorporated within broader coverage, such as general medical malpractice insurance with, say, a rider for counterclaim coverage. In this case, it is understood that the premium structure includes contemplation of the counterclaim coverage so as to come within the scope of the invention, though the financial particulars of the premium structure for this counterclaim coverage may be amalgamated in with other coverage features and financials in an insurance policy. Optionally, depending on preferences for System 1 design, an Accounting System 327 for keeping track of the insured's payments (eg., Quicken™ or other such accounting or checking software, or even a bank account), can be kept at the Insured's Computer System 326 or a computer system keeping track of the insured's account. Similarly, Accounting System 307 can be part of the Insurance Carrier's Computer System 306 or an independent system. A sample implementation of Accounting System 307 is in the accounting department of the insurance carrier. Claims Handling Computer System 315 can be an independent computer system, or it can be a portion of either or both of the Insurance Carrier's Computer System 306 and the Broker's Computer System 314.

Figure 8:
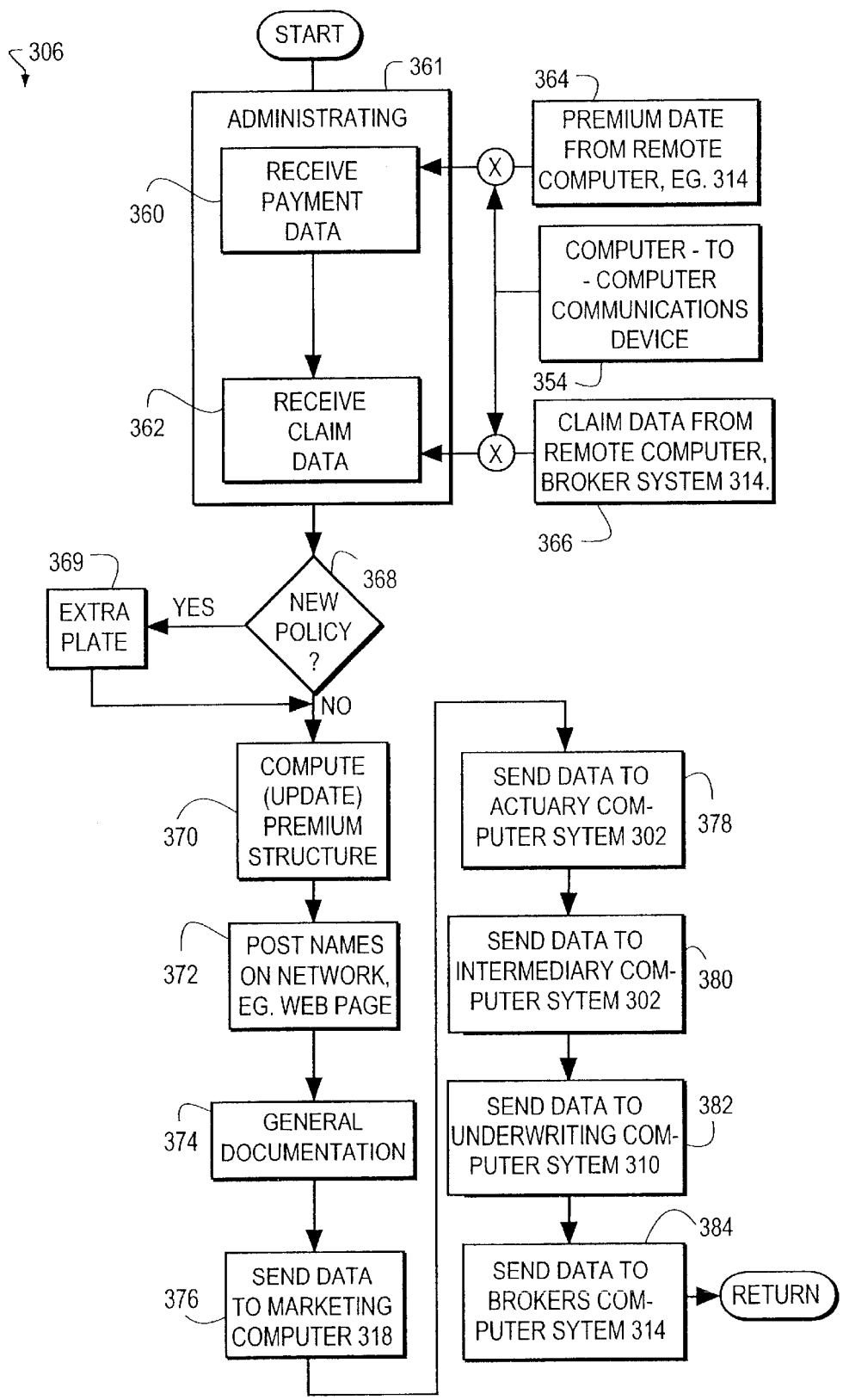
FIG. 8 is a flow diagram for a Carrier Computer System for the present invention.

Returning to FIG. 7, test 346 determines whether the analysis is being carried out based on direct, experiential data under existing policies or not. If the data is experiential, Analysis to Verify Premium Structure permits an independent audit of policy performance and viability. Update Premium Structure 550 tests for a need to change the premium structure based on the analysis in 348. Updating is carried out by cycling the data to Receive/Compute Premium Structure 336 for satisfactory structuring. Otherwise the logic proceeds from test 550 or test 346 to Generate Documentation 352 for documenting the premium structure and corresponding data. Send Data to Marketing Computer 316 354, Send Data to Actuary Computer 304 356, Send Data to Carrier Computer 306 358 perform data communications of the premium structure and corresponding data, as discussed further herein. Thereafter, the logic reaches a Return Turning now to FIG. 8 there is an illustration of computing operations preferably carried out at Carrier Computer System 306. The logic commences from a Begin to Receive Payment Data 360, which may involve receipt of Premium Data 364 from a remote computer such as Broker Computer System 314. Likewise, Receive Claim Data 362 can be carried out locally or preferably remotely with Claim Data From Remote Computer, e.g., 314, 366. In either case, the logic branches at a New Policy? 368 test, such that if the computing is for anew policy, the analysis involves Extrapolate 369 that approximates the payment and claim data from as reasonable experiential data as is available. In any case, in Compute (Update) Premium Structure 370 determines a premium structure from either the extrapolated data or directly from the Payment Data 360 and Claim Data 362. Thereafter, various data processing steps are carried out, including Post Names on Network, e.g., Web Page, 372, Generate Documentation 374 of the premium structure and of the names of the insured posted on the web page. There follows Send Data to Marketing Computer System 318 376, Send Data to Actuary Computer System 304 378, Send Data to Underwriting Computer System 310 380, Send Data to Brokers Computer System 314 382, and a Return.

Figure 9:
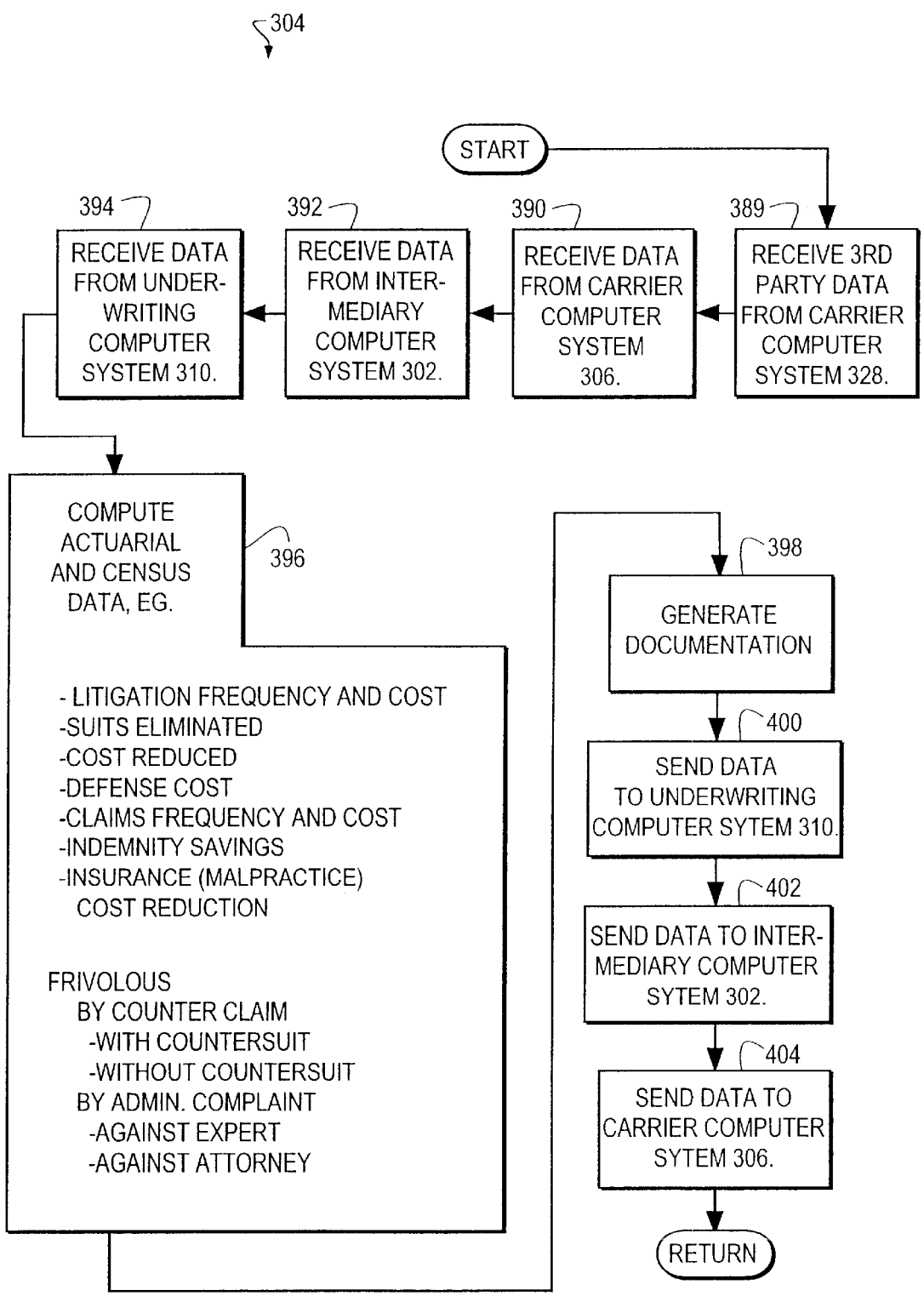
FIG. 9 is a flow diagram for an Actuary Computer System for the present invention.

FIG. 9 is an illustration of an Actuary Computer System 304. The logic proceeds from a Begin point to Receive Third Party Data From Computer System 389 390, then to Receive Data From Carrier Computer System 306 390, Receive Data From Intermediary Computer System 302 392, and Receive Data From Underwriting Computer System 310 394. From the received data, the Actuary Computer System generates data at Compute Actuarial And Census Data 396 corresponding to any or all of the following (by counterclaim/countersuit/or other): litigation frequency and cost; suits eliminated; cost reduced; defense cost; claims frequency and cost; indemnity savings; insurance (malpractice) cost/cost reduction; as well as by administrative complaint against an expert (medical, legal, gun, etc.) and/or attorney for improper conduct in litigation giving rise to the counterclaim. The some or all of 396 Data is printed at Generate Documentation 398, and there follows Send Data to Underwriting Computer System 310 400, Send Data to Intermediary Computer System 302 402, rand Send Data to Carrier Computer System 306 404, and a Return. Consider particularly several features of the administrative complaint aspects of block 396. First consider a benefit for a remedy against false/fraudulent expert witness testimony. The benefit can include reasonable fees and costs for review and analysis as to whether a medical or other expert witness committed perjury, delivered false testimony, and/or engaged in fraud or deception during testimony. The insurance can provide for an independent attorney who will:

Consult with named insured
Obtain and review necessary and relevant documentation
Consult with medical expert(s) as necessary
Prepare an analysis
If the analysis supports further action against medical expert witness, the insurance carrier will appoint an independent attorney to:
Research procedures regarding range of further action(s)
Prepare
Complaints can be filed with, further action can be requested from, and penalties can be recommended to:
(1) District Attorney or Prosecuting Attorney;
(2) All applicable State Medical Licensing Board(s) and/or any state agency responsible for physician disciplinary actions.
(3) All applicable County, State and/or National Medical Association(s)
(4) All applicable State and/or National Medical Specialty Organizations
(5) American Board of Medical Specialties It is important to note that the present discussion of Medical Licensing Boards, Medical Associations, and Medical Specialty Associations, etc. are representative of such equivalent institutions for other professionals. Other health professionals will have their own organizations. For example, osteopathic physicians will answer to Osteopathic Licensing Boards, Osteopathic Associations, and Osteopathic Specialty Associations. The concept also applies to non-health professionals.

Now consider a benefit for a remedy against plaintiffs counsel for a violation of the code of professional responsibility. The benefit includes reasonable fees and costs for review and analysis as to whether plaintiff's attorney, e.g., in medical malpractice case engaged in unethical and/or unprofessional conduct. The insurance will provide an independent attorney who will:

Consult with named insured
Obtain and review necessary and relevant documentation
Consult with medical or legal expert(s) as necessary
Prepare an analysis
If the analysis'supports further action against plaintiff's attorney, the Company will appoint an independent attorney to:
Research procedures regarding range of further action(s)
Prepare documents describing the underlying complaint
Prepare documents supporting the basis for executing further action(s)
Prepare documents recommending or supporting appropriate penalties Complaints can be filed with, further action can be requested from, and penalties can be recommended to:

All applicable State Licensing Authorities and/or any state agency responsible for addressing attorney disciplinary matters.

Figure 10:
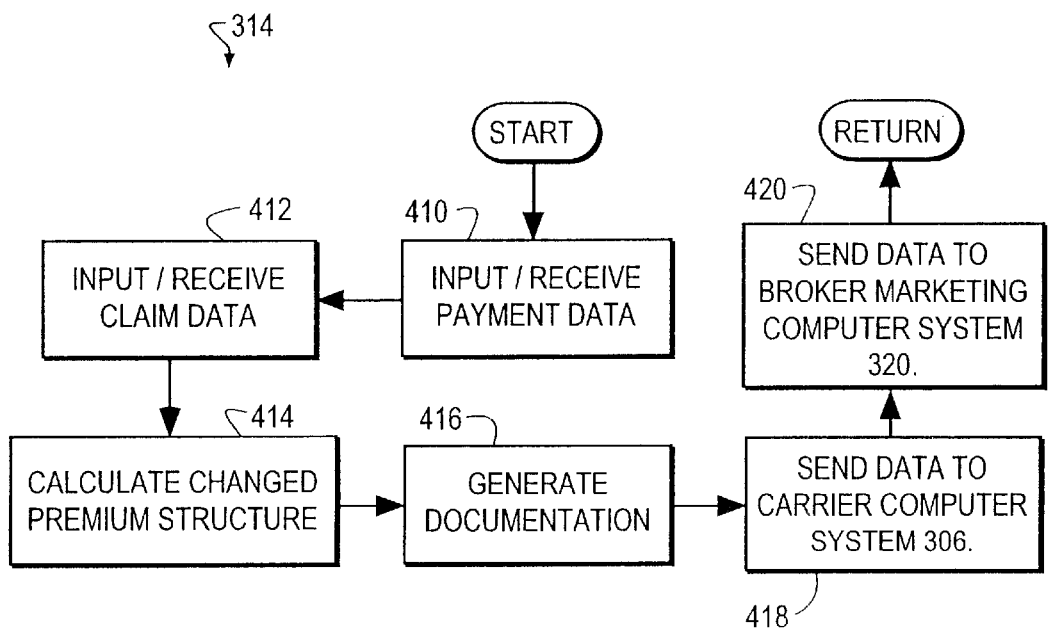
FIG. 10 is a flow diagram for a Broker Computer System for the present invention.

FIG. 10 illustrates operations of Broker Computer System 314. From a Begin point, there is Input/Receive Payment Data 410, which leads to Input/Receive Claim Data 410. From this received data Broker Computer System 314 Calculates Changed Premium Structure 414 if such a change appears warranted from the received data, and such a change may involve a reduction in premium cost to increase sales, etc., or it may perhaps reflect other local data factors. Next, Generate Documentation 416 prints some or all of what has been calculated in Changed Premium Structure 414, or the data handled therein, leading to Send Data to carrier System 306 418, Broker Marketing Computer System 320 420, and a Return.

Figure 11:
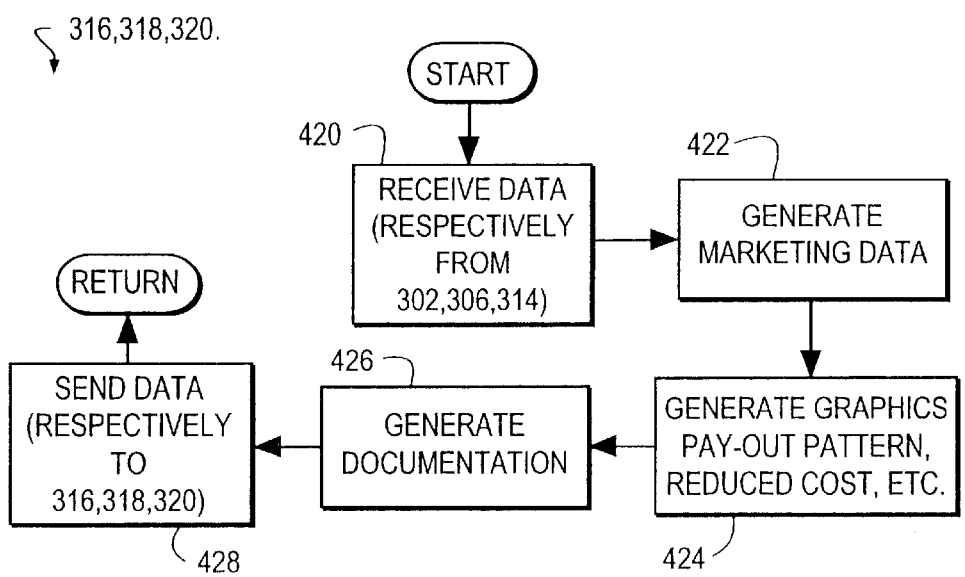
FIG. 11 is a flow diagram for respective Marketing Computer Systems for the present invention.

Turning now to FIG. 11, there is an illustration of a Respective Marketing Computer System 316, 318, & 320, that is representative of all said marketing computer systems. From a Begin point the logic proceeds to Receive Data (respectively from 302, 306, & 314) from which Generate Marketing Data 422 develops data representing marketing materials, preferably including Generate Graphics Pay-out Pattern, Reduced Cost, etc. 424. See FIG. 12 as an example. Generate Documentation 426 prints the marketing materials and graphics, and Send Data 428 (respectively to 316, 318, & 320) conveys any portion of the marketing materials and graphics to the respective computers.

FIGS. 12–39 are data processing maps. They are not so much a logic flow as the data processing can utilize the same data in numerous operations, even at different computers, sequentially or simultaneously. There are many design options to carry out the gist of the invention. The following is a table of the data processing mapped in said figures.

INPUT AND OUTPUT TABLES

TABLE 1

Intermediary Computer System 302 (See FIG. 12)

| INPUT | COMPUTER PROCESS | OUTPUT |
| --- | --- | --- |
| 20405, 20408 | 20201: estimates interest and underwriting profits | 20202, 21601 |
| 20201 | 20202: word process interest and underwriting profits | Printed Material |
| 20406 | 20203: estimates loss control to insurer clients | 20204, 21601, 21602, 21603 |
| 20203 | 20204: word process loss control to insurerd clients | Printed Material |
| 20406 | 20205: word process number frivolous suits prevented | Printed Material, 21603 |
| 20616, 21603 | 20206: word process policy or rider document | Printed Material, 20616, 21603 |
| 20617, 20626 | 20207: calculation commission dollars owed to them and to licensors | 20208, 20209 |
| 20207 | 20208: word process commission dollars owed to them and to licensors | Printed Material |
| 20207, 206262, 21604, internal info | 20209: accounting database of $ owed and received for brokers services | 206262, 21604 |
| 21605, 2805, internal info | 20210: database of potential and existing clients (med mal carriers, primary counterclaim carriers, contact information) | 21605 |

TABLE 2

Actuary Computer System 304 (See FIGS. 13–18)

| INPUT | COMPUTER PROCESS | OUTPUT |
| --- | --- | --- |
| 20401, 20408, 20410, 20601, 20603, 20604, 20605, 20806, 22801, 23005 | 20401: calculates initial counterclaim premium prices- based on historic data | 20402, 20622, 22803 |
| 20401 | 20402: word process initial counterclaim premium prices- based on historic data | Printed Material |
| 20411, 20619, 20620, 206202, 20808, 22802, 23005 | 20403: calculates accurate premium prices- based on prospective data | 20404, 20411, 20622 |
| 20403 | 20404: word process accurate premium prices based on prospective data | Printed Material |
| 20601, 20603, 20604, 20605, 20613, 20614, 206142, 20619, 20620, 206202, 22801, 22803 | 20405: calculateds profit models based on malpractice frequency and legal expenses (historic and prospective) | 20201, 20613, 20614, 206142 |
| 20601, 20602, 20603, 20604, 20605, 20606, 20607, 20608, 20609, 20610, 20615, 22801 | 20406: calculates profit models based on estimate of frivolous suits and estimate of number of frivolous suits prevented (historic and prospective) | 20203, 20205, 20615 |
| 20807 | 20407: database underwriting risk for counterclaim (by specialty, state, prior malpractice history, sex) | 20807 |
| 22801 | 20408: calculates initial counterclaim interest income based on historic data (interest rates and estimate of tail) | 20201, 20401 |
| 20610 | 20409: calculates counterclaim insurance interest income based on prospective data- interest rates and actual tail) | 20610 |
| 22801, 23002 | 20410: calculates counterclaim insurance taxes based on historic data | 20401, 23002 |
| 20403, 20610, 206142, 23002 | 20411: calculates counterclaim insurance taxes based on prospective data | 20403, 20610, 23002 |
| 20606, 20607, 20608, 20609, 20610, 20611, 206263 | 20412: calculates prospective medical malpractice premiums | 20624, 206263 |

TABLE 3

Carrier Computer System 306 (See FIGS. 19–25)

| INPUT | COMPUTER PROCESS | OUTPUT |
| --- | --- | --- |
| internal info, 20801, 20805 | 20601: database of historic defense costs for medical malpractice (severity)- by subcategory (specialty, state, prior malpractice history, sex) | 20401, 20405, 20406, 20801, 20805, 22801 |
| internal info, 20801 | 20602: database of historic payout to plaintiff for medical malpractice (severity)- by subcategory | 20406, 20801, 22801 |
| internal info, 20801, 20805 | 20603: database of historic frequency of medical malpractice by subcategory | 20401, 20405, 20406, 20801, 20805, 22805 |
| internal info, 20801, 20805 | 20604: database of historic outcomes of medical malpractice suit by subcategory (dropped, settled, verdict) | 20401, 20405, 20406, 20801, 20805, 22805 |

TABLE 3-continued

Carrier Computer System 306 (See FIGS. 19–25)

| INPUT | COMPUTER PROCESS | OUTPUT |
|---|---|---|
| internal info, 20801 | 20605: database of other historic costs/info (reserve, surplus, taxes, interest rates, length of tail, marketing, underwriting, commission, profitability, claims made vs occurrence) | 20401, 20405, 20406, 20801, 22801 |
| internal info, 20803, 23003 | 20606: database of prospective defense costs for medical malpractice (severity)- by subcategory (specialty, state, prior malpractice history, sex) | 20406, 20412, 20611, 20803, 22403, 23003 |
| internal info, 20803, 23003 | 20607: database of prospective payout to plaintiff for medical malpractice (severity)- by subcategory | 20406, 20412, 20611, 20803, 22403, 23003 |
| internal info, 23003 | 20608: database of prospective frequency of medical malpractice by subcategory | 20406, 20412, 20611, 20803 |
| internal info, 23003 | 20609: database of prospective outcomes of medical malpractice suit by subcategory (dropped, settled, verdict) | 20406, 20412, 20803, 22403 |
| internal info, 20409, 20411, 20803, 23001, 23002, 23004 | 20610: database of other prospective costs/info of medical malpractice (reserve, surplus, taxes, interest rates, length of tail, marketing, underwriting, commission, profitability, claims made vs occurrence) | 20406, 20409, 20411, 20412, 20803 |
| 20606, 20607, 20608 | 20611: calculation of whether counterclaim coverage has deterrent effect on frequency or severity of medical malpractice- by subcategory (and how much of an effect) | 20412, 20612, 21801, 21802, 22001, 22802 |
| 20611 | 20612: word process estimates of number of suits prevented and costs savings | Printed Material |
| 20405 | 20613: calculations of prospective underwriting profits | 20405 |
| 20405 | 20614: calculation of prospective interest income | 20405 |
| 20405 | 206142: calculation of other income | 20405 |
| 20406 | 20615: calculation of loss control (prospective) | 20406, 21401 |
| 20206, 21802, 22001, direct data input | 20616: word process policy or rider document | Printed Material, 20206, 21802, 22001 |
| 20626 | 20617: calculation of licensing costs | 20207, 206172, 206262 |
| 20617 | 206172: word process statement of licensing costs | Printed Material |
| 20622 | 20618: database of names of MD's with counterclaim coverage (to be presented to web interface) | 21201, 21202 |
| internal info, 21002, 21003, 21005, 22401, 23004 | 20619: database of prospective counterclaim severity (legal expenses) by subcategory | 20403, 20405, 206264, 20807, 21002, 21003, 21005, 22401, 22802, 23004, 23006 |
| internal info, 21002 | 20620: database of prospective frequency and outcomes of counterclaim by subcategory. Outcomes are: screen, litigated-win/lose, appeal-win/lose) | 20403, 20405, 20807, 21002, 22802 |
| internal info, 206269, 21005, 21404, 21803, 23004 | 206202: database of prospective other costs for counterclaim (reserve, surplus, taxes, interest rates, length of tail, marketing, underwriting, commission, profitability, claims made vs occurrence) | 20403, 20405, 206264, 206269, 21005, 21404, 21602, 21801, 21803, 22802, 23004, 23006 |

TABLE 3-continued

Carrier Computer System 306 (See FIGS. 19–25)

| INPUT | COMPUTER PROCESS | OUTPUT |
|---|---|---|
| internal info, 21005 | 20621: database of moneys collected from defendant in counterclaim and distribution | 206142, 21005, 22802 |
| internal info, 20401, 20403, 21205, 21402, 22604 | 20622: database of accounting for bills to MD's for counterclaim coverage ($ owed, $ collected) | 20618, 20623, 21205, 21402, 22604, 23006 |
| 20622 | 20623: print bills to MD's for counterclaim coverage | Printed Material |
| 20412 | 20624: database of accounting for bills to MD's for medical malpractice premium | 20625 |
| 20624 | 20625: print bills to MD's for medical malpractice premium | Printed Material |
| internal info, 21402, 21404 | 20626: database of number of counterclaim policies sold or distributed to MD clients | 20207, 20617, 21402, 21404 |
| internal info, 20209, 20617 | 206262: database of accounting for licensors, licensees ($ owed, $ collected) | 20209 |
| 20412, 20802, 20804, 21203 | 206263: database of underwriting risk for medical malpractice premium | 20412 |
| 20619, 206202, 21001 | 206264: database of accounting: dollars owed and paid to attorneys providing legal services for counterclaim (and other costs of counterclaim) | 206265, 21001 |
| 206264 | 206265: printed statement from accounting database for $ paid to attorneys for counterclaim legal services and other costs | Printed Material |
| 21405, 21804, 22804 | 206266: database of names of MD's, identifying and contact data, demographics, specialty, primary medical malpractice insurer, etc. | 21405, 21804, 22804 |
| 22601 | 206267: word process correspondence to MD | Printed Material, 22601 |
| 22408 | 206268: word process correspondence to attorney | Printed Material, 22408 |
| 206202, 206269, 23001 | 206269: database of profit/loss, reserve/surplus for counterclaim portion of company | 206202, 22805, 23001 |

TABLE 4

Underwriter Computer System 310 (FIGS. 26–27)

| INPUT | COMPUTER PROCESS | OUTPUT |
|---|---|---|
| 20601, 20602, 20603, 20604, 20605 | 20801: database of historic risk for frequency and severity of medical malpractice by subcategory (specialty, state, prior malpractice history, sex) | 20601, 20602, 20603, 20604, 20605, 20802 |
| 20801 | 20802: calculation of historic risk factors' contribution to medical malpractice premium | 206263 |
| 20606, 20607, 20608, 20609, 20610 | 20803: database of prospective risk for frequency and severity of medical malpractice by subcategory | 20606, 20607, 20608, 20609, 20610, 20804 |
| 20803 | 20804: calculation of prospective risk factors' contribution to medical malpractice premium | 206263 |
| 20601, 20603, 20604, 20605 | 20805: database of estimates of frequency and severity of counterclaims by subcategory (for initiation of program) | 20601, 20602, 20603, 20604, 20806 |
| 20805 | 20806: calculation of past risk factors' effect on initial counterclaim premium | 20401 |

TABLE 4-continued

Underwriter Computer System 310 (FIGS. 26–27)

| INPUT | COMPUTER PROCESS | OUTPUT |
|---|---|---|
| 20407, 20619, 20620, 21204, 22802 | 20807: database of prospective frequency and severity of counterclaims by subcategory | 20407, 20808, 22802 |
| 20807 | 20808: calculation of prospective risk factors' effect on prospective counterclaim premium | 20403, 21204 |

TABLE 5

Claims Handling Computer System 315 (FIG. 28)

| INPUT | COMPUTER PROCESS | OUTPUT |
|---|---|---|
| 206264 | 21001: database of accounting ($ owed, $ paid to attorneys providing legal services) | 206264, 21004 |
| 20619, 20620 | 21002: database of attorneys, expenses, outcomes | 20619, 20620 |
| 20619 | 21003: auditing process of attorney's bills for accuracy, achievement of goals | 20619 |
| 21001 | 21004: word process/print statement to attorneys | Printed material |
| 20619, 206202, 20621 | 21005: optimization programs to pay expenses, distributions | 20619, 206202, 20621 |

TABLE 6

Front End Network Gateway Computer System 312 (FIG. 29)

| INPUT | COMPUTER PROCESS | OUTPUT |
|---|---|---|
| 20618 | 21201: search engine of database of malpractice insurers (names of MD's with counterclaim coverage) | 22201 |
| 20618 | 21202: internal database of names of MD's supplied to web site by malpractice insurers (MD's with counterclaim coverage) | 22201 |
| 206263, 22208 | 21203: posting of premium prices | 206263, 22208 |
| 20808, 22207 | 21204: on-line underwriting | 20807, 22207 |
| 20622, 22206 | 21205: e-commerce (accounting, pay premium, database $ owed and collected) | 20622, 22206 |
| 22203 | 21206: links to home pages to medical malpractice carriers | 22203 |
| 22204 | 21207: web advertising and links to other home pages | 22204 |
| 22202 | 21208: internal database of names of licensed carriers | 22202 |
| 22205 | 21209: content on medical malpractice stored internally or accessed via links to other servers | 22205 |

TABLE 7

Broker's Computer System 314 (FIG. 30)

| INPUT | COMPUTER PROCESS | OUTPUT |
|---|---|---|
| 20615, 22001 | 21401: word process/print marketing material to MD | Printed Material, 22001 |
| 20622, 20626 | 21402: database for accounting for counterclaim premiums ($ owed, $ paid) | 20622, 20626, 21403 |

TABLE 7-continued

Broker's Computer System 314 (FIG. 30)

| INPUT | COMPUTER PROCESS | OUTPUT |
|---|---|---|
| 21402 | 21403: print bill/statement to MD | Printed Material 206202, 20626 |
| 20626, 206202 | 21404: calculate commission owed | |
| 206266, 22003, 22804 | 21405: database of potential MD clients for counterclaim coverage by name, specialty, address, phone, fax, e-mail, specialty, primary medical malpractice insurer, etc. | 206266, 22003, 22804 |
| 22002 | 21406: database of accounting for expenses (including marketing) | 22002 |

TABLE 8

Intermediary's Marketing Computer System 316 (FIG. 31)

| INPUT | COMPUTER PROCESS | OUTPUT |
|---|---|---|
| 20201, 20203 | 21601: word processing/ document creation for materials directed at medical malpractice insurer | Printed Material |
| 20203, 206202 | 21602: word processing/ document creation for materials directed at broker | Printed Material |
| 20203, 20205, 20206 | 21603: word processing/ document creation for materials directed at health care professional | Printed Material, 20206 |
| 20209 | 21604: database for accounting ($ owed/paid for marketing) | 20209 |
| 20210, 22805 | 21605: database of contact persons, organizations (to whom marketing materials are directed) | 20210 |

TABLE 9

Carrier's Marketing Computer System 318 (FIG. 32)

| INPUT | COMPUTER PROCESS | OUTPUT |
|---|---|---|
| 20611, 206202 | 21801: word processing/ document creation for materials directed at broker | Printed Material |
| 20611, 20616, 206263 | 21802: word processing/ document creation for materials directed at health care professional | Printed Material, 20616 |
| 206202 | 21803: database for accounting ($ owed/paid for marketing) | 206202 |
| 206266, 22805 | 21804: database of contact persons, organizations (to whom marketing materials are directed) | 206266 |

TABLE 10

Broker's Marketing Computer System 320 (FIG. 33)

| INPUT | COMPUTER PROCESS | OUTPUT |
|---|---|---|
| 20611, 20616, 206263, 21401 | 22001: word processing/ document creation for materials directed at health care professional | Printed Material, 20616, 21401 |
| 21406 | 22002: database for accounting ($ owed/paid for marketing) | 21406 |

TABLE 10-continued

Broker's Marketing Computer System 320 (FIG. 33)

| INPUT | COMPUTER PROCESS | OUTPUT |
|---|---|---|
| 21405, 22805 | 22003: database of contact persons, organizations (to whom marketing materials are directed) | 21405 |

TABLE 11

Terminals 322 (FIG. 34)

| INPUT | COMPUTER PROCESS | OUTPUT |
|---|---|---|
| 21201, 21202, 22603 | 22201: Interface to determine if MD has counterclaim insurance, other search by name, specialty, geographic region | 21201, 21202, 22603 |
| 21208, 22603 | 22202: Interface for search for licensed carriers that provide counterclaim insurance coverage | 21208, 22603 |
| 21206, 22603 | 22203: Interface for links to licensed carriers | 21206, 22603 |
| 21207, 22603 | 22204: Interface for links to advertisers | 21207, 22603 |
| 21209, 22406, 22603 | 22205: Interface to links for content on medical malpractice information or other health care information | 21209, 22406, 22603 |
| 21205, 22603 | 22206:: Entry form for e-commerce | 21205, 22603 |
| 21204, 22603 | 22207: Entry form for underwriting | 21204, 22603 |
| 21203, 22603 | 22208: Entry form for quotation of premium prices | 21203, 22603 |

TABLE 12

Insured's Attorney's Computer System 324 (FIG. 35)

| INPUT | COMPUTER PROCESS | OUTPUT |
|---|---|---|
| 20619 | 22401: database for accounting ($ owed/collected for legal work) | 20619, 22402 |
| 22401 | 22402: print bill to counterclaim insurance carrier | Printed Material |
| internal data entry or 20606, 20607, 20609 | 22403: scan or store medical record | 22407, 22408, 22409 |
| 22806 | 22404: database of medical experts | 22407, 22408, 22409 |
| 22807 | 22405: database of case law and precedents | 22407, 22408, 22409 |
| 22205 | 22406: web search for relevant information vis a vis counterclaim case | 22205 |
| 22403, 22404, 22405, 22602 | 22407: word process correspondence to MD | Printed Material, 22602 |
| 22403, 22404, 22405, 206268 | 22408: word process correspondence to insurance carrier | Printed Material, 206268 |
| 22403, 22404, 22405 | 22409: word process correspondence to defendant, legal system-court | Printed Material |

TABLE 13

Insured's Computer System 326 (FIG. 36)

| INPUT | COMPUTER PROCESS | OUTPUT |
|---|---|---|
| 206267 | 22601: word process correspondence to medical malpractice/counterclaim insurer | Printed Material, 206267 |

TABLE 13-continued

Insured's Computer System 326 (FIG. 36)

| INPUT | COMPUTER PROCESS | OUTPUT |
|---|---|---|
| 22407 | 22602: word process correspondence to attorney prosecuting counterclaim | Printed material, 22407 |
| 22201, 22202, 22203, 22204, 22205, 22206, 22207, 22208 | 22603: network with terminal/server web search, links to insurers, other links | 22201, 22202, 22203, 22204, 22205, 22206, 22207, 22208 |
| 20622 | 22604: database for accounts payable (write check for counterclaim coverage) | 20622 |

TABLE 14

Accounting Computer System 327 (FIG. 37)

| INPUT | COMPUTER PROCESS | OUTPUT |
|---|---|---|
| 206269 | 23001: calculation reserve/surplus, profit/loss | 20610, 206269, 23006 |
| 20411, 20410 | 23002: calculation of taxes paid, owed (federal, state, excise, etc) | 20410, 20411, 20610 |
| 20606, 20607 | 23003: collation of loss data for medical malpractice | 20606, 20607 |
| 20619, 206202 | 23004: collation of other expense data: legal expense for counterclaim, marketing, commissions, underwriting, etc | 20610, 20619, 206202 |
| Database tax law | 23005: calculation/determination of corporate structure for counterclaim organization to obtain favorable tax status | 20401, 20403 |
| 20619, 206202, 20622 | 23006: processing, printing, filing documents for medical malpractice/counterclaim insurance companies with state, federal, international regulatory agencies | Printed Material |

TABLE 15

Third Party Database Computer System 328 (FIGS. 38–39)

| INPUT | COMPUTER PROCESS | OUTPUT |
|---|---|---|
| other 3rd party databases, 20601, 20602, 20603, 20604, 20605 | 22801: database of historic information for medical malpractice frequency, severity, outcomes, underwriting risks, length of tail, interest rates, discount rates, marketing costs, commissions, taxes, corporate structures, regulations, etc. | 20401, 20405, 20406, 20408, 20410 |
| 20611, 20619, 20620, 206202, 20621, 20807 | 22802: database of prospective information on counterclaim frequency and severity, outcomes, underwriting risk | 20403, 20807 |
| other 3rd party databases, 206269 | 22803: database clearinghouse of profit/loss, surplus/reserve of medical malpractice and/or counterclaim insurers | 20401, 20405 |
| 206266, 21405 | 22804: database of names of MD's, identifying and contact data, demographics, specialty, primary medical malpractice insurer, etc. | 206266, 21405 |
| other 3rd party databases, 206269 | 22805: database of names of medical malpractice/counterclaim insurance companies, contact information, financial statistics, etc | 20210, 21605, 21804, 22003 |

TABLE 15-continued

Third Party Database Computer System 328 (FIGS. 38–39)

| INPUT | COMPUTER PROCESS | OUTPUT |
|---|---|---|
| other 3rd party databases, internal information, | 22806: database of medical experts | 22404 |
| other 3rd party databases, internal information | 22807: database of case law precedents | 22405 |

Turn now to FIGS. 40–42, which collectively illustrate representative web page presentations produced at Front End Network Gateway 312. FIG. 40 provides home page with options selectable by at least one of Computer Terminals 322. FIG. 41 is another user interface including a search engine. Optionally, the search engine can search its own database, where all carriers load data, or the search engine can search remote databases for the carriers, for example, over the Internet, as illustrated in FIGS. 43–44. FIG. 42 and FIG. 44 show results of a search.

FIG. 45 is a first specimen of representative output generated in connection with determining a premium structure for the present invention. FIG. 43 shows an estimate of potential defense costs and indemnity savings due to the insurance.

FIG. 46 is a second specimen of representative output generated in connection with determining a premium structure for the present invention. FIG. 44 shows another estimate of potential defense costs and indemnity savings due to the insurance.

FIG. 47 is a third specimen of representative output generated in connection with determining a premium structure for the present invention. FIG. 45 shows still another estimate of indemnity savings due to the insurance.

FIG. 48 is a forth specimen of representative output generated in connection with determining a premium structure for the present invention. FIG. 45 shows an estimate of profit due to the insurance.

FIG. 49 is a fifth specimen of representative output generated in connection with determining a premium structure for the present invention. FIG. 47 shows an estimate of a range of expected return due to the insurance.

FIG. 48 is a sixth specimen of representative output generated in connection with determining a premium structure for the present invention. FIG. 48 shows more of the estimate of a range of expected return due to the insurance.

FIG. 49 is a seventh specimen of representative output generated in connection with determining a premium structure for the present invention. FIG. 49 shows cash flow for a policy corresponding to the insurance.

FIG. 50 is a eighth specimen of representative output generated in connection with determining a premium structure for the present invention. FIG. 50 shows cash flow and income due to the insurance.

FIG. 51 is a ninth specimen of representative data useful in connection with determining a premium structure for the present invention. FIG. 51 shows illustrative medical malpractice statistics from PIAA claim trend analysis.

FIG. 52 is a tenth specimen of representative data useful in connection with determining a premium structure for the present invention. FIG. 52 shows further illustrative medical malpractice statistics from PIAA claim trend analysis.

FIG. 53 is an eleventh specimen of representative data useful in connection with determining a premium structure for the present invention. FIG. 53 shows still further illustrative medical malpractice statistics from PIAA claim trend analysis.

FIG. 54 is a twelfth specimen of representative data useful in connection with determining a premium structure for the present invention. FIG. 54 shows yet further illustrative medical malpractice statistics from PIAA claim trend analysis.

FIG. 55 is a thirteenth specimen of representative data useful in connection with determining a premium structure for the present invention. FIG. 55 shows illustrative medical malpractice statistics from Bests.

FIG. 56 is a fourteenth specimen of representative output generated in connection with determining a premium structure for the present invention. FIG. 56 shows illustrative medical malpractice statistics from Bests.

FIG. 57 is a specimen of representative marketing documentation including a graphical representation of a pay out pattern for the present invention. More particularly, FIG. 57 is an illustration of graphics that can be produced by Generate Graphics Pay-out Patterns 424. FIG. 57 is a graphic representation of medical malpractice pay-out patterns with percent paid graphed against age of occurrence. Occurrence, claims made, and counterclaim are also shown.

FIG. 58 is a fifteenth specimen of representative data useful in connection with determining a premium structure for the present invention. FIG. 56 shows illustrative medical malpractice pay out statistics from Bests.

In using the present invention, consider the following hypothetical analysis of the counterclaim insurance program.

1. Estimation of Potential Defense Cost and Indemnity Savings to an Insurer:

A significant benefit of the counterclaim insurance is an anticipated reduction in loss costs and allocated loss adjustment expenses (ALAE) due to the elimination of frivolous claims. A reduction in costs can be estimated as a percentage of medical malpractice premium. The reduced costs are derived from two sources:

The reduced number of claims that have no indemnity payment, and

The reduced number of claims that have plaintiff settlements less than $30,000 Consider the estimated range of potential impacts is as follows:

| | |
|---|---|
| No indemnity claims | 0.9%–5.3% of medical malpractice premium |
| Plaintiff settlements <$30,000 | 0.1%–0.7% of medical malpractice premium |

The range is based on varying the assumed percentage of claims that are closed without an indemnity payment which are frivolous from 25% to 75%, and the assumed percentage of these frivolous claims that will be eliminated ranges from 25% to 75%. The midpoint estimate assuming 50% of zero indemnity claims are frivolous and 50% of those will be eliminated produces a total reduction in medical malpractice costs of 4.0% of premium on an annual basis. A complete table of values is shown in FIGS. 43 and 44.

2. The Estimated Value of the Policy/program

An estimate of the potential value of the counterclaim insurance itself can be made in terms of the expected total return as a percent of premium. Total return includes underwriting profit and investment income after federal income tax. The range of estimates is based on varying the assumed percentage of doctors sued and the assumed cost of counterclaim. A specimen table of values is shown in FIG. 46.

3. Discussion of Assumptions

REDUCED MEDICAL MALPRACTICE COSTS

The existence of the counterclaim insurance and the associated web site is expected to eliminate some portion of medical malpractice claims that have no indemnity as well as some portion of claims with plaintiff settlements less than $30,000. An estimate in the reduction in claims as a percentage of medical malpractice premiums is as follows. For the claims with no indemnity, the reduction in medical malpractice costs is based on the following four factors:

1. The ratio of allocated loss expense to premium for medical malpractice. This ratio is based on the insurance industry's ratio of estimated ultimate ALAE costs to premium as shown in Schedule P of the Annual Statement. This ratio is 28%.
2. The ratio of expense for claims with no indemnity payment to the expense for all claims. This is based on the closed claim data in the PIAA Claim Trend Analysis. This ratio is 53%.
3. An estimate of the percentage of claims with no indemnity that could be considered frivolous. This is based on judgment, but can be supported based on examination of the closed claim data. 68% of all claims are closed with no indemnity payment, and 92% of those claims are dropped, withdrawn or dismissed. It is believed that some portion of claims that are dropped withdrawn or dismissed are potentially frivolous. An estimate of the impact can be made using an assumption that 10% to 50% of the dropped withdrawn or dismissed claims frivolous.
4. An estimate of the percentage of frivolous claims that could potentially be eliminated by the existence of counterclaim coverage. It is believed that the existence of the counterclaim insurance and the associated website will eliminate the filing of many of the claims that have been dropped withdrawn or dismissed and are frivolous. An estimate of the impact can be made using an assumption that 10% to 50% of frivolous claims will be eliminated.

The reduction in medical malpractice insurance costs for claims with no indemnity due to the existence of counterclaim coverage and the associated web site is calculated as the product of the above four factors. Because the third and fourth factors are subject to judgment, consider a table of estimated reductions in premium varying these two factors on FIGS. 43 and 44.

For the claims with plaintiff settlements less than $30,000, there is an expected reduction of expense as well as indemnity. The reduction in medical malpractice costs is based on the following factors:

1. The ratio of allocated loss expense to premium for medical malpractice. This ratio is based on the insurance industry's ratio of estimated ultimate ALAE costs to premium as shown in Schedule P of the Annual Statement. This ration is 28%.
2. The ratio of expense for claims with plaintiff settlements to the expense for all claims. This is based on the closed claim data in the PIAA claim Trend Analysis. This ration is 42.5%.
3. The ratio of indemnity losses to premium for medical malpractice. This ratio is based on the insurance industry's ratio of estimated ultimate loss to premium as shown in Schedule P of the Annual Statement. This ratio is 35%.
4. The ratio of indemnity for plaintiff settlements to indemnity for all claims. This is based on the closed claim data in the PIAA Claim Trend Analysis. This ratio is 93%.
5. The ratio of indemnity and expense for claims less than $30,000 to indemnity and expense for all claims. This is based on the closed claim data in the PIAA Claim Trend Analysis by type of injury. No expense data by type of injury was available. Therefore, we have assumed that the distribution of expense by type of injury and average amount is similar to the distribution of indemnity amounts. This assumption appears reasonable based on a review of the relationship of indemnity to expense for other closed claim statistics. The ratio is 2.6%.
6. An estimate of the percentage of plaintiff settlement claims that could be considered frivolous. This is based on judgment. It is believed that some portion of plaintiff settlement claims are frivolous, but are settled for less than $30,000 to avoid being reported to the National Practitioners Data Bank. An estimate of the impact can be made using an assumption that 10% to 50% of the plaintiff settlement claims less than $30,000 are frivolous.
7. An estimate of the percentage of frivolous claims that could potentially be eliminated by the existence of counterclaim coverage. This is also based on judgment. It is believed that the existence of the counterclaim insurance and the associated website will eliminate the filing of many of the claims that are settled for the plaintiff for less than $30,000 and are frivolous. An estimate of the impact can be made using an assumption that 10% to 50% of these frivolous claims will be eliminated.

The reduction in medical malpractice insurance costs for plaintiff settlement claims less than $30,000 due to the existence of counterclaim coverage and the associated web site is calculated as: $\{[1\times2]+[3\times4]\}\times5\times6\times7$.

Because the sixth and seventh factors are subject to judgment, we have provided a table of estimated reductions in premium varying these two factors on FIGS. 43 and 44.

4. Value of the Policy/program

Estimates of the value of the counterclaim insurance policy itself can be made based on the following:

The price of the insurance—$1.000

The commission, marketing and premium tax costs assumed—26% of premium,

An estimate of the frequency of claims

An estimate of the severity (average cost) of claims

The underwriting profit is calculated as:

Premium−Expenses−Claim Costs.

In addition, an estimate can be made of the potential investment income and the federal income tax. The total return is calculated as:

(Underwriting profit+Investment Income−Federal Income Tax.)

The calculations of total return are shown in FIGS. 46–48.

Assumed an initial market share of 10%. However, this estimate of value is expressed as a percent of premium, and therefore, is not affected by the market share. A greater market share will increase the dollars of value, but not the percentages. The assumed average premium of $1,000, however, does affect the estimate of value. Should the average premium differ from that estimated above, then the estimate of value also would change.

Frequency

Our estimate of frequency, or number of claims, is based on several factors.

The percentage of doctors that are sued—estimate 6–10%.

The percentage of suits that go to trial—estimate 10%.

The percentage of trials where a physician wins—estimate 80% (that is 8% (80% ×10%) of all claims end in a trial and are won by the physician).

It is assumed that the purchase of counterclaim insurance, 100% of suits that go to trial and the physician wins will be reviewed for potential counterclaim.

The percent of suits won by the physician that are reviewed and deemed suitable for counterclaim. An initial estimate is 50%.

The value of the counterclaim insurance policy is significantly affected by, the frequency of claims. Therefore, consider the specimen with the table of values varying the assumed percentage of doctors that are sued from 6% to 16%. This will reflect the quality of the book of business insured for counterclaim insurance.

Severity (Average Claim Value)

An estimate of the severity of claims is based on an assumption that the cost of reviewing claims for potential counterclaim is $12,500, and the cost of the actual counterclaim is $20,000. Because the average cost of counterclaim can vary with the complexity of the case, we have also provided a table of values varying the assumed cost of counterclaim from $20,000 to $45,000. The impact on the value of the policy from varying the severity is less significantly than the impact of varying the frequency.

Preliminary estimates do not reflect the potential for recovery of claim costs in the event of winning an award through counterclaim. Any recoveries will only increase the value of the policy.

Investment Income

The effect of timing between when the premium is collected and the counterclaim benefits are paid will generate investment income, which contributes to the value of the counterclaim policy. The following factors are used to derive our estimate of investment income.

An assumed payment pattern was derived based on the industry payment pattern for medical malpractice claims-made insurance. An adjustment was made to eliminate payments after 7 years, assuming that the likelihood of frivolous claims beyond 7 years is negligible, and lagging the pattern 2 years to reflect the fact that the counterclaim must follow the original malpractice suit which takes 2 years on average.

An investment return of 5%

Invested assets equal to loss reserves generated by the counterclaim insurance

A discount rate of 5%

Federal Income Tax

Federal income tax on underwriting profit and investment income is based on an assumed tax rate of 30%.

5. Data

The following sources of data are used for this analysis.

Insurance industry medical malpractice occurrence and claims-made experience from A.M. Best's Aggregates and Averages Closed claim statistics from "PIAA Claim Trend Analysis" published by the Physician Insurers Association of America.

Consider representative output of the present invention, particularly an endorsement.

ENDORSEMENT

Medical Justice Benefit Package

What is Covered by This Benefit

All benefits are provided only to named insured(s) who have been named as a defendant in an action against the insured(s) in a court of law for, in whole or in part, medical malpractice.

Benefit for Counterclaim Prosecution Against Non-meritorious/Frivolous Medical Malpractice Claims Benefits are those that include reasonable fees and costs for the analysis and prosecution of an action against those persons (such persons may include plaintiffs counsel, plaintiff, and/or expert witness) responsible for bringing and/or advocating a non-meritorious medical malpractice action against the insured as specifically described below:

The Company will provide an independent attorney who will:

Consult with the named insured;

Obtain and review necessary and relevant documentation;

Consult with medical expert(s) as necessary;

Prepare an analysis

If the analysis supports the bringing of a counterclaim action, the Company will appoint an independent attorney to:

Prepare complaint (lawsuit);

Prepare discovery plan;

Prepare and conduct discovery;

Conduct depositions;

Defend motions to dismiss;

Prepare and/or defend motion for summary judgment;

Perform miscellaneous negotiations/communications/research;

Prepare for trial;

Litigate.

The Company will also pay the:

Fees for medical expert to review file, consult with attorney, render option, testify at deposition and trial;

Costs, including filing fees and depositions;

Defense of a successful judgment if appeal is taken.

The determination of whether there is a basis for the pursuit of a counterclaim action will be made in the sole discretion of the attorney who undertakes the analysis.

Not All Cases Analyzed Will Support Pursuit of Further Action Reimbursement Provision In the event of a recovery under this benefit, the named insured agrees to reimburse to the Company the costs and fees incurred out of any recovery, but only up to one-half (½) of the amounts recovered from the parties who brought the medical malpractice action. If there is no recovery, the insured is not required to reimburse the Company for any expenses associated with providing benefits under this policy. Reimbursement will not exceed the Company's actual costs and fees spent in providing the benefits under the policy.

Benefit for Remedy Against False/Fraudulent Medical Expert Witness Testimony

Benefits include reasonable fees and costs for review and analysis as to whether a medical expert witness committed perjury, delivered false testimony, and/or engaged in fraud or deception during the giving of testimony.

The Company will provide an independent attorney who will:
  Consult with named insured;
  Obtain and review necessary and relevant documentation;
  Consult with medical expert(s) as necessary;
  Prepare an analysis.
If the analysis supports further action against medical expert witness, the Company will appoint an independent attorney to:
  Research procedures regarding range of further action(s);
  Prepare documents describing the underlying complaint;
  Prepare documents supporting the basis for executing further action(s);
  Prepare documents recommending or supporting appropriate penalties.
Where applicable, complaints will be filed with, further action requested from, and penalties recommended to:
  All applicable state medical licensing boards and/or state agencies responsible for physician disciplinary actions.
  All applicable county, state, and/or national medical associations;
  All applicable state and/or rational medical specialty organizations;
  American Board of Medical Specialties.
  District Attorney or Prosecuting Attorney.
Not All Cases Analyzed Will Support Pursuit of Further Action Benefit for Remedy Against Unethical Medical Malpractice Plaintiff's Attorney Behavior
  Benefits include reasonable fees and costs for review and analysis as to whether plaintiffs attorney in a medical malpractice case engaged in unethical and unprofessional conduct.
  The Company will provide an independent attorney who will:
    Consult with:the named insured;
    Obtain and review necessary and relevant documentation;
    Consult with medical expert(s) as necessary;
    Prepare an analysis.
If the analysis supports further action against plaintiff's attorney, the Company will appoint an independent attorney to:
    Research procedures regarding range of further action(s);
    Prepare documents describing the underlying complaint;
    Prepare documents supporting the basis for executing further action(s);
    Prepare documents recommending or supporting appropriate penalties.
Where applicable, complaints will be filed with,further action requested from, and penalties recommended to:
    All applicable state and federal licensing boards and/or agencies responsible for attorney disciplinary actions.
Not All Cases Analyzed Will Support Pursuit of Further Action Obligation of the Insured
  The insured shall notify the insurer, in writing, within one hundred twenty (120) days of the "termination in favor of the insured," that the insured wishes to exercise rights contained in this Endorsement.
Additional Exclusions and Limitations Applicable to this Benefit
  These exclusions are in addition to the exclusions listed in the General Exclusions section of the policy.
  There are no benefits unless the underlying medical malpractice action has been terminated in favor of the insured. "Termination in favor of the insured" is a judgment for the defendant by either a judge or jury, which has become final and has aged past the point of appeal. A dismissal for failure to state a claim or dismissal for summary judgment is considered a termination in favor of the insured. A settlement is not a termination in favor of the insured, and a voluntary dismissal of an action by plaintiff is not a termination in favor of the insured.
  Pre-existing matters are not covered. No benefits will be paid for any event that medical malpractice settlements or medical malpractice actions where the act of malpractice is alleged to have occurred before the effective date of the policy.
  In order for any benefits to be provided, the following conditions must be met:
    The alleged act of malpractice complained of by the plaintiff in the medical malpractice suit must have occurred while coverage for the insured was in effect under this policy;
    For an action to be brought against persons alleging medical malpractice, the underlying medical malpractice action must have been terminated in favor of the insured as defined above;
    For benefits to be available for a particular act, coverage under this policy must have been in force continuously, without lapse or termination, from and including the time of the alleged act to and including the filing of the counterclaim.
This may not all occur while the policy is in force. The insured has the right to purchase coverage that will extend benefits for an act of alleged malpractice occurring while the policy is in force, but the outcome does not occur while the policy is in force, but the outcome does not occur while the policy is in force.
This policy specifically excludes:
  Any lawsuit filed without notice to the Company by the insured against the persons who alleged medical malpractice against the insured;
  Any lawsuits filed against the insured that would not be considered medical malpractice, i.e., actions that are related to the business side of the medical malpractice;
  Any action filed relating to abuse of prescription or controlled substances or substances requiring a DEA number;
  Any penalties or judgments against any insured awarded or ordered by any court;
  Any matter that is not specifically listed in this policy as a benefit under the policy;
  Out-of-pocket, travel, or time away from practice expenses of the insured except as defined in general policy;
  General prepaid legal insurance relating to matters not specifically enumerated; for example and not by way of limitation, employment matters, managed care contract matters, real estate matters, tax matters, and sexual harassment matters;
  Any action arising out of or related to use or abuse of any illegal substance, intoxicants, or similar substances;
  Any action arising out of or related to any fraudulent or dishonest acts, malicious acts or omissions, or any acts of moral turpitude;
  Appeal, if insured loses counterclaim, shall be at the sole discretion of the insurer.
Maximum Amount Payable Under this Benefit
  This policy will pay the maximum amount of One Hundred Thousand Dollars ($100,000.00) for this benefit per event of "termination in favor of insured," with annual aggregate of Three Hundred Thousand Dollars ($300,000.00) for all of said events.

Thus it is seen that while it has been said that "let he who is without sin cast the first stone," insurance is offered as an effective deterrent to the filing and prosecution of meritless or frivolous claims. One skilled in the art will appreciate that the present invention can be practiced by other than the described embodiments, which are presented for purposes of illustration and not of limitation, and the present invention is limited only by the claims which follow.

What is claimed is:

1. A computer-implemented method for determining a premium structure for insurance providing coverage including coverage for costs associated with advancing a counterclaim, the method comprising:
   receiving actuarial data and census data, at least one of said data including indicia of litigation frequency and cost;
   computing a premium structure, based upon the actuarial data and the census data, for the insurance providing coverage including coverage for costs associated with advancing a counterclaim; and
   generating insurance documentation including said premium structure.

2. The method of claim 1, wherein:
   said receiving the actuarial data and census data is carried out with data received from an actuarial computer system;
   said computing a premium structure is carried out by means of a carrier computer system located remotely from the actuarial computer system; said method further including:
      communicating the actuarial data and census data from the actuarial computer system to the carrier computer system.

3. The method of claim 2, further including:
   inputting broker information, including claim data, at a remote computer system; and
   communicating the information to the carrier computer system; and
   calculating an updated premium structure based upon the claim data in the broker information.

4. The method of claim 1 further including:
   administering the insurance policy by:
      receiving premium payment data for the insurance, and receiving claim data for the insurance; and
      generating second documentation including at least one of the payment data for the insurance, and the claim data for the insurance.

5. The method of claim 4, wherein:
   the step of generating second documentation is carried out by means of a carrier computer system, and the step of receiving the premium payment data is carried out by inputting information at a computer system remote from the carrier computer system; said method further including:
      communicating the information from the remote computer system for the generating second documentation.

6. The method of claim 4, wherein:
   said generating second documentation is carried out by a carrier computer system and the step of receiving the claim data is carried out by inputting information at a computer system remote from the carrier computer system; said method further including:
      communicating the information to the carrier computer system.

7. The method of claim 6, further including:
   inputting the claim data in the information at the computer system remote from the carrier computer system; and
   communicating the claim data to the carrier computer system; and
   calculating an updated premium structure based upon the claim data.

8. The method of claim 1, further including:
   inputting payment data at an insured's accounting system for remote monitoring of payment data.

9. The method of claim 1 further including:
   receiving premium payment data for the insurance, the payment data including respective names corresponding to coverage by the insurance;
   posting the names and indicia of the coverage by the insurance on a front end network gateway to provide a warning at remote terminals.

10. The method of claim 9, wherein said posting is carried out using the Internet as the front end network gateway.

11. The method of claim 9, wherein said posting is carried out using the world wide web as the front end network gateway.

12. The method of claim 1 further including:
   receiving, at an intermediary computer, the actuarial data and census data for the insurance, at least one of said data including indicia of litigation frequency and cost; and
   performing an independent verification of the premium structure.

13. The method of claim 1 wherein said receiving the actuarial data is carried out with actuarial data including an indicium of suits eliminated.

14. The method of claim 1 wherein said receiving the actuarial data is carried out with actuarial data including an indicium of reduced settlement cost for suits.

15. The method of claim 1 wherein said receiving the actuarial data is carried out with actuarial data including an indicium of defense cost.

16. The method of claim 1 wherein said receiving the actuarial data is carried out with actuarial data including an indicium of frequency of claims.

17. The method of claim 1 wherein said receiving the actuarial data is carried out with actuarial data including an indicium of the cost of the claims.

18. The method of claim 1 wherein said receiving the actuarial data is carried out with actuarial data including an indicium of indemnity savings.

19. The method of any one of claims 1–18 further including:
   generating marketing documentation including a graphical representation of a pay out pattern corresponding to the insurance coverage.

20. The method of claim 19 wherein said receiving the actuarial data is carried out with actuarial data including an indicium of a reduction in medical malpractice cost.

21. The method of claim 1, wherein said computing the premium structure includes calculating a cost for filing an administrative complaint against an expert for improper conduct in litigation giving rise to the counterclaim.

22. The method of claim 1, wherein said computing the premium structure includes calculating a cost for filing an administrative complaint against an attorney for improper conduct in litigation giving rise to the counterclaim.

23. A computer-implemented method for determining a premium structure for insurance providing coverage including counterclaim coverage, the method comprising:

receiving actuarial data and census data, at least one of said data including indicia of litigation frequency and cost;

computing a premium structure, based upon the actuarial data and the census data, for the insurance providing coverage including counterclaim coverage, including calculating a premium cost for the counterclaim brought as a countersuit; and generating insurance documentation including said premium structure.

24. The method of claim 23 wherein said receiving the actuarial data is carried out with actuarial data including an indicium of a reduction in medical malpractice cost.

25. The method of claim 23 wherein said computing the premium structure includes calculating a premium cost for the counterclaim including a counterclaim for frivolous litigation.

26. The method of claim 23, wherein:

said receiving the actuarial data and census data is carried out with data received from an actuarial computer system;

said computing a premium structure is carried out by means of a carrier computer system located remotely from the actuarial computer system; said method further including:

communicating the actuarial data and census data from the actuarial computer system to the carrier computer system.

27. The method of claim 26, further including:

inputting broker information at a remote computer system; and communicating the information to the carrier computer system; and calculating an updated premium structure based upon the claim data in the broker information.

28. The method of claim 23 further including:

administering the insurance policy by sub-steps including receiving premium payment data for the insurance, and receiving claim data for the insurance;

generating second documentation including at least one of the payment data for the insurance, and receiving claim data for the insurance.

29. The method of claim 28, wherein:

the step of generating second documentation is carried out by means of a carrier computer system, and the step of receiving the premium payment data is carried out by inputting information at a computer system remote from the carrier computer system; said method further including:

communicating the information from the remote computer system for the generating second documentation.

30. The method of claim 28, wherein:

said generating second documentation is carried out by a carrier computer system and the step of receiving the claim data is carried out by inputting information at a computer system remote from the carrier computer system; said method further including:

communicating the information to the carrier computer system.

31. The method of claim 30, further including:

inputting the claim data in the information at the computer system remote from the carrier computer system; and communicating the claim data to the carrier computer system; and calculating an updated premium structure based upon the claim data.

32. The method of claim 23, further including:

inputting payment data at an insured's accounting system for remote monitoring of payment data.

33. The method of claim 23 further including:

receiving premium payment data for the insurance, the payment data including respective names corresponding to coverage by the insurance;

posting the names and indicia of the coverage by the insurance on a front end network gateway to provide a warning at remote terminals.

34. The method of claim 33, wherein said posting is carried out using the Internet as the front end network gateway.

35. The method of claim 33, wherein said posting is carried out using the world wide web as the front end network gateway.

36. The method of claim 23 further including:

receiving, at an intermediary computer, the actuarial data and census data including for the insurance, at least one of said data including indicia of litigation frequency and cost; and performing an independent verification of the premium structure.

37. The method of claim 23 wherein said receiving the actuarial data is carried out with actuarial data including an indicium of suits eliminated.

38. The method of claim 23 wherein said receiving the actuarial data is carried out with actuarial data including an indicium of reduced settlement cost for suits.

39. The method of claim 23 wherein said receiving the actuarial data is carried out with actuarial data including an indicium of defense cost.

40. The method of claim 23 wherein said receiving the actuarial data is carried out with actuarial data including an indicium of frequency of claims.

41. The method of claim 23 wherein said receiving the actuarial data is carried out with actuarial data including an indicium of the cost of the claims.

42. The method of claim 23 wherein said receiving the actuarial data is carried out with actuarial data including an indicium of indemnity savings.

43. A computer-implemented method for determining a premium structure for insurance providing coverage including counterclaim coverage, the method comprising:

receiving actuarial data and census data, at least one of said data including indicia of litigation frequency and cost;

computing a premium structure, based upon the actuarial data and the census data, for the insurance providing coverage including counterclaim coverage, including calculating a premium cost for the counterclaim brought as a countersuit to a professional malpractice cause of action; and generating insurance documentation including said premium structure.

44. The method of claim 43 wherein said receiving the actuarial data is carried out with actuarial data including an indicium of counterclaim litigation cost for frivolous litigation, said counterclaim litigation cost not including countersuit cost.

45. The method of claim 43, wherein:

said receiving the actuarial data and census data is carried out with data received from an actuarial computer system;

said computing a premium structure is carried out by means of a carrier computer system located remotely from the actuarial computer system; said method further including:
communicating the actuarial data and census data from the actuarial computer system to the carrier computer system.

46. The method of claim 45, further including:
inputting broker information at a remote computer system; and
communicating the information to the carrier computer system; and
calculating an updated premium structure based upon the claim data in the broker information.

47. The method of claim 43 further including:
administering the insurance policy by sub-steps including receiving premium payment data for the insurance, and receiving claim data for the insurance;
generating second documentation including at least one of the payment data for the insurance, and receiving claim data for the insurance.

48. The method of claim 47, wherein:
the step of generating second documentation is carried out by means of a carrier computer system, and the step of receiving the premium payment data is carried out by inputting information at a computer system remote from the carrier computer system; said method further including:
communicating the information from the remote computer system for the generating second documentation.

49. The method of claim 47, wherein:
said generating second documentation is carried out by a carrier computer system and the step of receiving the claim data is carried out by inputting information at a computer system remote from the carrier computer system; said method further including:
communicating the information to the carrier computer system.

50. The method of claim 49, further including:
inputting the claim data in the information at the computer system remote from the carrier computer system; and
communicating the claim data to the carrier computer system; and
calculating an updated premium structure based upon the claim data.

51. The method of claim 43, further including:
inputting payment data at an insured's accounting system for remote monitoring of payment data.

52. The method of claim 43 further including:
receiving premium payment data for the insurance, the payment data including respective names corresponding to coverage by the insurance;
posting the names and indicia of the coverage by the insurance on a front end network gateway to provide a warning at remote terminals.

53. The method of claim 52, wherein said posting is carried out using the Internet as the front end network gateway.

54. The method of claim 52, wherein said posting is carried out using the world wide web as the front end network gateway.

55. The method of claim 43 further including:
receiving, at an intermediary computer, the actuarial data and census data including for the insurance, at least one of said data including indicia of litigation frequency and cost; and
performing an independent verification of the premium structure.

56. The method of claim 43 wherein said receiving the actuarial data is carried out with actuarial data including an indicium of suits eliminated.

57. The method of claim 43 wherein said receiving the actuarial data is carried out with actuarial data including an indicium of reduced settlement cost for suits.

58. The method of claim 43 wherein said receiving the actuarial data is carried out with actuarial data including an indicium of defense cost.

59. The method of claim 43 wherein said receiving the actuarial data is carried out with actuarial data including an indicium of frequency of claims.

60. The method of claim 43 wherein said receiving the actuarial data is carried out with actuarial data including an indicium of the cost of the claims.

61. The method of claim 43 wherein said receiving the actuarial data is carried out with actuarial data including an indicium of indemnity savings.

62. A computer-implemented method for determining a premium structure for insurance providing coverage including counterclaim coverage, the method comprising:
receiving actuarial data and census data, at least one of said data including indicia of litigation frequency and cost;
computing a premium structure, based upon the actuarial data and the census data, for the insurance providing coverage including counterclaim coverage, including calculating a premium cost for the counterclaim brought in a medical malpractice cause of action; and
generating insurance documentation including said premium structure.

63. The method of claim 62 wherein said computing the premium structure includes calculating a premium cost for the counterclaim as counterclaim litigation only for frivolous litigation.

64. The method of claim 62, wherein:
said receiving the actuarial data and census data is carried out with data received from an actuarial computer system;
said computing a premium structure is carried out by means of a carrier computer system located remotely from the actuarial computer system; said method further including:
communicating the actuarial data and census data from the actuarial computer system to the carrier computer system.

65. The method of claim 64, further including:
inputting broker information at a remote computer system; and
communicating the information to the carrier computer system; and
calculating an updated premium structure based upon the claim data in the broker information.

66. The method of claim 62 further including:
administering the insurance policy by sub-steps including receiving premium payment data for the insurance, and receiving claim data for the insurance;
generating second documentation including at least one of the payment data for the insurance, and receiving claim data for the insurance.

67. The method of claim 66, wherein:
the step of generating second documentation is carried out by means of a carrier computer system, and the step of receiving the premium payment data is carried out by inputting information at a computer system remote from the carrier computer system; said method further including:

communicating the information from the remote computer system for the generating second documentation.

68. The method of claim 66, wherein:

said generating second documentation is carried out by a carrier computer system and the step of receiving the claim data is carried out by inputting information at a computer system remote from the carrier computer system; said method further including:

communicating the information to the carrier computer system.

69. The method of claim 68, further including:

inputting the claim data in the information at the computer system remote from the carrier computer system; and communicating the claim data to the carrier computer system; and calculating an updated premium structure based upon the claim data.

70. The method of claim 62, further including:

inputting payment data at an insured's accounting system for remote monitoring of payment data.

71. The method of claim 62 further including:

receiving premium payment data for the insurance, the payment data including respective names corresponding to coverage by the insurance;

posting the names and indicia of the coverage by the insurance on a front end network gateway to provide a warning at remote terminals.

72. The method of claim 71, wherein said posting is carried out using the Internet as the front end network gateway.

73. The method of claim 71, wherein said posting is carried out using the world wide web as the front end network gateway.

74. The method of claim 62 further including:

receiving, at an intermediary computer, the actuarial data and census data including for the insurance, at least one of said data including indicia of litigation frequency and cost; and performing an independent verification of the premium structure.

75. The method of claim 62 wherein said receiving the actuarial data is carried out with actuarial data including an indicium of suits eliminated.

76. The method of claim 62 wherein said receiving the actuarial data is carried out with actuarial data including an indicium of reduced settlement cost for suits.

77. The method of claim 62 wherein said receiving the actuarial data is carried out with actuarial data including an indicium of defense cost.

78. The method of claim 62 wherein said receiving the actuarial data is carried out with actuarial data including an indicium of frequency of claims.

79. The method of claim 62 wherein said receiving the actuarial data is carried out with actuarial data including an indicium of the cost of the claims.

80. The method of claim 62 wherein said receiving the actuarial data is carried out with actuarial data including an indicium of indemnity savings.

81. A digital electrical computer and data processing system comprising:

a digital electrical computer, an input device for inputting data electrically connected to the digital electrical computer, and an output device electrically connected to the digital electrical computer, wherein the digital electrical computer is controlled by a computer program to form a programmed digital electrical computer for processing input electrical signals, the input electrical signals being produced in response to information entered at the input device, the information including actuarial data and census data, at least one of said data including indicia of litigation frequency and cost, the processing including modifying the input electrical signals into output electrical signals representing a premium structure, based upon the actuarial data and the census data, for insurance funding of countersuit litigation for a frivolous medical malpractice claim, the output electrical signals being communicated to the output device which, in response to the output electrical signals, generates a depiction of the premium structure.

82. A method for making a programmed digital electrical computer and data processing system, the method including the steps of:

providing a digital electrical computer having a programmable processor, an input device for inputting data electrically connected to the digital electrical computer, an output device electrically connected to the digital electrical computer;

programming the processor to control the digital electrical computer for processing input electrical signals, the input electrical signals being produced in response to information entered at the input device, the information including actuarial data and census data, at least one of said data including indicia of litigation frequency and cost, the data in a format specified by the computer program, the processing including modifying the input electrical signals into output electrical signals representing a premium structure, based upon the actuarial data and the census data, for insurance funding of countersuit litigation for a frivolous medical malpractice claim, the output electrical signals being communicated to the output device which, in response to the output electrical signals, generates a depiction of the premium structure.

* * * * *